US010094675B2

(12) United States Patent
Hajj et al.

(10) Patent No.: US 10,094,675 B2
(45) Date of Patent: Oct. 9, 2018

(54) MAP APPLICATION WITH TRANSIT NAVIGATION MODE

(71) Applicant: Apple Inc., Cupertino, CA (US)

(72) Inventors: Usama M. Hajj, San Francisco, CA (US); Ian Leighton, Kensington, CA (US); David Hodge, Mountain View, CA (US); Cameron Sabol, Cupertino, CA (US); Marcel van Os, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/869,706

(22) Filed: Sep. 29, 2015

(65) Prior Publication Data

US 2016/0358471 A1 Dec. 8, 2016

Related U.S. Application Data

(60) Provisional application No. 62/172,206, filed on Jun. 7, 2015, provisional application No. 62/172,209, filed on
(Continued)

(51) Int. Cl.
G01C 21/34 (2006.01)
G08G 1/123 (2006.01)
(Continued)

(52) U.S. Cl.
CPC ......... G01C 21/3423 (2013.01); G01C 21/20 (2013.01); G01C 21/3484 (2013.01);
(Continued)

(58) Field of Classification Search
CPC .. G08G 1/123; G08G 1/0125; G06F 3/04842; G06F 3/0485; G06F 3/0488; G01C 21/3667; G01C 21/36; G01C 21/3423; G01C 21/3484; G01C 21/20
See application file for complete search history.

(56) References Cited

U.S. PATENT DOCUMENTS 5,177,684 A 1/1993 Harker et al.
5,412,573 A 5/1995 Barnea et al.
(Continued)

FOREIGN PATENT DOCUMENTS

EP 2733651 A1 5/2014
TW 201038923 A 11/2010
WO 2015/024807 A1 2/2015

OTHER PUBLICATIONS

Sasha Gontmakher, "Know when your bus is late with live transit updates in Google Maps", Official Google Blog. Published Jun. 8, 2011. <https://googleblog.blogspot.com/2011/06/know-when-your-bus-is-late-with-live.html>.*
(Continued)

Primary Examiner — Mussa A Shaawat
Assistant Examiner — Michael V Kerrigan
(74) Attorney, Agent, or Firm — Invoke

(57) ABSTRACT

Some embodiments provide a map application that displays a selectable user interface (UI) item for a transit station, a representation of which, is displayed over a presentation of a portion of a map of an area. Upon selection of the UI item, the map application of some embodiments provides a graphical user interface (GUI) that includes a first set of information about the transit station, and a second set of information about departure schedules of several different transit lines from the transit station.

22 Claims, 42 Drawing Sheets

Related U.S. Application Data on Jun. 7, 2015, provisional application No. 62/172,214, filed on Jun. 7, 2015, provisional application No. 62/172,216, filed on Jun. 7, 2015.

(51) Int. Cl.
*G01C 21/36* (2006.01)
*G06F 3/0484* (2013.01)
*G06F 3/0485* (2013.01)
*G06F 3/0488* (2013.01)
*G08G 1/01* (2006.01)
*G01C 21/20* (2006.01)

(52) U.S. Cl.
CPC ......... *G01C 21/36* (2013.01); *G01C 21/3667* (2013.01); *G06F 3/0485* (2013.01); *G06F 3/0488* (2013.01); *G06F 3/04842* (2013.01); *G08G 1/0125* (2013.01); *G08G 1/123* (2013.01)

(56) References Cited

U.S. PATENT DOCUMENTS

| | | | |
|---|---|---|---|
| 5,977,990 A | 11/1999 | Kowalski | |
| 6,249,741 B1 | 6/2001 | Iwasaki et al. | |
| 7,221,287 B2 | 5/2007 | Gueziec et al. | |
| 7,469,827 B2 | 12/2008 | Katragadda et al. | |
| 7,746,343 B1 | 6/2010 | Charaniya et al. | |
| 7,818,116 B1 | 10/2010 | Nesbitt | |
| 7,925,427 B2 | 4/2011 | Zehler | |
| 7,933,897 B2 | 4/2011 | Jones et al. | |
| 7,957,871 B1 | 6/2011 | Echeruo | |
| 8,031,206 B2 | 10/2011 | Shoemaker | |
| 8,315,801 B2 | 11/2012 | Takagi | |
| 8,489,328 B2 | 7/2013 | Lee | |
| 8,588,818 B2 | 11/2013 | Huang et al. | |
| 8,681,176 B1 | 3/2014 | Maurer et al. | |
| 8,825,376 B1 | 9/2014 | Szybalski et al. | |
| 8,972,185 B1 | 3/2015 | Viger et al. | |
| 8,972,190 B1 | 3/2015 | Pech et al. | |
| 8,996,304 B2 | 3/2015 | Needham et al. | |
| 8,996,312 B1 | 3/2015 | Freund et al. | |
| 9,043,150 B2 | 5/2015 | Forstall et al. | |
| 9,057,612 B1 | 6/2015 | Savvopoulos | |
| 9,082,134 B2 | 7/2015 | Gishen | |
| 2002/0069017 A1 | 6/2002 | Schmier et al. | |
| 2003/0019266 A1 | 1/2003 | Kanno | |
| 2003/0036848 A1 | 2/2003 | Sheha et al. | |
| 2003/0109266 A1 | 6/2003 | Rafiah et al. | |
| 2004/0158395 A1 | 8/2004 | Yamada et al. | |
| 2004/0181337 A1 | 9/2004 | Kawasaki et al. | |
| 2004/0233070 A1 | 11/2004 | Finnern | |
| 2005/0192025 A1 | 9/2005 | Kaplan | |
| 2005/0222760 A1 | 10/2005 | Cabral et al. | |
| 2006/0293847 A1 | 12/2006 | Marriott et al. | |
| 2007/0118520 A1 | 5/2007 | Bliss et al. | |
| 2007/0138347 A1 | 6/2007 | Ehlers | |
| 2007/0150179 A1 | 6/2007 | Pinkus et al. | |
| 2007/0208492 A1 | 9/2007 | Downs et al. | |
| 2007/0208498 A1 | 9/2007 | Barker et al. | |
| 2007/0208502 A1 | 9/2007 | Sakamoto et al. | |
| 2007/0210937 A1 | 9/2007 | Smith et al. | |
| 2008/0068221 A1 | 3/2008 | Park | |
| 2008/0071465 A1 | 3/2008 | Chapman et al. | |
| 2008/0147313 A1 | 6/2008 | Nesbitt | |
| 2008/0238941 A1 | 10/2008 | Kinnan et al. | |
| 2008/0291925 A1 | 11/2008 | Fisher et al. | |
| 2009/0018766 A1 | 1/2009 | Chen et al. | |
| 2009/0063041 A1 | 3/2009 | Hirose et al. | |
| 2009/0063048 A1 | 3/2009 | Tsuji | |
| 2009/0112462 A1 | 4/2009 | Lo | |
| 2009/0119001 A1 | 5/2009 | Moussaeiff et al. | |
| 2009/0171561 A1 | 7/2009 | Geelen | |
| 2009/0171575 A1 | 7/2009 | Kim et al. | |
| 2009/0216732 A1 | 8/2009 | Feng | |
| 2010/0017118 A1 | 1/2010 | Dougherty | |
| 2010/0070173 A1 | 3/2010 | Sakamoto | |
| 2010/0115030 A1 | 5/2010 | Hong et al. | |
| 2010/0123737 A1 | 5/2010 | Williamson et al. | |
| 2010/0125410 A1 | 5/2010 | Hicks | |
| 2010/0185386 A1 | 7/2010 | Hess | |
| 2010/0197325 A1 | 8/2010 | Dredge | |
| 2010/0201707 A1 | 8/2010 | Rasmussen et al. | |
| 2010/0211303 A1 | 8/2010 | Stanton | |
| 2010/0253549 A1 | 10/2010 | Kim et al. | |
| 2011/0010084 A1 | 1/2011 | Carlsson et al. | |
| 2011/0077853 A1 | 3/2011 | Ranford et al. | |
| 2011/0106423 A1 | 5/2011 | Morley | |
| 2011/0112759 A1 | 5/2011 | Bast et al. | |
| 2011/0130950 A1 | 6/2011 | Wexler et al. | |
| 2011/0130961 A1 | 6/2011 | Kuenzner et al. | |
| 2011/0177845 A1 | 7/2011 | Fasold | |
| 2011/0178697 A1 | 7/2011 | Mincey et al. | |
| 2011/0181620 A1 | 7/2011 | Hung | |
| 2011/0191014 A1 | 8/2011 | Feng et al. | |
| 2011/0301843 A1 | 12/2011 | Gale et al. | |
| 2012/0053830 A1 | 3/2012 | Bach | |
| 2012/0303263 A1 | 11/2012 | Alam et al. | |
| 2012/0303264 A1 | 11/2012 | Su et al. | |
| 2013/0035853 A1 | 2/2013 | Savvopoulos | |
| 2013/0041941 A1 | 2/2013 | Steinfeld | |
| 2013/0046456 A1 | 2/2013 | Schwebel | |
| 2013/0103313 A1 | 4/2013 | Moore et al. | |
| 2013/0159908 A1 | 6/2013 | Knospe | |
| 2013/0191020 A1 | 7/2013 | Emani et al. | |
| 2013/0231859 A1 | 9/2013 | Kim et al. | |
| 2013/0234868 A1 | 9/2013 | Koth | |
| 2013/0261956 A1 | 10/2013 | Marks | |
| 2013/0262222 A1 | 10/2013 | Gibson et al. | |
| 2013/0321456 A1 | 12/2013 | Hultquist et al. | |
| 2013/0322665 A1 | 12/2013 | Bennett et al. | |
| 2013/0322702 A1 | 12/2013 | Piemonte et al. | |
| 2013/0325320 A1 | 12/2013 | Dimitriadis | |
| 2013/0325340 A1 | 12/2013 | Forstall et al. | |
| 2013/0325342 A1 | 12/2013 | Pylappan et al. | |
| 2013/0326425 A1 | 12/2013 | Forstall et al. | |
| 2013/0328924 A1 | 12/2013 | Arikan et al. | |
| 2013/0344802 A1 | 12/2013 | Armour et al. | |
| 2013/0345959 A1 | 12/2013 | van Os et al. | |
| 2013/0345975 A1 | 12/2013 | Vulcano et al. | |
| 2014/0032114 A1 | 1/2014 | Titus et al. | |
| 2014/0050122 A1 | 2/2014 | Pro et al. | |
| 2014/0129135 A1 | 5/2014 | Holden et al. | |
| 2014/0129143 A1 | 5/2014 | Dave et al. | |
| 2014/0142834 A1 | 5/2014 | Maitra et al. | |
| 2014/0278071 A1 | 9/2014 | San Filippo et al. | |
| 2014/0278616 A1 | 9/2014 | Stone et al. | |
| 2014/0340421 A1 | 11/2014 | Otero et al. | |
| 2014/0343852 A1 | 11/2014 | Pech et al. | |
| 2014/0358409 A1 | 12/2014 | Khoe et al. | |
| 2014/0358410 A1 | 12/2014 | Khoe et al. | |
| 2014/0359510 A1 | 12/2014 | Graf et al. | |
| 2014/0365113 A1 | 12/2014 | McGavran et al. | |
| 2014/0365122 A1 | 12/2014 | McGavran et al. | |
| 2014/0372904 A1 | 12/2014 | Liu et al. | |
| 2015/0046083 A1 | 2/2015 | Maitra et al. | |
| 2015/0106012 A1 | 4/2015 | Kandangath et al. | |
| 2015/0160024 A1 | 6/2015 | Fowe | |
| 2015/0168148 A1 | 6/2015 | Pech et al. | |
| 2015/0170229 A1 | 6/2015 | Flier et al. | |
| 2015/0177013 A1 | 6/2015 | Siliski et al. | |
| 2015/0186414 A1 | 7/2015 | Campbell | |
| 2015/0187127 A1 | 7/2015 | Jones et al. | |
| 2015/0234529 A1 | 8/2015 | Kim et al. | |
| 2015/0253148 A1 | 9/2015 | Moore et al. | |
| 2015/0262399 A1 | 9/2015 | Popescu | |

OTHER PUBLICATIONS

Maryland Transit Administration, "Light Rail Schedule" <http://mta.maryland.gov/LRTracker/Home/TrainSchedule>.*

(56) References Cited

OTHER PUBLICATIONS

Metro METRORail Red Line Map & Schedules <http://www.ridemetro.org/pages/RedLine.aspx>.*
Metro "Schedules Bus & Rail" <http://www.ridemetro.org/pages/schedulesbusrail.aspx>.*
Author Unknown, "Transit-BEST Bus & Rail App! How to Navigate Major Cities" MrApp4That, Sep. 24, 2014, available at https://www.youtube.com/watch?v=IEjo_PWWOAQ YouTube, USA.
Non-Published Commonly Owned International Patent Application PCT/US16/35906, filed Jun. 3, 2016, 173 pages, Apple, Inc.
PCT International Search Report and Written Opinion dated Sep. 12, 2016 for commonly owned International Patent Application PCT/US16/35906, 12 pages, Apple, Inc.
Tirachini A. et al.: "Restating modal investment priority with an improved model for public transport analysis", Transportation Research Part E: Logistics and Transportation Review, Pergamon, Amsterdam, NL, vol. 46, No. 6, Nov. 1, 2010 (Nov. 1, 2010), pp. 1148-1168, XP027121542, ISSN: 1365-5545.
Bruce Nourish: "Google Maps Introduces New, Smart Transit Routing", Seattle Transit Blog, May 17, 2013 (May 17, 2013), XP002761347, Retrieved from the Internet: URL: https://seattletransitblog.com/2013/05/17/google-maps-introduces-guidebook-routing/.
Bast, Hannah, et al., "Frequency-Based Search for Public Transit", Proceedings of the 22nd ACM Sigspatial International Conference on Advances in Geographic Information Systems, Sigspatial '14, Nov. 4-7, 2014, 19 pages, ACM, Dallas/Fort Worth, USA.
Vuchic, "Role of Organization of Transfers in Transit Networks", 1992, Proceedings of the 6th World Conference on Transport Research.

\* cited by examiner

MAP APPLICATION WITH TRANSIT NAVIGATION MODE

CLAIM OF BENEFIT TO PRIOR APPLICATIONS

This application claims the benefit of U.S. Provisional Patent Application 62/172,206, filed Jun. 7, 2015; U.S. Provisional Patent Application 62/172,209, filed Jun. 7, 2015; U.S. Provisional Patent Application 62/172,214, filed Jun. 7, 2015; and U.S. Provisional Patent Application 62/172,216, filed Jun. 7, 2015. U.S. Provisional Patent Applications 62/172,206, 62/172,209, 62/172,214, and 62/172,216 are incorporated herein by reference.

BACKGROUND

With proliferation of mobile devices such as smartphones, users are enjoying numerous applications of numerous kinds that can be run on their devices. One popular type of such applications is mapping and navigation applications that allow users to browse maps and receive route directions. Despite their popularity, these mapping and navigation applications have yet to provide a comprehensive and efficient transit routing and navigation system.

BRIEF SUMMARY

Some embodiments of the invention provide a map application that provides a comprehensive and efficient transit navigation modality for planning a transit trip by browsing and selecting a transit route and navigating the selected transit route. The map application of some embodiments operates in a map-browsing mode to allow a user to browse a map of a locality and to perform searches for map locations based on addresses, names (e.g., people, businesses, etc.) or other search parameters. The map application of some such embodiments also has a navigation mode that includes a driving navigation mode to provide driving navigation directions, a walking navigation mode to provide walking navigation directions, and a transit navigation mode to provide transit navigation directions.

The map application of some embodiments, upon receiving a request to display a route in transit mode, identifies one or more transit routes between two locations and displays the best possible transit route among the identified routes to the user. Specifically, to identify the transit routes, the application of some embodiments examines different transit legs that one or more transit vehicles of one or more transit systems travel from locations near a specified starting location (e.g., the current location of the device) to locations near a specified destination. In some embodiments, each transit leg of a transit route includes a section of the transit route that is traveled by a transit vehicle of a transit line. A transit leg may also include a walking distance that is more than a threshold distance.

In examining the transit legs, the application of some embodiments takes into account a set of transit preferences that are customized (i.e., set or adjusted) by the user. For instance, in some embodiments, a user may adjust the date and time of the departure (from, e.g., the current location of the user) to a particular date and time instead of the current time. Conversely, the user may prefer a particular type of transit vehicle (i.e., a transit vehicle of a particular transit system) over the other types. For example, the user might rather ride a subway train over a bus for a particular transit leg of a transit route, or use only ground transportation for an entire transit route (e.g., a transit route without any ferry trips).

In some embodiments, when a user customizes the set of user preferences (e.g., in a custom display area), the customized preferences will not change until the user modifies the preferences again. In some embodiments, some of the customized preferences (e.g., transit vehicle settings) do not change, while other preferences (e.g., temporal settings) change after passage of a certain amount of time. In some embodiments, the set of user preferences changes back to a default mode when (1) the user chooses to view all of the possible available transit routes between two particular locations, and (2) no available route can be identified between the two locations using the current preferences. When no transit route is available to be displayed with the current settings of the user preferences, some embodiments provide a particular selectable user interface (UI) control to the user. Selection of this particular UI control directs the map application to (1) examine all possible legs traveled by different transit vehicles of different types between the two locations, and (2) when one or more transit routes are identified between the two locations, display these routes to the user.

Based on the examination of the transit legs, the map application identifies one or more transit routes that use one or more transit vehicles of one or more transit systems in some embodiments. The identified transit routes may also include one or more pedestrian routes that are between the different transit legs, between the starting location and the first transit leg, and between the last transit leg and the destination location. After identifying the transit routes, the map application selects one of the identified transit routes based on a set of criteria (e.g., fastest route, shortest route, route with least amount of walking, route requiring least amount of transit vehicle changes, route requiring least amount of transit system changes, etc.). In some embodiments, the set of selection criteria relies on two or more selection parameters. Also, in some embodiments, the set of selection criteria is different in different transit markets and/or in different time periods in the same transit market.

The map application of some embodiments displays the best identified route in its entirety over a portion of a map presentation of a geographical area. The application of some such embodiments displays the identified route in multiple sections (transit legs) each of which is traveled by a transit vehicle of a particular transit line. The map application uses different graphical representations for different portions of a displayed transit route that are traveled by different types of transit vehicles or require walking.

In some embodiments, the different types of transit vehicles that are presented by different graphical representations include buses, subway trains, rail trains (e.g., light rail trains and heavy rail trains), and ferries. Each of these four categories may include multiple different subcategories in some embodiments and additional transit categories (e.g., tramways, trolleys, etc.) may be present in some embodiments. When the selected transit route includes multiple transit vehicles of the same type (same transit system), each transit vehicle of the same transit system is distinguished from the other transit vehicles by a different line of the transit vehicle.

When the map application of some embodiments is unable to identify any transit route between the two locations (the specified starting location and the destination location), the application provides a feature that enables integration with third-party routing applications available on or for the device. In some embodiments, the map application does not detect any transit service between a starting location and a destination location when there is no transit system data available for the particular geographical area between the two locations. Some embodiments are unable to identify a transit route when, although transit data is available for the geographical area, none of the available transit service providers provides transit service in the area at the particular date and time of the request.

As described above, the map application of some embodiments, after identifying the transit routes, ranks the identified routes based on a set of criteria (e.g., quickness of the route, shortness of the route, least number of change of transit vehicles, etc.). The map application then rearranges the ranked transit routes based on a set of real time incident data received from one or more dedicated servers or through social media networks (e.g., Facebook, Twitter, etc.) or other types of private and public networks. That is, before displaying the highest ranked transit route to the user, the application of some embodiments requests for real time traffic data (e.g., any potential incident) that can affect the identified routes.

The map application displays an incident report in one or more display areas of the application's user interface. The displayed incident report indicates why the currently displayed transit route is selected as the best route by the map application when the settings in the predefined set of criteria and the user preferences dictated otherwise. The incident report may also include any incident (e.g., car accident, road work, etc.) occurred along the currently displayed transit route. Some embodiments display an estimated time of arrival at the destination (e.g., a searched location) in the display area of the incident report when (1) there is no specific reason for selection of the currently displayed route as the best route other than the settings in the predefined set of criteria and the user preferences, and (2) there is no incident occurred along the currently displayed route.

In some embodiments, the incidents are characterized as either blocking incidents or non-blocking incidents. Some embodiments categorize an incident as a blocking incident when the incident causes the route, to which the incident is attached, almost unusable. Some such embodiments categorize the incident as a blocking incident, when the incident causes the transit leg to which it is attached (i.e., along which it has occurred) unusable for more than a threshold amount of time. When a blocking incident is attached to a transit leg of a particular transit route, that particular transit route cannot be selected to replace a currently selected and displayed transit route. In other words, when a blocking incident has occurred along a particular identified transit route between two locations, even though the particular route is displayed to the user as one of the identified routes (e.g., in form of a route summary presentation), the route cannot be selected by the user to replace another selected route. Conversely, when a non-blocking incident is attached to a transit route (i.e., to a transit leg of the transit route) the transit route is still selectable and can replace the currently selected and displayed transit route.

The map application of some embodiments provides a route summary representation for the different identified transit routes in different display areas of the application UI. For instance the application provides a route summary presentation in the route planning display area where the best selected transit route is displayed to the user. The application also provides a list of route summary presentations for all the identified transit routes upon a request for displaying such (e.g., upon selection of a UI control for requesting additional routes). Each route summary presentation may include a different representation for each transit vehicle for each leg of the transit route, along with the line of the transit vehicle and a walking person representation for a walking (pedestrian) leg of the transit route when the walking distance is more than a threshold distance.

In some embodiments, when a user selects a presentation of a route summary (e.g., by placing, pointing, or tapping a finger on the presentation on a touch sensitive display screen of the device, clicking on the presentation, etc.), the map application provides a list view (e.g., a navigation list view) of the transit route that provides a list of detailed instructions on how to navigate the transit route. In some embodiments, each leg of the transit route that is traveled by a transit vehicle corresponds to a pair of navigation instructions in the list view.

More specifically, in some embodiments, for each leg of the transit route that is associated with a different transit vehicle, a first instruction sets forth the name of the transit station (e.g., bus stop, subway station, ferry terminal, etc.) to board the transit vehicle and the second instruction indicates the name of the transit station to exit the transit vehicle. Some other embodiments display all the instructions related to a transit leg in one navigation instruction. Some embodiments also provide a navigation instruction for each walking portion (between the stations, from the departure point to the first station, and from the last station to the destination) of the transit route.

Some embodiments provide a user interface for presenting different types of detailed information about a point of interest (POI). The POI can be a particular transit station or any other place for which a user may seek information (e.g., a hotel, a famous place, etc.). These information displays are referred to as placecards in some embodiments. The POI placecard for many types of non-transit station POIs provides a scrollable display area that includes different sections for displaying images of the POI as well as different types of information about the POI. The different types of information in some embodiments include general information about the selected POI (e.g., address, photos, ratings, etc.) as well as different types of transit vehicles that are accessible from the POI (e.g., transit stations that are in the vicinity of the POI).

In addition to providing transit information for a selected point of interest, the map application of some embodiments provides detailed transit information for a particular transit station when the particular transit station is selected (e.g., by selecting a transit station representation on a map view). The transit station placecard of some embodiments includes various information about the selected transit station (e.g., name and address of the transit station, etc.) as well as different transit lines' departure schedules from the transit station.

The information about the departure schedule of the transit lines may include a trip heading which shows in which direction the transit vehicles of the line depart from the station, a set of transit lines under each trip heading, and one or more departure times for each transit line that is listed under the trip heading. The format in which the departure times are displayed, in some embodiments, depends on the frequency category of the transit line under which the transit vehicle is listed. That is, some embodiments categorize the transit lines of a transit route into two categories of high frequency transit lines and low frequency transit lines. Depending on the category of the transit line, the map application displays the departure time of the transit vehicles of that line in a different format.

The map application of some embodiments uses direction labels (e.g., received from a mapping service running on one or more dedicated servers) in order to display trip headings (departure directions) of different transit lines. In some embodiments, a mapping service that provides traffic routes and data (including transit data) to the map application, labels the directions in which different transit vehicles travel with terms other than the customary cardinal and/or ordinal directions (e.g., south, northwest, etc.). In some embodiments these local directional terms often represent names of particular locations (e.g., Uptown, Downtown, Union Station, Transamerica, etc.) that are used in different localities for different directions. As such, the same label (local directional term) can be used as a trip heading for two transit vehicles that travel in different (e.g., opposite) directions but towards a same location and/or place. In addition, a single transit line in the same cardinal direction may have different labels in different localities.

In order to label the directions, the mapping service of some embodiments divides a scheduled route of a transit vehicle that begins from a first transit station (e.g., a bus terminus as the starting station, etc.) and ends at the last transit station, into different geographical areas. The mapping service then identifies a local directional term that is used in each geographical area's division (i.e., in each separated locality) for the direction in which the transit vehicle travels. That is, the mapping service identifies a local directional term that is used in each locality for the traditional cardinal direction in which the transit vehicle travels.

As described above, in some embodiments, different transit lines of a transit route are categorized into two categories of high frequency transit lines and low frequency transit lines. In some such embodiments a first transit line (e.g., a first bus line) can be categorized as a low frequency transit line at a particular transit station, while a second different transit line (e.g., a second bus line) can be categorized as a high frequency transit line at the particular transit station. Conversely, in some embodiments, a transit line can be categorized as a high frequency transit line at a particular transit station during a first time period (e.g., on even days of the week, in the mornings, between two particular hours, etc.), while the same transit line can be categorized as a low frequency transit line at the same particular station but during a second different time period (e.g., on odd days of the week, in the evenings, between two particular hours, etc.).

The map application of some embodiments treats the high frequency transit lines differently than the low frequency transit lines. For example, the application presents the departure times of high frequency transit vehicles in a first manner while it presents the departure times of low frequency transit vehicles in a second different manner in different display areas of the UI of the application. Additionally, the application of some embodiments classifies high frequency transit lines into different classes and presents the frequency of departure for each class differently. Characterizing the transit lines as high frequency transit lines and low frequency transit lines and computing the frequency of departures of a particular transit line are done by a mapping service that runs on one or more dedicated servers in some embodiments.

In order to determine the frequency of departures of a transit line from a transit station during a particular time period, the mapping service of some embodiments first determines whether the transit vehicles of the line depart from the transit station on average at least once during a certain time period (e.g., every 30 minutes for at least 2 hours). This certain time period can be different in different areas or for different transit lines of the same or different transit systems. When the mapping service of some such embodiments determines that the vehicles of the transit line depart at least once during the certain time period, the service categorizes the transit vehicles of the line as high frequency transit vehicles. The mapping service then computes the frequency of departures for high frequency transit lines.

In order to compute the frequency, the mapping service of some embodiments first identifies the time intervals between each pair of departures of the transit vehicles of the line that head the same direction from the same transit station during a particular time period. The service then applies a series of mathematical functions and formulas to the identified numbers (i.e., the sequence of the gaps between the departure times) in order to calculate the frequency of departures for the line. In some embodiments the calculated departure frequency can be a value (number) that represents the exact frequency of departures (e.g., every 5 minutes), a number that represents an approximation of frequency of departures (e.g., about every 5 minutes), or a range of numbers (e.g., every 5-8 minutes). Some embodiments first determine whether an exact frequency can be used, then determine (if no exact frequency is found) whether one of a set of frequency ranges can be used, and only attempt to find an approximate frequency value if the first two options are unsuccessful.

For a high frequency transit line, the map application of some embodiments displays the departure time of the line in a frequency format. That is, the application displays the frequency of departures of the transit vehicles of the line (e.g., every 5 minutes, 5-10 minutes, etc.) from the transit station. For a low frequency transit line, however, the map application of some such embodiments displays the departure time in an absolute time format. That is the map application displays the time at which the transit vehicles of the line leave the station (e.g., at 2:30 pm, at 3:30 pm). In some embodiments, the application displays only one frequency of departures for a high frequency line (e.g., under the trip heading in a placecard), while it displays multiple departure times for the next transit vehicles of a low frequency line (e.g. the next three departure times of a train line under the trip heading of the line). Some embodiments also provide an overall transit frequency for a selected transit route. That is, some such embodiments not only provide a transit frequency for each transit leg of the route that is services by a high frequency transit line, but also provide a transit frequency for the sum of the transit legs of the route.

Additionally, the map application of some embodiments can intelligently guide the user to plan for a transit trip based on the user's location. The map application of some such embodiments first identifies the location of the device on which the application runs. The application then evaluates the distance between the device and the first transit station at which the user boards the first transit vehicle. When the application realizes that the user is far away from the transit station (e.g., farther than a threshold distance), the application displays the time by which the user should start the transit trip (i.e., the user should leave the current location towards the first transit station). On the other hand, when the user is at or near the transit station (e.g., closer than the threshold distance), the application displays the time at which the first transit vehicle of the line leaves the transit station.

In addition to displaying a navigation list view upon selection of a route summary presentation, when a user starts navigation in the transit navigation mode (e.g., by selecting a start navigation control), the map application of some embodiments provides a transit navigation presentation that displays navigation instructions for the different transit maneuvers of a transit route in a sequence of navigation banners. A transit leg refers to a portion of a transit route that starts or ends with a transit maneuver that requires a transit vehicle change or a walking portion of the transit route (i.e., between two transit vehicle portions, or at the start or end of a transit route).

The different transit maneuvers in some embodiments include boarding a transit vehicle of the transit route, exiting a transit vehicle, walking to a transit station, and walking to the destination of the transit route. Some embodiments combine the navigation instructions for two or more transit maneuvers that relate to the same transit leg. For example, some embodiments display a single navigation instruction for walking to a transit station and boarding a transit vehicle at the station. Some other embodiments, on the other hand, provide a separate navigation instruction for entering each transit station of a transit route.

In some embodiments, the map application allows a user to select and scroll through a set of navigation banners representing the different transit maneuvers of a selected transit route when the user starts the navigation presentation mode. As the user scrolls through each navigation banner (e.g., by swiping the navigation banner to the left or right), the portion of the route (e.g., a transit leg) associated with the currently in-focus navigation banner is presented to the user in a second display area. A representation of the currently displayed transit maneuver in the second display area of some embodiments is highlighted on the transit route (e.g., through color highlighting).

In some embodiments, the representation of the transit leg in the second display area (i.e., the representation of the transit leg drawn over a portion of the map that corresponds to the transit maneuver) is augmented to display more details about the transit maneuver on the map. Additionally, some embodiments prioritize road labels based on proximity to transit maneuvers and the current displayed maneuver. That is, in some embodiments, the road labels (e.g., street signs) that correspond to the transit maneuver are displayed in the second display area over a portion of the map that is related to the displayed navigation banner in the first display area.

Some embodiments provide navigation instructions (e.g., in a navigation banner) intelligently based on the position of the device. These embodiments detect the current position of the user and provide a text (and/or pictorial) instruction that is related to the current position of the user. For example, when the user is detected to be outside a transit station, some embodiments provide a text (and/or pictorial) instruction that instructs the user to "enter" the transit station. On the other hand, when the position of the user is detected to be inside the transit station, some such embodiments provide a text (and/or pictorial) instruction (e.g., in a navigation banner for the same transit leg of the route) that instructs the user to "board" the transit vehicle. Additionally, when the device's location is within one or more of the maneuver map views, the map application of some embodiments displays the device's location on the map view(s) so that the user can orient him/herself with the required transit navigation maneuvers.

The map application of some embodiment iteratively monitors the current position of the device along the transit route. In some such embodiments, when the application determines that the currently displayed navigation banner is for a transit leg that is not associated with the current location of the device, the application automatically, and without user intervention, scrolls back (or forward) the navigation banner display area and the map view display area to display the navigation banner and map view for a transit leg that is associated with the current position of the device. That is, the map application automatically changes the currently displayed banner and map view to a navigation banner and map view that are associated with a portion of the transit route that covers the current location of the device (e.g., by scrolling back or forward the intervening navigation banners and map views). The map application of these embodiments displays the new navigation banner and its corresponding maneuver map view without receiving any user interaction with the device (e.g., a touch gesture, a swipe gesture, etc.).

Before automatically scrolling the navigation banners to display the navigation banner that is associated with the current transit leg, the map application of some embodiments first determines that the application has accurately detected the current location of the device (e.g., by ascertaining that the device has enough reception to accurately determine its current position). Therefore, in some embodiments, in order for the map application to change the current transit leg's navigation banner and its corresponding map view, the application determines that (1) an accurate location of the device is identified, (2) the currently displayed banner is not associated with the current location of the device, and (3) a certain time period has passed since the currently displayed banner has been last shown to the user.

In some embodiments, the map application determines whether any of the transit legs of a selected transit route is replaceable by a second different route that is traveled by one or more other transit vehicles. In some embodiments a transit leg is replaceable by a second route when the second route runs parallel with the identified transit leg (i.e., from the same starting station to the same ending station). In some other embodiments a transit leg is replaceable by a second route when the second route and the transit leg have at least two common transit stations or two transit stations that are within a short distance of each other (e.g., within a threshold distance of each other).

In some embodiments, the one or more other transit vehicles of the second route are of the same type as the transit vehicle that travels the transit leg (i.e. the transit vehicles are from the same transit system), while in other embodiments the transit vehicles are of different types (e.g., the transit leg is traveled by a bus, while the second route is traveled by a subway train). When the map application of some embodiments determines that a transit leg of a transit route can be replaced with other routes, the map application displays the other routes to the user along with the same navigation instruction that is associated with the transit leg. That is, the navigation application displays the navigation instruction for the transit leg (e.g., in the list view, in the navigation banner, etc.) and provides the other identified routes as selectable UI items for the user to be able to modify the selected transit route.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
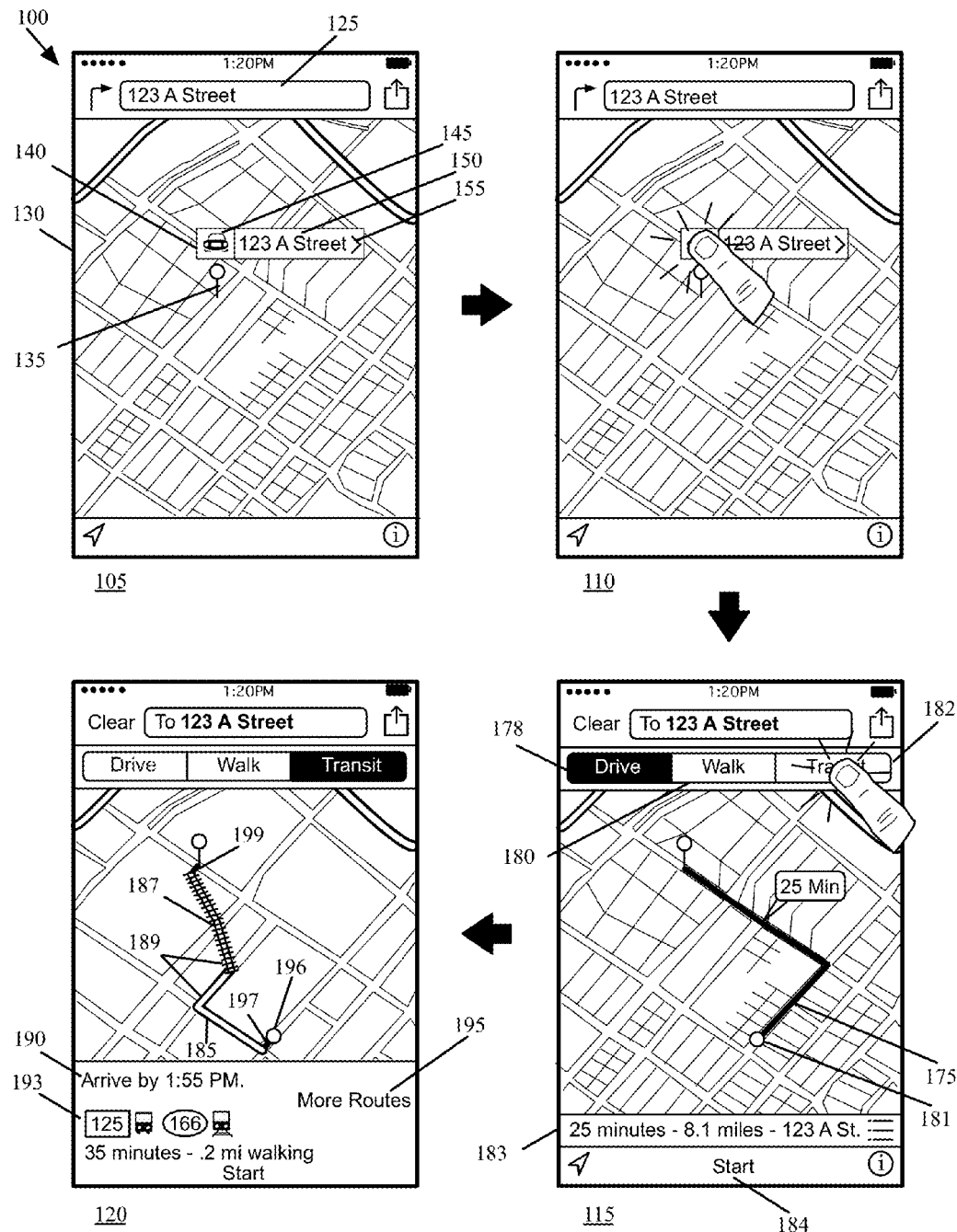
FIG. 1 illustrates how the transit navigation mode of a map application can be selected.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a map application that provides a comprehensive and efficient transit navigation modality for planning a transit trip by browsing and selecting a transit route and navigating the selected transit route. The map application of some embodiments operates in a map-browsing mode to allow a user to browse a map of a locality and to perform searches for map locations based on addresses, names (e.g., people, businesses, etc.) or other search parameters. The map application of some such embodiments also has a navigation mode that includes a driving navigation mode to provide driving navigation directions, a walking navigation mode to provide walking navigation directions, and a transit navigation mode to provide transit navigation directions.

The map application of some embodiments, upon receiving a request to display a route in transit mode, identifies one or more transit routes between two locations and displays the best possible transit route among the identified routes to the user. Specifically, to identify the transit routes, the application of some embodiments examines different transit legs that one or more transit vehicles of one or more transit systems travel from locations near a specified starting location (e.g., the current location of the device) to locations near a specified destination. In some embodiments, each transit leg of a transit route includes a section of the transit route that is traveled by a transit vehicle of a transit line. A transit leg may also include a walking distance that is more than a threshold distance.

In examining the transit legs, the application of some embodiments takes into account a set of transit preferences that are customized (i.e., set or adjusted) by the user. For instance, in some embodiments, a user may adjust the date and time of the departure (from, e.g., the current location of the user) to a particular date and time instead of the current time. Conversely, the user may prefer a particular type of transit vehicle (i.e., a transit vehicle of a particular transit system) over the other types. For example, the user might rather ride a subway train over a bus for a particular transit leg of a transit route, or use only ground transportation for an entire transit route (e.g., a transit route without any ferry trips).

Based on the examination of the transit legs, the map application identifies one or more transit routes that use one or more transit vehicles of one or more transit systems in some embodiments. The identified routes may also include one or more pedestrian routes that are between the different transit trips, between the starting location and the first transit trip, and between the last transit trip and the destination location. After identifying the transit routes, the map application selects one of the identified transit routes based on a set of criteria (e.g., fastest route, shortest route, route with least amount of walking, route requiring least amount of transit vehicle changes, route requiring least amount of transit system changes, etc.), and displays this selected route over the map presentation. In some embodiments, the selection criteria set relies on two or more selection parameters. Also, in some embodiments, the selection criteria set is different in different transit markets and/or in different time periods in the same transit market.

The map application of some embodiments displays the best identified route in its entirety over a portion of a map presentation of a geographical area. The application of some such embodiments displays the identified route in multiple sections (transit legs) each of which is traveled by a particular transit vehicle. The map application uses different graphical representations for different portions of a displayed transit route that are traveled by different types of transit vehicles or require walking. In some embodiments, the different types of transit vehicles that are presented by different graphical representations include buses, subway trains, rail trains (e.g., light rail trains and heavy rail trains), and ferries. Each of these four categories may include multiple different subcategories in some embodiments. When the selected transit route includes multiple transit vehicles of the same type (same transit system), each transit vehicle of the same transit system is distinguished from the other transit vehicles by a different line of the transit vehicle (e.g., a different subway line, a different bus line, etc.).

Several detailed embodiments of the invention are described below. Section I describes transit navigation mode of a map application of some embodiments. Section II then describes how a user can customize the route preferences in planning a transit route. Section III follows with a description of the transit placecards. Section IV describes labeling transit directions as trip headings for different localities. Section V then follows with a description of characterization of transit lines based on departure frequency and a method for computing departure frequencies. Next, Section VI describes navigating a selected transit route. Section VII describes example electronic systems with which some embodiments of the invention are implemented. Finally, Section VIII describes a map service operating environment.

I. Transit Navigation Mode

FIG. 1 illustrates a map application that provides transit navigation presentations of some embodiments of the invention. In some embodiments, the map application executes on a mobile device (e.g., a smartphone, a tablet, a laptop, etc.) with a touch-sensitive display screen. Although, all the features and concepts of the map application discussed below are equally applicable to other devices with non-touch-sensitive display screens. The map application can operate in a map-browsing mode to allow a user to browse a map of a locality and to perform searches for map locations based on addresses, names (e.g., people, businesses, etc.) or other search parameters. The application also has a navigation mode that includes a driving navigation mode to provide driving navigation directions, a walking navigation mode to provide walking navigation directions, and a transit navigation mode to provide transit navigation directions.

FIG. 1 illustrates, in four operational stages 105-120 of the user interface (UI) 100 of the map application, how the transit navigation mode of the map application can be selected by requesting for a route from the current location of the user to a searched destination. The application then displays a route that is traveled by a combination of two different transit vehicles (of two different types) between the current location of the user and the searched destination. Some embodiments provide the user with a search box to search for a particular location. The user may then enter an address of a particular place or alternatively a name of the place in the search box. When the address (or name) of the place is specified, the map application of some embodiments provides an indicator (e.g., a pin) over a presentation of the map to display the exact location of the place on the map presentation. In addition, some such embodiments display a banner (e.g., over the pin) with selectable controls for providing more information about the place.

The first stage 105 of FIG. 1 illustrates a search box 125, a map presentation area 130 that displays a map of a geographical area, a pin 135, and a banner 140. The banner 140 includes a selectable route control 145 (which is depicted as a presentation of a car), a name 150 of the searched place, and a selectable control 155 (which is depicted as a right arrow). In the search box 125, a user can enter a search parameter to search for a particular location for display in the map presentation area 130. In some embodiments, the search parameter can be an address or a name of an entity (e.g., business, organization, person, etc.), or some other parameter. When the map application can identify one or more locations for the search parameter that it receives, the map application in some embodiments (1) displays, in the presentation area 130, a map that displays some or all of the identified locations, and (2) displays a pin 135 or other location indicator for each displayed location to identify the position of the identified location. Also, in some embodiments, the map application displays a banner 140 over one of the pins 135 for providing access to more information about the location identified by the pin. The banner also provides some information about the identified location.

The first stage 105 of the figure shows that the user has entered an address in the search box 125 (123 A Street). As a result, the application displays, in the map presentation area 130, a map of a particular geographical area in which the entered address is located. This stage also shows that the application further displays (1) the pin 135 over the map presentation to identify the location of the entered address on the map and (2) the banner 140 over the pin. As shown, this banner includes the address "123 A Street," the route control 145, and the selectable control 155, which when selected causes the map application to present a display area (e.g., a placecard) that provides more information about the identified location.

The second stage 110 illustrates that the user selects the selectable route control 145 (e.g., by performing a gestural input on the touch-sensitive display screen of the device, such as tapping the user's finger on the control 145). Selection of the route control 145 causes the application to display a route overview (e.g., a driving route) from the current location of the user to the searched location (i.e., to the pin 135) over the map presented in the map presentation area 130. In some embodiments, the route control 145 is also for initiating a navigation experience. For instance, the map application of some embodiments provides one or more routes to the location of the pin from the current location of the device upon receiving a selection of the route control. When a route is selected, the map application can start operating in a navigation mode or in a route inspection mode depending on the user's next selection.

The third stage 115 shows that the displayed route 175 is laid over the region map. The third stage 115 also shows three navigation mode controls, which are the driving mode control 178, the walking mode control 180, and the transit mode control 182. Through these controls, the user can direct the map application to provide one or more driving routes, walking routes, and transit routes from the specified starting location (i.e., the device's current location in this example) to the specified destination (i.e., to 123 A Street in this example). The third stage 115 shows the driving mode control 178 highlighted to indicate that the route 175 that the application initially provides is a driving route. In some embodiments, the map application dynamically determines whether to provide an initial driving, walking, or transit route based on the distance to the destination, the locality in which the device currently operates, and the detected current mode of transportation for the device (if any).

The map application of some embodiments makes a dynamic determination for the default mode of navigation based on a set of motion data that it receives through the different sensors of the device and a set of rules that specifies the default mode of navigation under different detected conditions. For instance, the application detects the current user activity (e.g., driving, walking, biking, etc.) from motion data that some detecting sensors of the device collect and based on the determined activity, automatically sets the default navigation mode to the pedestrian mode (i.e., walking mode) or driving mode. For instance if the application determines, based on the motion data it receives from the motion sensors, that the user of the device is in a vehicle, the application sets the default navigation mode to driving mode (as illustrated in this example).

In some embodiments, the map application uses a combination of the motion data that it receives through the motion sensors, and the distance to the desired destination in order to determine which navigation mode should be the default mode. For instance, in some embodiments, the application does not set the default mode to the pedestrian mode when the destination location is not within a threshold distance (e.g., two miles) from the current position of the user even if the motion data indicate that the user is walking. Conversely, the application of some embodiments does not set the default mode to the driving mode when the destination location is within a threshold distance (e.g., 0.5 miles) from the current position of the user and the motion data indicate that the user is not driving.

The third stage also shows that for the displayed route, the map application provides information about the route in a display area 183. For instance, in the driving mode, the display area 183 displays the driving distance and duration to the destination from the current location of the device. The third stage also shows that the route-overview presentation includes a start control 184 for starting a turn-by-turn navigation experience to the destination based on the currently selected navigation mode (e.g., driving mode, walking mode, or transit mode). For example, when the map application is displaying a transit route overview presentation in the transit mode, selection of the start control 184 directs the map application to start a transit navigation presentation that provides transit navigation directions from the device's current location to the destination, which is described in great detail below in Section VI.

The third stage shows that the user selects the transit control 182 (e.g., by tapping on the tab 182) to change the navigation mode of the application from a driving navigation mode to transit navigation mode. Upon receiving this request, the map application of some embodiments identifies one or more transit routes to the specified destination, selects one of the identified transit routes as the best possible transit route based on a set of criteria, and displays the selected transit route 189, as shown in the fourth stage 120.

The map application of some embodiments, upon receiving a request to display a route in transit mode, identifies the best possible transit route among several different routes between two locations and displays the route to the user. Specifically, to identify the transit routes, the application of some embodiments examines trips that one or more transit vehicles of one or more transit systems make from locations nearby a specified starting location (e.g., the current location of the device) to locations near the specified destination. Based on this examination, the application identifies one or more transit routes that use one or more transit vehicles of one or more transit systems in some embodiments.

After identifying the transit routes, the map application then selects one of the identified transit routes based on a set of criteria (e.g., fastest route, shortest route, route with least amount of walking, route requiring least amount of transit vehicle changes, route requiring least amount of transit system changes, etc.), and displays this identified route over the map presentation in the presentation area 130. In some embodiments, the selection criteria set relies on two or more selection parameters. Also, in some embodiments, the selection criteria set is different in different transit markets and/or in different time periods in the same transit market.

Although in the descriptions above and below, the map application is identified as the performer of actions such as identification and ranking of the transit routes, in some embodiments some or all of these actions are performed by a mapping service, which then provides the results to the map application. For instance, in some embodiments the identification of different transit routes and selection of the best possible route among the identified transit routes is done by a mapping service that runs on one or more dedicated servers.

The mapping service of some embodiments is the same mapping service that provides other map browsing and navigation data (e.g., routing data, traffic data, map tiles, etc.) to the map application. In some other embodiments, the mapping service is a designated service for providing transit data to the map application. The mapping service of some embodiments receives a request for transit routes, which includes the starting and destination locations. The service then identifies a set of available transit routes based on the user preferences, ranks the identified transit routes based on a set of criteria, and returns the ranked identified transit routes to the map application. The map application then displays the highest ranked transit route as the selected transit route in the transit navigation mode to the user.

In some embodiments, the application ranks the identified routes based on the set of criteria and some other factors. For instance, the application initially ranks the identified routes with the shortest transit route having the highest ranking. The application then requests for and receives real time incident (e.g., traffic) data for the identified routes (e.g., from a set of dedicated servers, from a designated incident curator that gathers incident data from different sources, etc.). Based on the received data, the application of some embodiments rearranges the routes and ranks them again for a second time. The application then displays the highest ranked (secondary ranked) transit route in the route presentation area. In some embodiments, as discussed above, a mapping service identifies and ranks the transit routes. In some such embodiments, the mapping service requests the real time incident data from dedicated servers in order to rank the transit routes. In some embodiments, the mapping service gathers and maintains the incident data directly (e.g., through an incident curator module of the mapping service).

The fourth stage 120 illustrates that the route 175 in the previous stage 115, is now replaced by a transit route 189 as a result of selecting the transit navigation mode as the operational mode of the application. The preferred criterion in this example is the least amount of walking and therefore the transit route shown in the figure is selected as the best transit route because it includes the minimal walking distance between the departure point, the transit stations, and the destination point.

In addition to a predefined set of criteria, the application of some embodiments selects the best possible route based on a set of transit preferences set by a user. The user in some embodiments customizes the application by setting or adjusting a set of transit preferences provided by the map application. For instance, in some embodiments, a user may adjust the date and time of the departure to a particular date and time instead of the current time. In some embodiments, the user may prefer a particular type of transit vehicle (i.e., a transit vehicle of a particular transit system) over the other types. For example, the user might rather ride a subway train over a bus in a particular transit trip, or use only ground transportation for an entire transit route (e.g., a transit route that does not include a ferry trip). Customizing the route selection is discussed in more detail below by reference to FIGS. 9-13.

Some embodiments display the best route in its entirety over a portion of a map of a geographical area. Some such embodiments display the route in multiple sections each of which is traveled by a particular transit vehicle. In some embodiments, the map application uses different representations for different portions of a displayed transit route that are traveled by different transit vehicles or require walking. The displayed transit route in the fourth stage 120 includes two different portions 185 and 187. The first portion (leg) of the transit route (i.e., the route portion 185) is traveled by a bus, while the second portion (i.e., the route portion 187) is traveled by a subway train. The two portions are displayed by two different graphical representations (e.g., a bus route representation for the bus portion and a rail representation for the train portion) to differentiate the bus and subway portions from each other. In the discussions below, a transit leg refers to a portion of a transit route that starts or ends with a transit maneuver that requires a transit vehicle change or a walking portion with a minimum threshold distance in a transit route.

In the illustrated example, two small walking portions 197 and 199 are also displayed. Specifically, the walking portion 197 represents the walking distance from the current location of the device (user) 196 to the first transit station (i.e., the first bus stop of the transit route). The second walking portion 199 represents the walking distance from the last transit station (i.e., the last subway station of the transit route) to the destination location. Although these walking portions are part of the path that the user of the device travels to reach the destination, as will be discussed in more detail below, they are not considered as separate legs of the transit route in some embodiments. Some such embodiments identify a walking portion of a transit route as a transit leg of the route only if the walking distance is equal to or more than a threshold length (e.g., more than half a mile, more than one mile, etc.). Any walking portions less than the threshold will not be identified as a walking leg of the transit route in these embodiments.

In some embodiments, the different types of transit vehicles that are presented by different graphical representations include buses, subway trains, rail trains (e.g., light rail trains and heavy rail trains), and ferries. Each of these four categories may include multiple different subcategories in some embodiments. For example, the bus category may include single-deckers, double-deckers, rigid buses, articulated buses, etc. that are provided by the same or different bus service providers. As another example, a light rail train may include many different types of city trains such as streetcars, trams, trolleys, etc. that are provided by the same or different light rail service providers. Additionally, the best route may include multiple transit vehicles of the same type (same transit system) in some embodiments. In such a case, each transit vehicle of the same transit system is distinguished from the other transit vehicles by a different line of the transit vehicle. For example a transit route may include three different bus legs that are serviced by three buses of three different bus lines.

Figure 5:
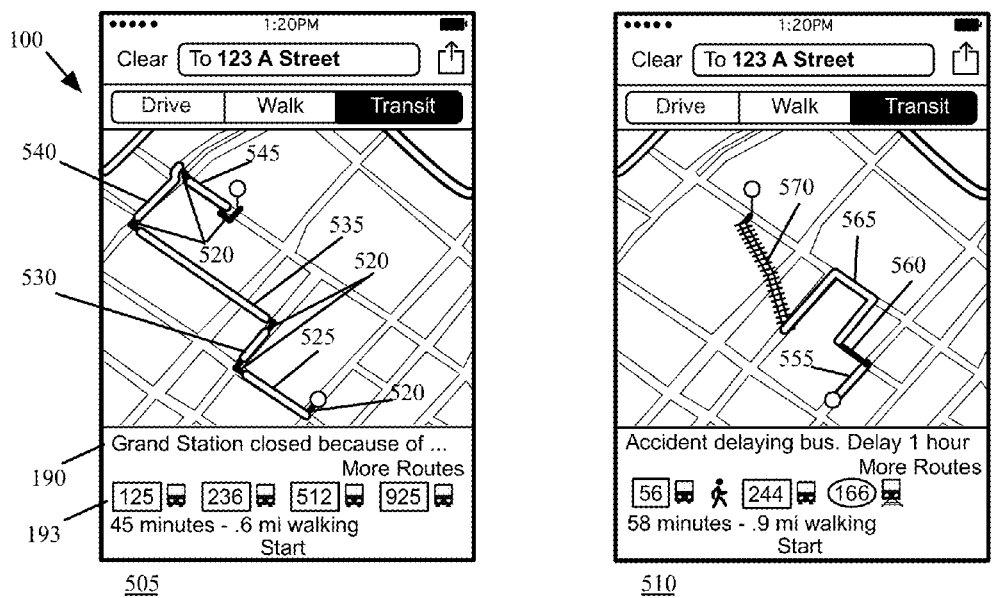
FIG. 5 illustrates the incident display area displaying three different messages, in three different examples, for three different conditions related to the displayed transit route.
Figure 5:
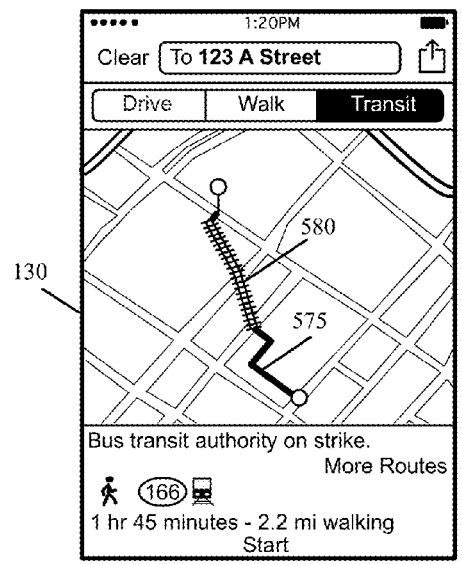
Figure 24:
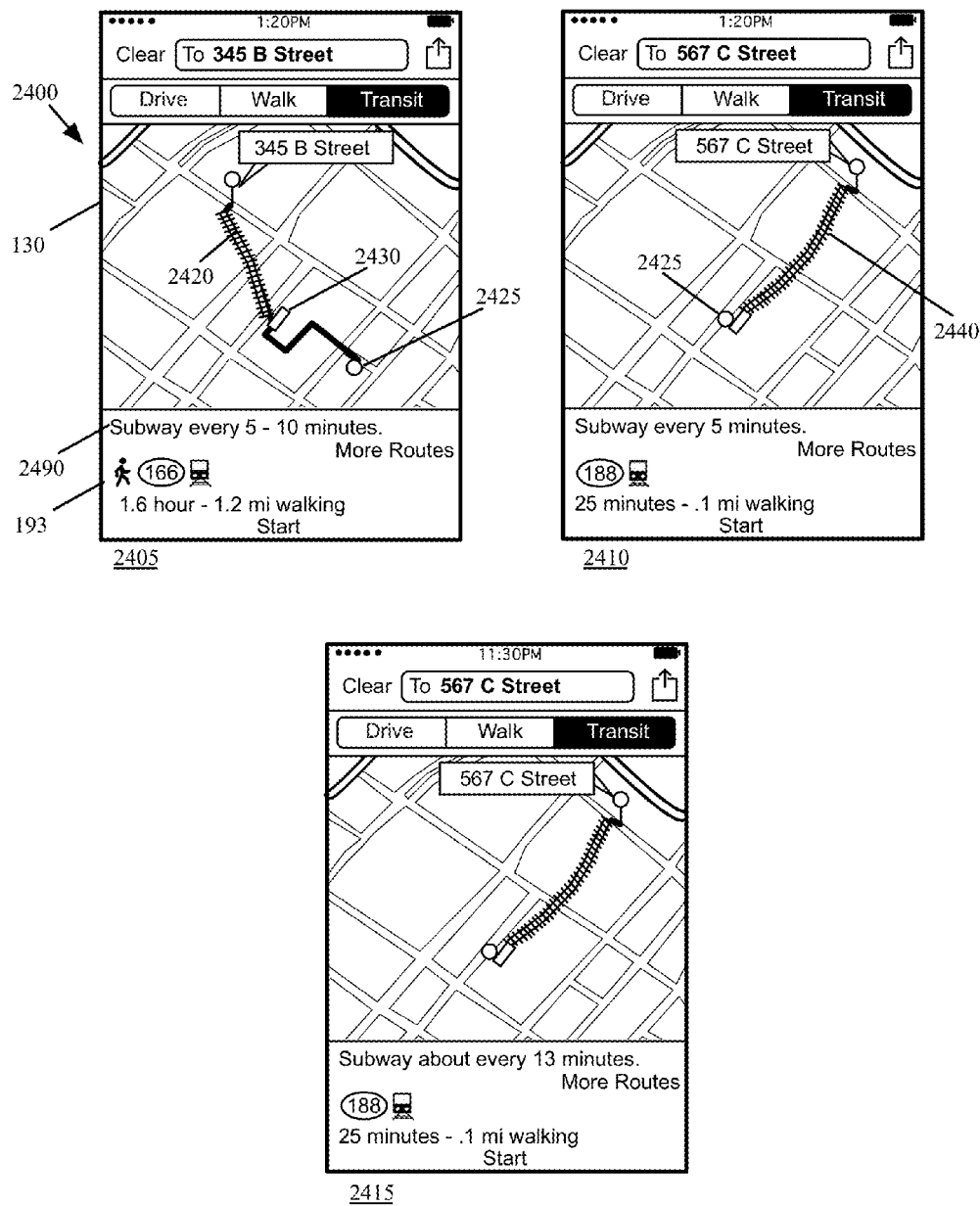
FIG. 24 illustrates the UI of the map application of some embodiments that displays the departure schedule of a subway train from a subway station in terms of three different examples.
Figure 25:
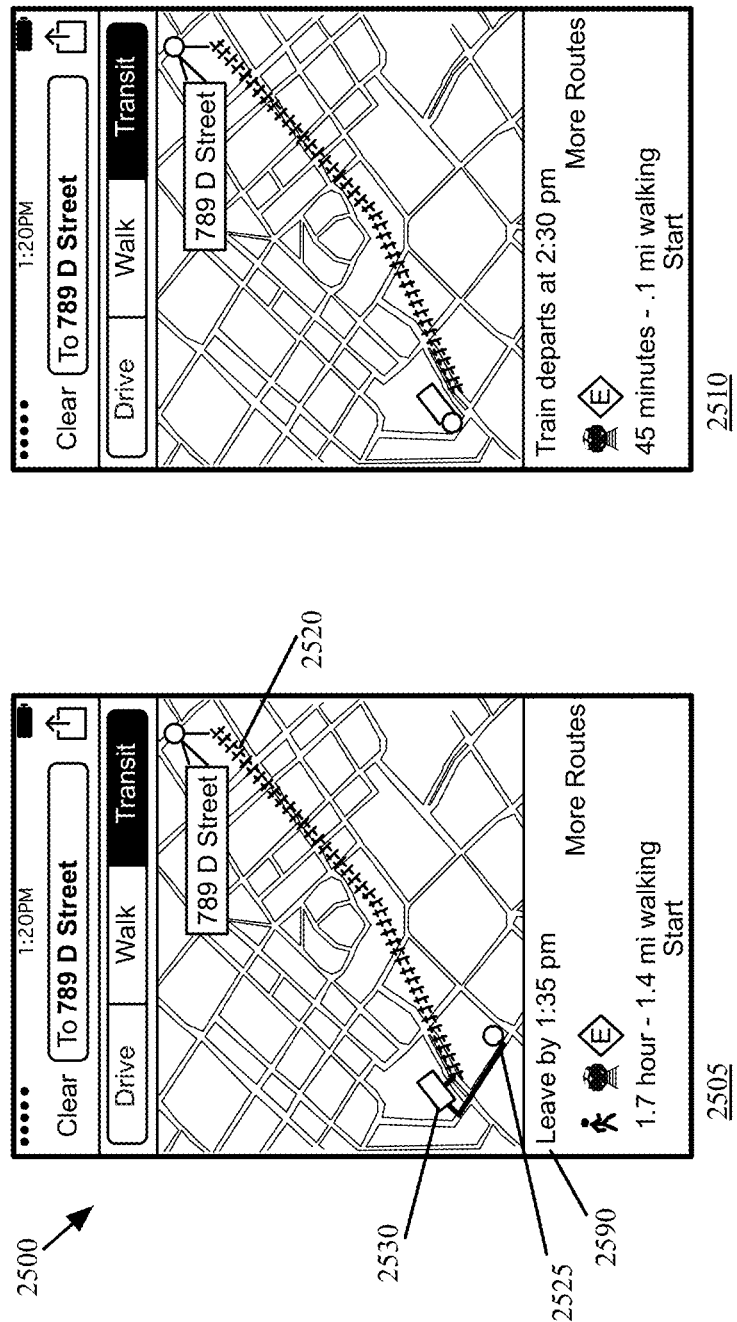
FIG. 25 illustrates the UI of the map application of some embodiments that displays the departure schedule of a train (e.g., a light rail train) from a train station in terms of two different examples.

The display area 183 of the third stage 115 is divided in the fourth stage 120 into two display areas 190 and 193. The incident display area 190 currently shows the arrival time at the destination. However, this display area, as described in more detail below by reference to FIGS. 5, 24, and 25, is also for displaying various other transit information that can help the user to plan the transit trip more easily. A few examples of this additional transit information include (1) any incident that has occurred along the displayed transit route, (2) an incident that has occurred along another route which has caused the displayed route ranked better than the other route, (3) departure time or frequency of departures for the first leg of the transit route, and (4) departure frequency of the entire route.

The display area 193 is for displaying a route summary presentation for the displayed transit route. More specifically, this display area shows a different representation for each transit vehicle for each leg of the transit route along with the line of the transit vehicle. As illustrated in this example, the display area 193 currently shows a representation for a bus of the line 125 that travels the first leg of the transit route and a representation for a subway train of the line 166 that travels the second leg of the transit route.

Each representation for a transit vehicle, in the illustrated example, includes a logo that represents the type of the transit vehicle (e.g., a bus logo, a subway train logo, etc.), and a geometric shape that (1) includes the line of the transit vehicle and (2) is different for different types of transit vehicles (e.g., a rectangle for bus lines, an ellipse for subway lines, etc.). However, one of ordinary skill in the art would realize that the different types of transit vehicles could be represented in different embodiments differently. For example some embodiments provide different colors for the different representations to distinguish them from each other while other embodiments provide different graphical shapes that represent different types of transit vehicles.

The fourth stage 120 also shows a selectable More Routes control 195 for showing more routes. As discussed above, the displayed transit route is the best transit route that the application selects among a set of different routes based on a set of different criteria as well as a set of user preferences. Selecting the control 195 causes the application to show the other routes in the set of different routes in a separate display area, as will be discussed in further detail below by reference to FIGS. 7-8.

As described above, the map application of some embodiments, upon receiving a request to display a route in transit mode, identifies the best possible transit route among several different routes between two locations and displays the transit route to the user (the identification, is some embodiments, may be performed by a map service that exchange transit and other traffic and map data with the map application). In order to do so, the application of some embodiments examines transit trips that one or more transit vehicles of one or more transit systems make from locations near the current device's location to locations near the specified destination. Based on this examination, the application identifies one or more transit routes that use one or more transit vehicles of one or more transit systems in some embodiments.

However, when the map application of some embodiments is unable to identify any transit route between the two locations, the map application provides a feature that enables integration with third-party routing applications available on or for the device. In some embodiments, the map application does not detect any transit service between a starting location and a destination location when there is no transit system data available for the particular geographical area between the two locations. Some embodiments are unable to identify a transit route when, although transit data is available for the geographical area, none of the available transit service providers provides transit service in the area at the particular date and time of the request. Some embodiments do not identify any transit route between the two locations for other reasons.

When the map application of some embodiments does not identify a transit route between the start and end locations, the application provides the user with a list of relevant third-party routing applications. In some embodiments, the map application displays the relevant routing applications in two different sections (display areas)—a first section for relevant routing applications that are installed on the device and a second different section for relevant routing applications that are available but have not been installed on the device yet. The user may then select one of the displayed third-party routing applications in the list to provide route directions or select an available routing application to install and then provide route directions. More information about deployment of third-party routing applications by the map application of some embodiments is further described in U.S. Pat. No. 9,043,150, issued on May 26, 2015, which is incorporated herein by reference.

Figure 2:
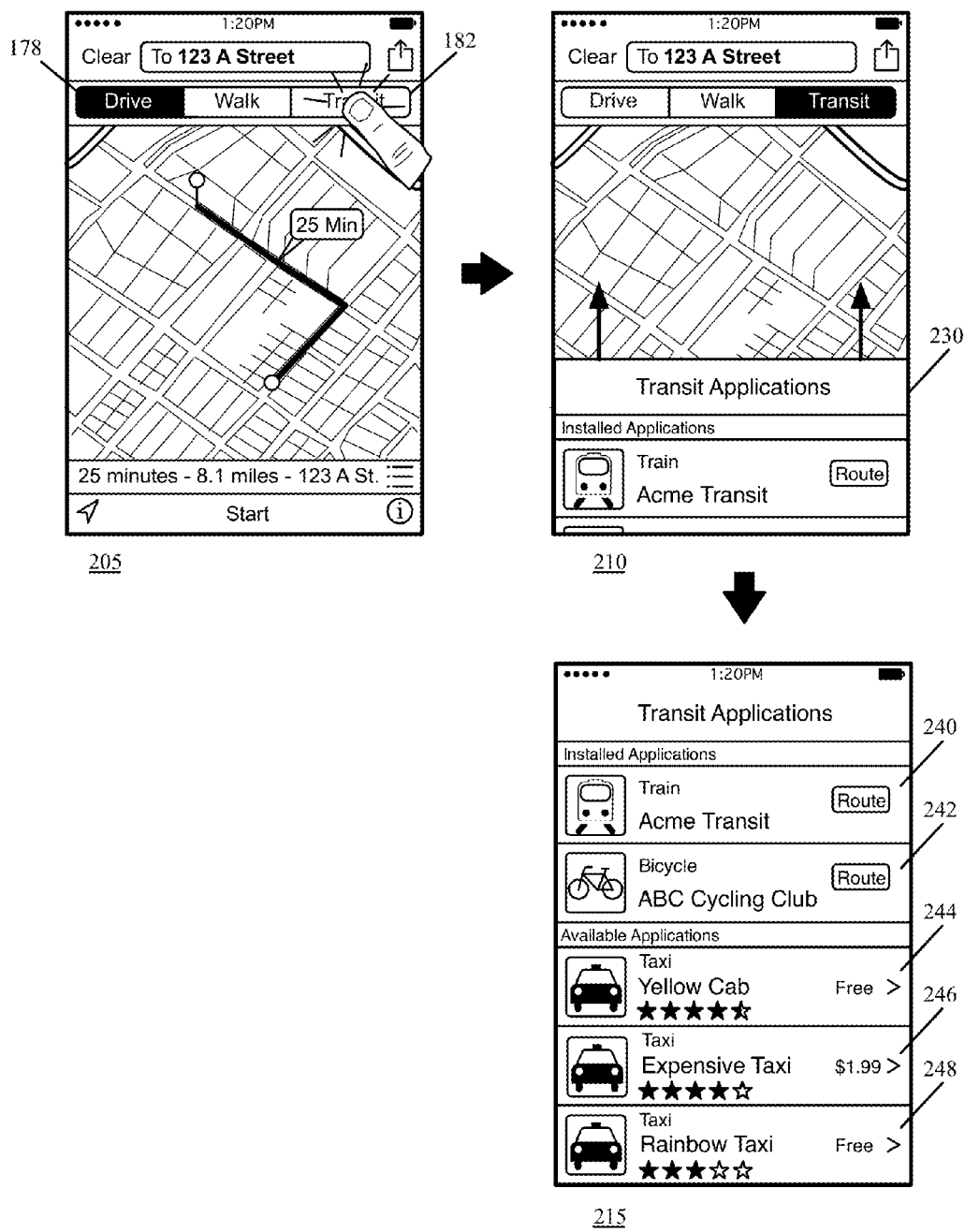
FIG. 2 illustrates the map application of some embodiments providing third-party routing applications when no transit route is identified between two particular locations.

FIG. 2 illustrates the map application of some embodiments providing third-party routing applications when no transit route is identified between two particular locations of a geographical area. Specifically, this figure illustrates, through three operational stages 205-215, a user selecting the transit control 182 to view a transit route between the current location of the device and the destination location. The first stage 205 shows the same map application UI as in the third stage 115 of FIG. 1.

The first stage 205 shows the driving mode control 178 highlighted to indicate that the highlighted route on the map is a driving route. This stage also shows that for the displayed route, the map application provides information about the route such as the driving distance and duration to the destination from the current location of the device. The first stage 205 also shows that the user selects the transit control 182 (e.g., by tapping on the tab 182) to change the navigation mode of the application from a driving navigation mode to transit navigation mode. Upon receiving this request, the map application of some embodiments identifies one or more transit routes to the specified destination based on a set of user preferences, selects one of the identified transit routes as the best possible transit route based on a set of criteria, and displays the selected transit route.

The second stage 210 shows that the device is unable to identify any transit route between the current location of the device and the specified destination. In some embodiments, when the map application is unable to identify a transit route between the specified locations, the application informs the user (e.g., by showing a message in a pop-up display area) of such and provides selectable UI control to the user that gives the user the options to see the available third-party routing applications or cancel the request for a transit route altogether. In some other embodiments, the map application automatically provides a third-party routing application display area to the user when the application realizes that no transit data is available for the requested geographical area. The second stage 210 shows that the application automatically scrolls a new third-party display area 230 into the display screen of the device to replace the currently displayed UI of the map application.

The third stage 215 shows that the third-party routing application display area 230 has taken over the UI of the mapping application. As illustrated, this display area is displaying the third-party routing application interface. The third-party routing application interface includes a section (the upper section in this example) for displaying a list of routing applications that are already installed on the device on which the map application is executing, and another section (the lower section in this example) for displaying a list of routing applications that are available for installation on the device.

As shown in the third stage 215, the upper section of the third-party routing application interface is displaying graphical representations 240 and 242 of third-party routing applications that are already installed on the device. Each graphical representation includes an icon associated with a corresponding application, a description of the type of application (e.g., a train application, a bicycle application, a taxi application, a hiking trail application, etc.), the name of the application, and a selectable UI item (e.g., a Route button) for launching the application to provide route directions.

In addition, the application that corresponds to each of the graphical representations 240 and 242 is capable of providing route directions between the start and end locations specified in the first stage 205. In some embodiments, the map application ranks the identified, installed third-party routing applications based on a set of factors and displays the applications in the ranked order. Examples of factors that may be considered include the popularity of the application (e.g., the number of downloads, ratings, rating score, etc.), the frequency at which local and/or remote users send route directions to the application, the size of the geographical area (e.g., large areas ranked lower), the user rating of the application, etc.

At the third stage 215, the lower section of the third-party routing application interface is displaying graphical representations 244-248 of third-party routing applications that are available for installation on the device. Each graphical representation includes an icon associated with a corresponding application, a description of the type of application, the name of the application, a user rating of the application, a price to pay, if any, in order to install the application, and a selectable UI item (e.g., a right arrow) for displaying a product page associated with the application. For this example, the application that corresponds to each of the graphical representations 244-248 is capable of providing route directions between the start and end locations specified in the first stage 205. The user can then either select one of the installed applications to receive routing directions, or alternatively select one of the available third-party routing applications and use it after installing the application.

Figure 3:
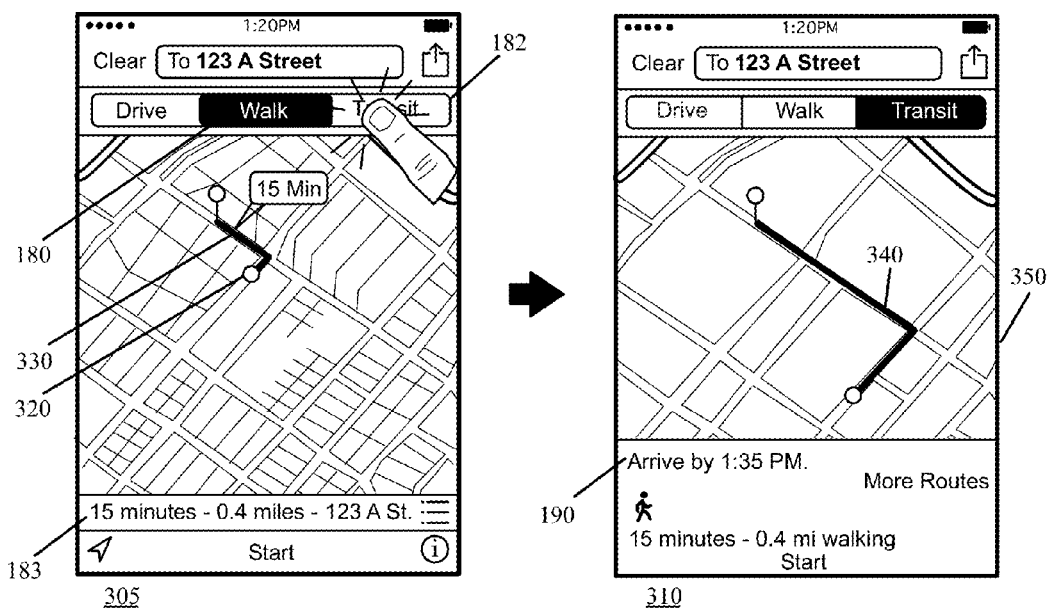
FIG. 3 illustrates an example of providing transit navigation based on the distance to the destination.

FIG. 3 illustrates an example of providing transit navigation based on the distance to the destination. Specifically, this figure illustrates in terms of two operational stages 305 and 310, that the transit application of some embodiments does not provide a transit vehicle route to the destination when the current position of the device is within a threshold distance of the destination. In some embodiments, when the application determines that the user is within a threshold distance to the destination (e.g., within one mile), the application provides only a walking route to the destination (assuming that there is a navigable walking route to the destination).

The first stage 305 shows the map application UI after the user has searched for an address (i.e., 123 A Street) and requested a route to the searched location from the current location 320 (e.g., through the route control 145 of FIG. 1). The UI displays a route 330 that is laid over the map presentation of a region. The first stage 305 also shows that the walking mode control 180 is highlighted which indicates that the route 330 that the application initially provides is a walking route. As described above, the map application of some embodiments uses (1) the motion data that it receives from the motion sensors of the device, and (2) the distance to the destination location in order to determine which navigation mode should be the default mode. In the illustrated example, the application has set the default mode to the pedestrian mode since the destination location is within a threshold distance (e.g., one mile) from the current position of the user.

The first stage also shows that for the displayed walking route, the map application provides information about the route in the display area 183. For instance, the display area 183 displays the walking distance to the destination is 0.4 miles and the walking duration to the destination from the current location of the device is 15 minutes. The first stage further shows that the user selects the transit control 182 (e.g., by tapping on the tab 182) to change the navigation mode of the application from the walking navigation mode to the transit navigation mode.

After selecting the transit control, the second stage 310 shows that the application displays a walking route 340 in the route presentation display area 350, as the only leg of the identified transit route. This is because the application has determined that the position of the device is within the threshold distance from the destination (i.e. 0.4 miles). As such the application does not examine any available transit vehicles in order to identify the possible transit routes between the current location and the destination location. The second stage 310 also shows that the incident display area 190 displays the time of arrival at 1:35 pm which is 15 minutes from the current time showing on the device. In some embodiments, when the destination is within the threshold distance, the map application does not send any request to the map service server for the transit route and instead, shows the walking leg. In some other embodiments, the map application sends the request to the map service application irrespective of the position of the distance to destination and the map service application determines to return the walking leg when the destination is within the threshold distance.

Figure 4:
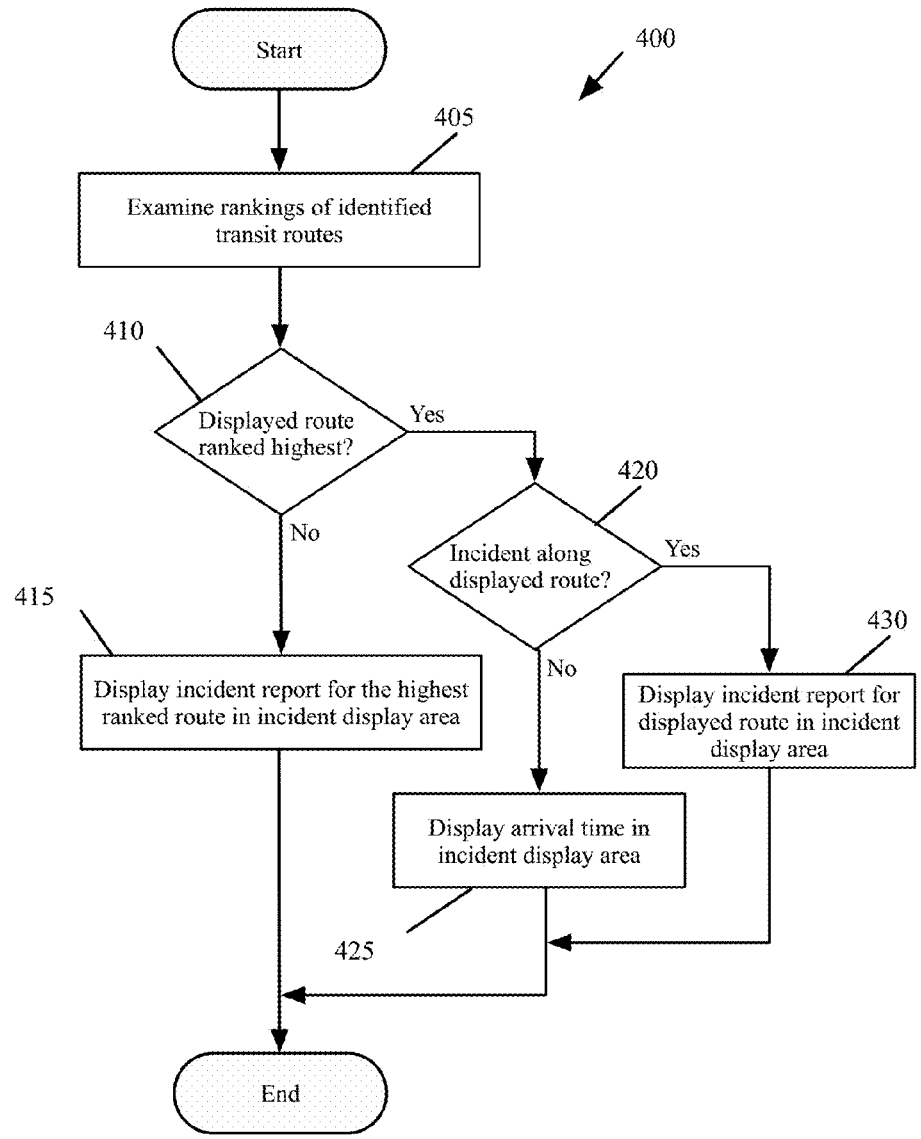
FIG. 4 conceptually illustrates a process that the map application of some embodiments performs to determine what type of transit information should be displayed in the incident display area.

As described above, the incident display area of the map application displays different useful transit information about a transit route that is selected and displayed to the user. FIG. 4 conceptually illustrates a process 400 that the map application of some embodiments performs to determine what type of transit information should be displayed in the incident display area.

The process 400 begins by examining (at 405) the identified transit routes between a departure location and a destination location. As discussed above, after a user requests for transit routes between two specific locations, some embodiments identify one or more transit routes that each uses a combination of one or more transit vehicles from locations near the first specific location (e.g., current location of the user) to locations near the second specific location (e.g., a searched location). These embodiments then rank the identified transit routes based on a set of criteria (e.g., quickness of the route, shortness of the route, least number of change of transit vehicles, etc.). The embodiments then rearrange the transit routes based on a set of real time transit data received from one or more dedicated servers or through social media networks or other types of private and public networks. That is, before displaying the highest ranked transit route to the user, these embodiments request for traffic data (e.g., any potential incident) that can affect the identified routes.

Some embodiments rank the rearranged identified routes for the second time (a secondary ranking) and display the routes based on their new rankings. This secondary ranking, however, is temporary because it can change any time based on the traffic news that the application receives in real time, whereas the original ranking is considered as primary ranking because it does not change (unless and until the transit service providers update their transit data). Therefore, the process examines the identified transit routes to assess the rankings (e.g., primary and secondary) of the routes. Some embodiments do not use a primary and secondary ranking system. Some such embodiments use a single level ranking system in which all the information (different criteria, preferences, and incidents data) are gathered at the same time and the highest ranked transit based on the gathered information is displayed.

The process then determines (at 410) whether the route that is selected to be displayed in the route presentation area of the application is the best ranked route or not. When the process determines that a higher ranked route is not selected to be displayed, the process displays (at 415) the incident report of the higher ranked route as the reason for not selecting this route to be displayed to the user. For example, when a major accident delays a first transit route that is shorter than a second transit route that is selected to be displayed, the application shows a report about the accident as the reason for not showing the first route in the route display area. The process then ends.

On the other hand, when the process determines (at 410) that the highest ranked route is selected to be displayed, the process determines (at 420) whether there is any incident that could possibly delay the selected route. That is, the process examines the received traffic data related to the different legs of the selected route to realize whether there is any incident that could affect the traffic along these legs. When the process determines that there is no incident, the process displays (at 425) the arrival time (or estimated arrival time) at the destination in the incident display area. The process then ends.

On the other hand, when the process determines that there is an incident along the displayed route that could delay the route, the process displays (at 430) the incident report in the incident display area. It should be noted that the displayed incident here which has occurred along the displayed route is different than the incident shown at operation 415. That is, the displayed incident here does not delay the route long enough to lower the ranking of the route and cause the route not to be displayed in the route presentation area. After showing the incident along the displayed route, the process ends.

Some embodiments perform variations of the process 400. The specific operations of the process 400 may not be performed in the exact order shown and described. For example, in some embodiments, the same process is responsible for ranking the route and displaying the best route as well as displaying the incident report. In other embodiments, a different process ranks the best route and the above-described process is for displaying the best route as well as the incident report (or arrival time) in the incident display area. Additionally, the process of some embodiments displays the first transit line frequency or alternatively the transit route frequency instead of, or in conjunction with, the arrival time.

In some embodiments the application displays a text in the incident display area that informs the user of a gap (that is more than a threshold distance) between two consecutive transit legs of the transit route. In yet other embodiments, the application displays the first transit line frequency, or the route frequency, along with any of the incident reports or arrival time. Additionally, the specific operations may not be performed in one continuous series of operations, and different specific operations may be performed in different embodiments.

FIG. 5 illustrates the incident display area 190 displaying three different messages, in three different examples 505-515, for three different conditions related to the displayed transit route. The incident display area 190 of the map application of some embodiments describes why the currently displayed route is selected as the best route by the map application when the settings in the predefined set of criteria and the user preferences dictated otherwise. This display area also shows a report about any incident occurred along the currently displayed route. In some embodiments, the incident display area 190 displays the estimated time of arrival at the destination (e.g., the searched location) when (1) there is no specific reason for selecting the currently displayed route as the best route other than the settings in the predefined set of criteria and the user preferences, and (2) there is no incident occurred along the currently displayed route.

In some embodiments, the map application, or a map service that exchange the transit route and other traffic and map data with the map application), receives the live incidents information from a set of servers in real time. In some embodiments, the incidents information includes information about accidents, weather, construction work, etc. that are related to one or more legs of the transit route. The incidents information can be complemented by information received from online user accounts and/or through social media websites in some embodiments. In some embodiments the information received from the different sources are first verified by a set of servers and then used by the map application.

The first example 505 shows the UI 100 in a similar state as in the stage 120 of FIG. 1 with the same starting and destination locations shown on the same map presentation. However, the combination of transit vehicles that the transit route uses in the figure is different. More specifically, the map presentation area 130 in this example shows that the transit route includes five different legs that are depicted by five bus route representations 525-545. Although the representation for each portion of the transit route is similar to the other representations, the representation for each portion is separated from the other representations because each bus in the illustrated example belongs to a different bus line. Each portion of the transit route is connected to the other portion by a walking portion that is presented by walk representations 520.

The first example 505 also shows the route summary display area 193 displaying different representations for different transit vehicles of different lines. As shown, the display area 193 displays a bus of the line 125 that travels along the route presentation 525, a bus of the line 236 that travels along the route presentation 530, a bus of the line 512 that travels along the route presentation 535, and a bus of the line 925 that travels along the route presentation 540. Although the last leg of the transit route (i.e., the bus that travels along the route representation 545) is not shown in this example, as it will be discussed below, a user can scroll (e.g., by swiping) through the display area 193 to view the rest of the information. It is also important to note that since the walking distances between the different transit vehicle stations (the bus stops in this figure) are shorter than a threshold distance, there is no walking representation in between the transit vehicle representations in this display area. The display area 193 also displays that the total travel time is 45 minutes and the total walking distance to reach the destination is 0.6 miles.

The first example 505 further shows that the incident display area 190 displays that the Grand Station is currently closed. Similar to display area 193, the incident display area 190 is scrollable in some embodiments and a user can scroll through this display area to view the rest of the information about the incident. A user, by looking at the incident display area, can quickly realize that although a transit route that includes the Grand Station could be shorter than the currently displayed route, because the Grand station is now closed, the application has selected the second best route as the currently displayed route (even though it has more changes of transit vehicles and more total travel distance and total travel time).

The second example 510 shows that the incident display area 190 displays that an accident is delaying a bus line (e.g., the bus line 125 depicted in the fourth stage of FIG. 1) and therefore a different route is selected and shown in the map presentation area as the best current transit route. As shown in the map presentation area 130, the best identified transit route now includes two different bus legs 555 and 565, a walking leg 560, and a subway leg 570. This is also displayed in the route summary display area 193 which displays a bus representation for the bus of the line 56 that travels the leg 555, a walking person representation for the walking leg 560, a bus representation for the bus of the line 166 that travels the leg 565, and a subway train representation that travels the leg 570 of the transit route (from subway line 166). This display area also shows that the total trip time is now 58 minutes which involves 0.9 miles of walking in total.

The third example 515 shows that the incident display area 190 displays the bus transit authority is currently on a strike and as a result no bus of any line is available to participate in a transit route. Consequently, the best transit route at the moment is the transit route that is drawn over the map presentation in the map presentation area. As shown in the map presentation area 130, the best identified transit route between the same starting location and destination location now includes a walking leg 575 and a subway leg 580. This is also displayed in the route summary display area 193 which displays a walking person representation for the walking leg 575 and a subway train representation that travels the leg 580 of this transit route. The display area 193 in this example also shows that the total trip time is now 1 hour and 45 minutes which involves a total walking distance of 2.2 miles.

The above examples are only three examples of messages that some embodiments of the invention display in the incident display area. One of ordinary skill in the art will realize that there can be many other forms of messages that can be shown by other embodiments. For example, some embodiments display, in the incident display area, a message that warns the user of a gap between two consecutive legs of the transit route. That is, some such embodiments display a message in this display area when the embodiments determine that between a last transit station of a transit leg and the first transit station of the next transit leg there is a gap (e.g., a distance that is more than a threshold) that is not traveled by any transit vehicle of any transit line for which the embodiments have transit data.

Figure 6:
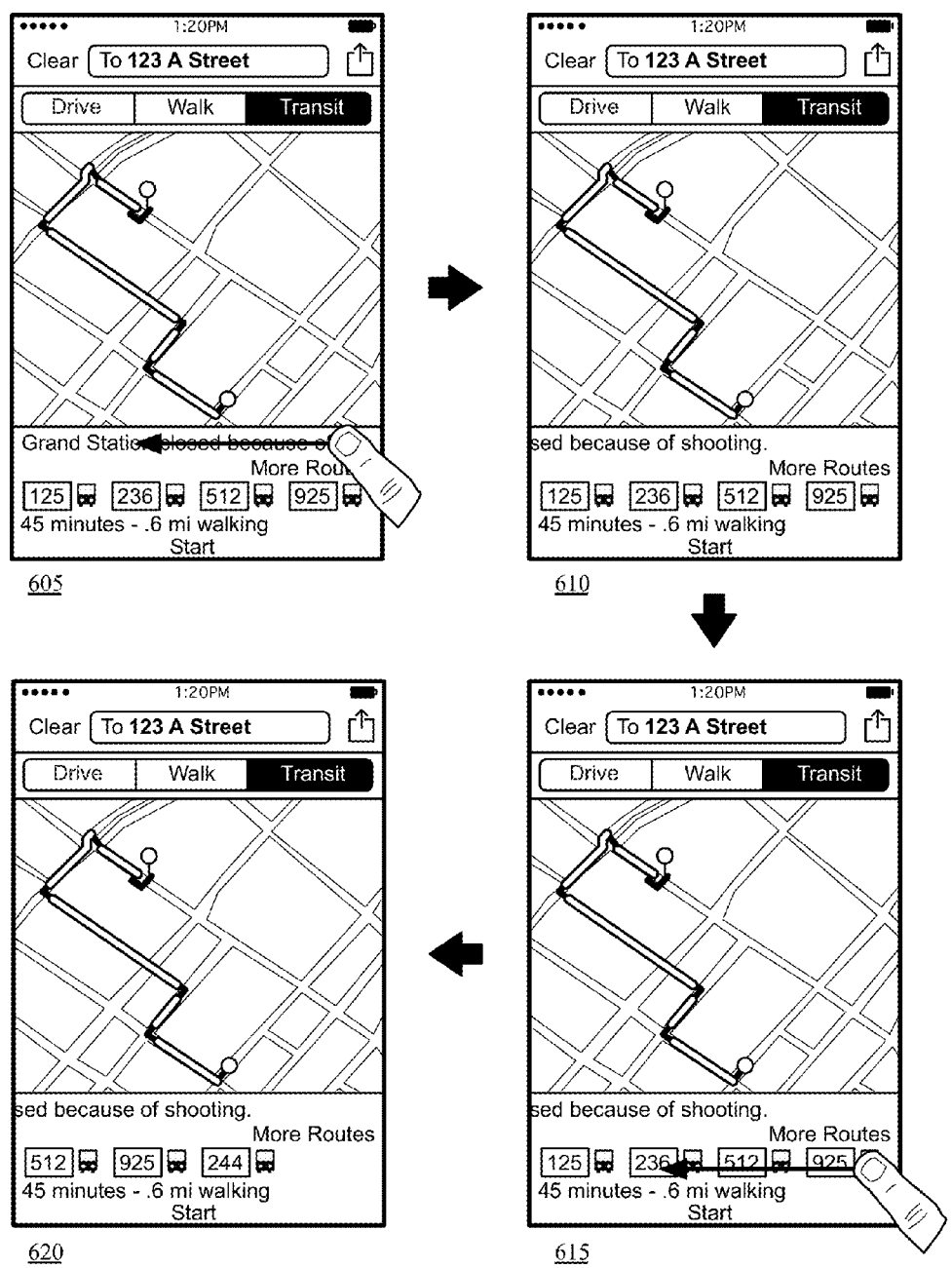
FIG. 6 illustrates how a user can scroll through the different display areas of a map application UI in order to view the whole information provided in these display areas.

FIG. 6 illustrates how a user can scroll through the different display areas of a map application UI in order to view the whole information provided in these display areas. More specifically, this figure shows a user scrolling through the incident display area 190 and the route summary display area 193 in four different stages 605-620. The user scrolls through these display areas to view the rest of the information that does not fit in the display screen of the device. In some embodiments a user can swipe through the information by contacting the display area (e.g., touching the display area on the touch-sensitive display screen of the device by user's finger), in which the displayed information is incomplete, and dragging the user's finger to the left for the display area to scroll to the left and appearance of the rest of the content, or alternatively, dragging the finger to the right for the display area to scroll to the right.

The first stage 605 shows the same UI of the map application as in the first stage 505 of FIG. 5, in which the incident display area 190 displayed incomplete information (i.e., "Grand Station closed because of . . . "). At stage 605, however, the user is swiping through the display area to read the rest of the information. That is, the user is swiping the user's finger on the display area to the left in order to scroll the content in from the right and view the rest of the information. The next stage 610 shows that the display area 190 now displays the rest of the information to the user. More specifically, this stage shows that the incident display area displays the remaining portion of the incident report, which states the reason for closure of the Grand Station (i.e., a shooting has occurred at the Grand Station). Some embodiments rather than scrolling through the incident information, use multiple lines to display all the incident information at once.

The third stage 615 shows the same UI of the map application as in the first stage 605. However, at this stage, instead of swiping through the incident display area 190, the user is swiping through the route summary display area 193 to show the rest of the route summary. That is, the user is swiping the user's finger on the display area to the left in order to scroll the content in from the right and view the rest of the information. As described in the previous figure, while five different transit vehicle representations are shown on the map presentation, the route summary display area can only fit in four of the bus representations that cover the first four routes drawn on the map presentation. The next stage 620 shows that the display area 193 now displays the rest of the route summary which includes a bus line representation for the last leg (545) of the trip.

As described above, upon receiving a request for transit navigation mode, the map application of some embodiments identifies one or more transit routes to the specified destination, selects one of the identified transit routes as the best possible transit route based on a set of criteria, and displays the selected transit route. The identification of transit routes and selection of the best route, as described, is performed by a mapping service that provides map and transit data to the map application in some embodiments. To identify the transit routes, the application of some embodiments examines trips that one or more transit vehicles of one or more transit systems make from locations nearby the current device's location to locations near the specified destination. Although the map application identifies and displays the best route among several identified routes, the user of the map application of some embodiments is able to view and select the other identified routes as well. In some embodiments, the user can change the best displayed route with one of the other identified transit routes between the starting location and the destination location.

Figure 7:
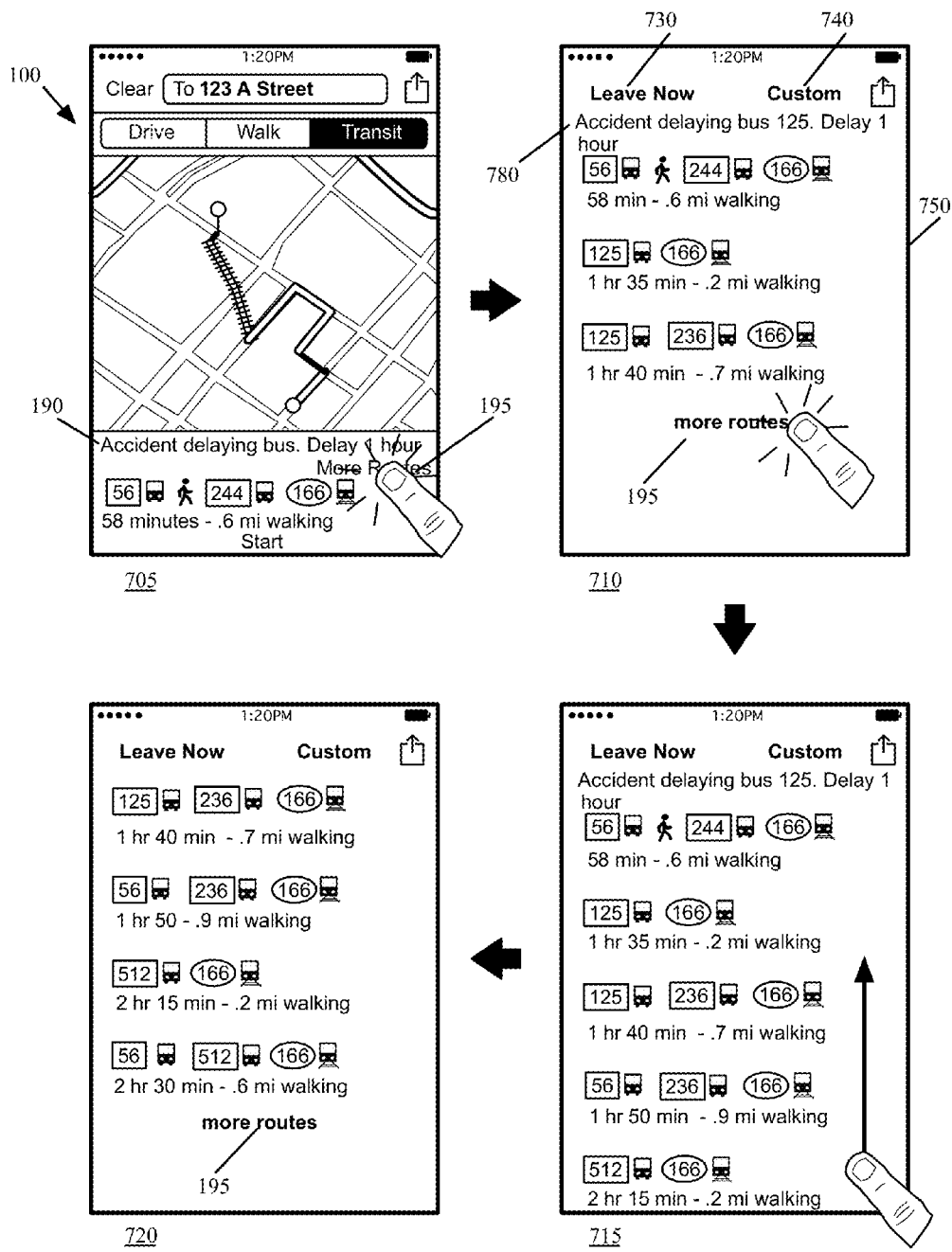
FIG. 7 illustrates a user selecting the More Routes control to view the other identified transit routes between the current location of the device and the destination location.

FIG. 7 illustrates in terms of four operational stages 705-720 of the map application UI 100, a user selecting the More Routes control 195 to view the other identified transit routes between the current location of the device and the destination location. The first stage 705 shows the same map application UI of the second example 510 of FIG. 5 except that in this stage 705, the user is selecting the More Routes control 195 (e.g., by tapping on the UI control 195). This stage shows that the incident display area 190 displays that an accident is delaying a bus line (e.g., the bus line 125 depicted in the fourth stage of FIG. 1) and therefore the currently displayed route is selected as the best transit route at the moment.

The second stage 710 illustrates that selection of the control 195 directs the map application to provide a separate display area 750 in order to display the additional identified transit routes. As described above, the identified available transit routes in some embodiments are ranked based on a set of criteria (e.g., the quickest route, the shortest route, etc.) and the initially displayed route is the highest ranked transit route among the identified routes. In the illustrated example, the criterion of ranking the transit routes is the shortest trip duration. Therefore, in this example, the displayed route is a transit route with trip duration of 58 minutes.

After selection of the control 195, the second stage 710 shows that the more routes display area 750 now displays two additional route summary presentations besides the initially displayed route summary presentation that was displayed in the first stage. This stage also shows that the incident report 780 is shown at the top of the display area and before the route summary presentation. In some embodiments, the incident report shown in the more routes display area is a more complete version of the incident report displayed in the route planning display area (i.e., the route presentation display area 130 of the first stage). As illustrated, the route summary now shows that the accident has occurred in the bus leg (bus line 125) of the second transit route and consequently this transit route, because of the delay, is now the second best route among the identified routes.

The three transit route summary presentations are shown in the more routes display area 750 based on their rankings (i.e., sorted from the shortest trip duration to the longest trip duration). Although not shown, some embodiments display additional information in the display area 750 for each route summary presentation. For example, some embodiments display, in front of route summary presentation, departure time or frequency of departures of the first transit line in the corresponding route summary. Alternatively, or conjunctively, some such embodiments display the departure frequency of the entire route for each route summary. Other embodiments display other information such as an incident report for each route summary (if there is any).

The second stage 710 also shows two more selectable UI controls which are the Leave Now UI control 730 and Custom UI control 740. This stage further shows a More Routes control 195 that is displayed at the end of the current route summary presentations. Selection of the Leave Now UI control 730 in some embodiments directs the map application to (1) change all the customized temporal settings to the current date and time and (2) return to displaying the UI of the map application in the first stage 705. In some other embodiments, selection of the UI control 730 directs the map application to only change all the customized temporal settings to the current date and time. Selection of the Custom UI control 740, as will be discussed in more detail below in FIG. 9, directs the map application of some embodiment to provide a custom display area for modifying a set of user preferences.

In some embodiments, the map application provides a More Routes UI control 195 in the display area 750 after it shows a specific number of transit routes in this display area (e.g., after each three transit routes). This stage also shows that the user selects the UI control 195 to view even more identified routes. The third stage 715 shows that as a result of selection of the control 195 in the more routes display area 750, two more available route summary presentations with lower rankings (i.e., higher trip duration) are displayed in the display area 750. This stage also shows that the user scrolls the display area up to show additional transit routes that did not fit in the display screen of the device.

The fourth stage 720 shows that the display area is scrolled up and is now displaying all the three new transit route summary presentations. This stage also shows that at the end of the displayed transit routes, the More Routes control 195 is displayed again for viewing the next additional transit routes (if any). This stage also shows that the incident report 780 is not displayed in the more routes display area as a result of scrolling the route summaries. However, in some embodiments, the incident report 780 always stays on top of the more routes display area even after scrolling the transit routes. Some embodiments display three additional routes each time the control 195 is selected. Moreover, although not shown, some embodiments provide additional selectable UI controls for interaction with the displayed route summaries. For example, some embodiments display a Share control next to each route summary presentation for sharing the corresponding route summary with one or more other persons.

Figure 8:
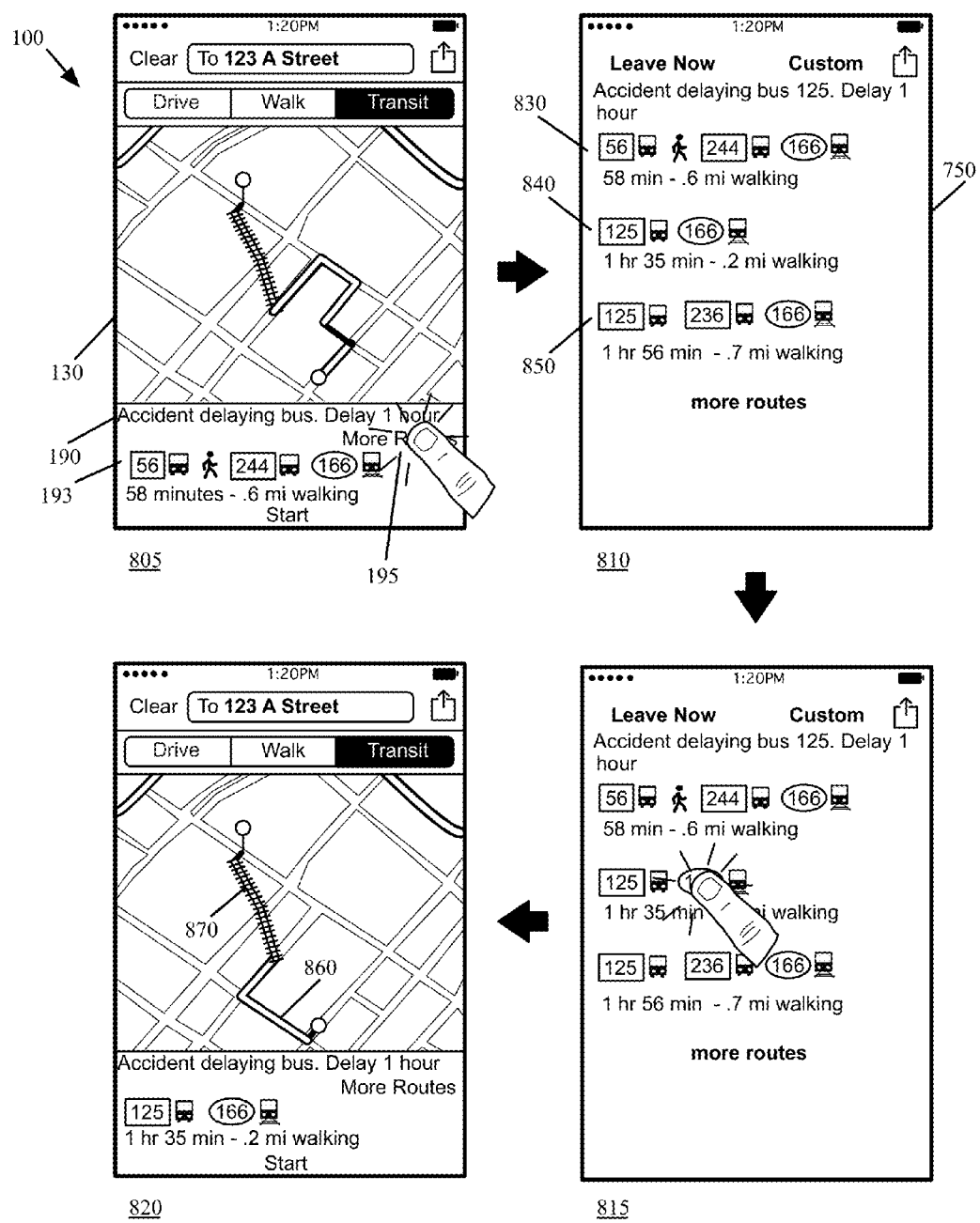
FIG. 8 illustrates an example of replacing a displayed transit route with another identified route between the current location of the device and a destination location.

FIG. 8 illustrates an example of replacing a displayed transit route with another identified route between the current location of the device and a destination location. More specifically, this figure shows, through four operational stages 805-820 of the map application UI 100, a user selecting the More Routes control 195 to view the other identified transit routes between the two locations and selecting one of the other available transit routes to replace the currently selected and displayed transit route.

The first and second stages 805 and 810 are identical to the first and second stages 705-710 of FIG. 7. More specifically, the first and second stages 805 and 810 show that the user selects the More Route control 195 to view the other identified transit routes and upon selection of this control, the map application provides the more routes display area 750 which displays the initially displayed transit route summary presentation 830 along with two additional transit route summary presentations 840 and 850. The three transit routes, as described above, are ranked and sorted based on the total duration of the trip in each transit route. Also the incident report in the display area 750 shows that the second route 840 which could have been the best route is delayed because of an accident and as such it is ranked second now in the list.

The third stage 815 shows that the user selects the transit route summary presentation 840 (e.g., by tapping on the route summary presentation 840) even though the incident report is showing an accident along the bus line 125 of that transit route. As a result, the fourth stage 820 shows that the originally displayed route 830 that was displayed in the map presentation area 130, is now replaced by the selected route 840 which includes a bus route representation 860 and a subway route representation 870. This stage also shows that the information in the route summary display area 193 is updated with the information of the newly selected route. That is, the display area 193 now displays the total trip duration as 1 hour and 35 minutes, which includes 0.2 miles of walking.

In some embodiments, the incidents are characterized as either blocking incidents or non-blocking incidents. Some embodiments categorize an incident as a blocking incident when the incident causes the route, to which the incident is attached, almost unusable. For example when a construction work has caused a portion of a transit route to be shut down, that construction work would be characterized as a blocking incident. Some such embodiments categorize the incident as a blocking incident, when the incident causes the transit leg to which it is attached (i.e., along which it has occurred) unusable for more than a threshold amount of time.

When a blocking incident is attached to a transit leg of a particular transit route, that particular transit route cannot be selected to replace a currently selected and displayed transit route. In other words, when a blocking incident has occurred along a particular identified transit route between two locations, even though the particular route is displayed to the user as one of the identified routes (e.g., in form of a route summary presentation), the route cannot be selected by the user to replace another selected route. For instance, in the above illustrated example, if the accident that caused the delay for bus line 125 was a type of accident that made the bus route unusable for a long time (e.g., more than a threshold period of time) the incident would be characterized as a blocking incident, in which case the user was not able to select the route in the third stage even though its corresponding route summary presentation was among the other identified route summaries.

Conversely, when a non-blocking incident is attached to a transit route (i.e., to a transit leg of the transit route) the transit route is still selectable and can replace the currently selected and displayed transit route. In the illustrated example, the accident along the bus route is a non-blocking incident and as such the user was able to select it to replace the originally selected transit route.

Lastly, the incident display area 190 is not updated because in the first stage, this display area was showing the same incident report as the reason for not displaying the route 840 as the best route in the first stage 805. In other words, in the first stage, the incident report showed the accident along the bus line 125 to indicate the reason for not choosing the transit route that included this bus line as one of its transit legs, while in the fourth stage, the incident report shows the same accident along the bus line 125 to indicate that the currently displayed route is delayed because of this accident.

II. Customizing Transit Routes

As described above, the map application of some embodiments, upon receiving a request for transit routes, examines a set of transit vehicles of the same or different types (i.e., the same or different transit systems) that are available and provide transit services between two locations. The map application of some such embodiments examines the transit services that start from locations near the current location of the device on which the map application runs (or a specified location), and end at locations near a desired destination location (e.g., a searched location). The map application (or the map service application) then identifies a set of transit routes based on such an examination and ranks the identified transit routes based on a set of criteria. However, in examining the availability of the set of transit services, the map application of some embodiments also considers a set of transit preferences that are customized by the user of the device.

Figure 9:
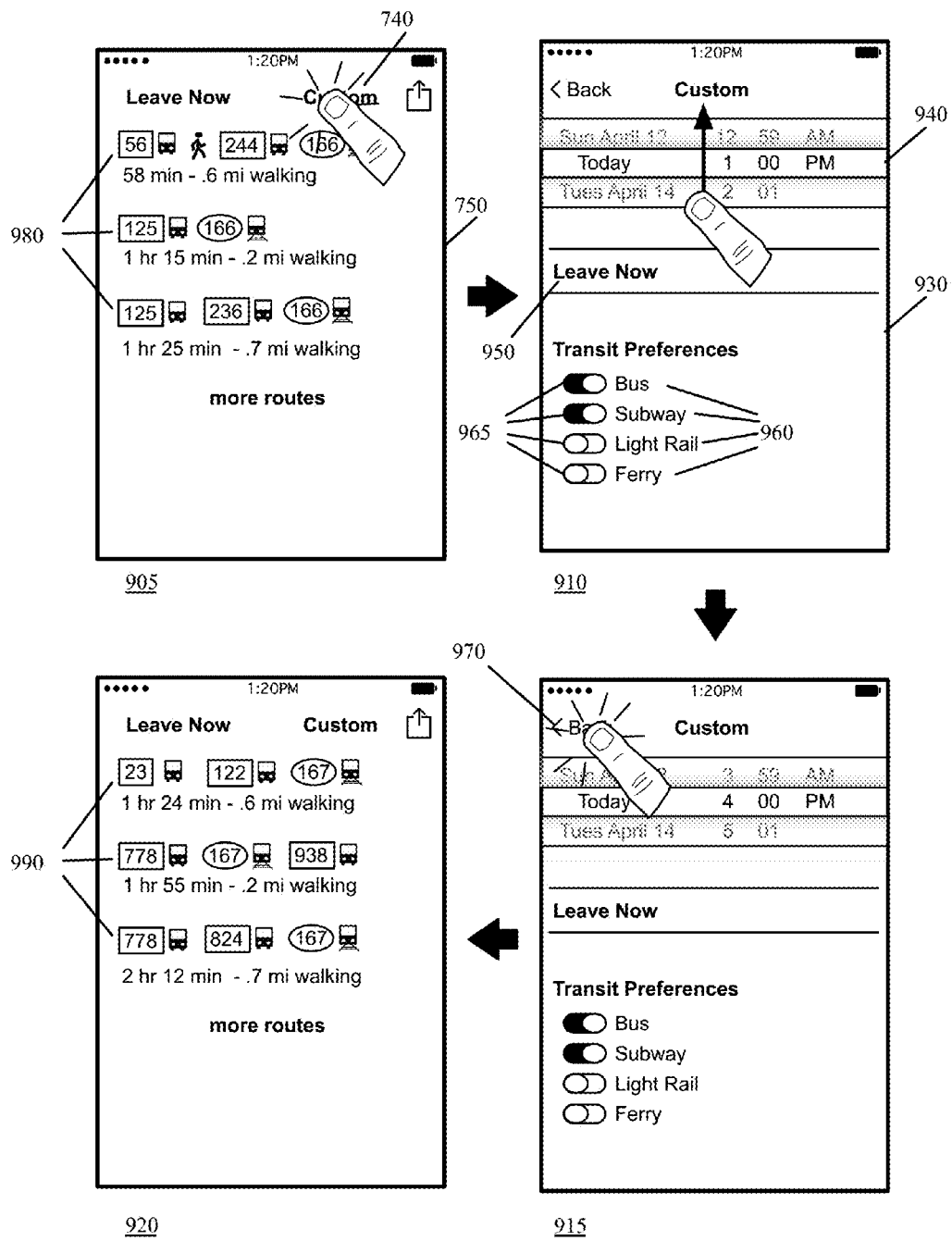
FIG. 9 illustrates an example of a custom display area provided by the map application of some embodiments in order to customize a set of transit preferences in identifying different transit routes.

FIG. 9 illustrates an example of a custom display area provided by the map application of some embodiments in order to customize a set of transit preferences is identifying different transit routes. More specifically, this figure shows, through four operational stages 905-920 of the UI of the map application, how a user can view and modify the set of user preferences that are currently set for identifying the available routes. In some embodiments, when a user customizes the set of user preferences in the custom display area, the customized preferences do not change until the user modifies them again. In some embodiments, some of the customized preferences (e.g., transit vehicle preferences) do not change, while other preferences (e.g., temporal settings) change after passage of a certain amount of time. In some embodiments, the set of user preferences changes back to a default mode when a user chooses to view all the possible available transit routes between the two locations.

The first stage 905 shows the same map application UI that was shown in the second stage 710 of FIG. 7. More specifically this stage shows that the more routes display area 750 displays a set of three route summary presentations 980 that are sorted in the display area based on their rankings (i.e., sorted from the shortest trip duration to the longest trip duration). The first stage 905 also shows that the user selects the Custom UI control 740 in order to direct the map application to provide a custom display area for modifying a set of user preferences.

The second stage 910 illustrates that the map application provides a custom display area 930 that displays the set of user preferences after the user selected the Custom UI control 740 in the previous stage. The custom display area 930 includes a temporal section 940 for viewing and changing the departure date and time, a Leave Now UI control 950, and a transit preferences section 960 for viewing and changing the type of transit vehicles (transit system) that can be used by the different transit routes. As shown in this stage, the temporal section of the display area shows that the time is currently set to the current date and time (i.e., today at 1 pm). The second stage 910 further shows four different transit system names for the four different transit systems that can be used by the transit routes. Next to each transit system name, there is a UI item 965 for enabling or disabling the corresponding transit system. A user of the application can then enable or disable one or more transit systems that can be used in the transit routes through the UI items 965.

The four different transit systems shown in the figure are bus, subway, light rail, and ferry. As described above, each of these four transit systems can include several different subcategories in some embodiments. For example, the bus category of some embodiments includes single-deckers, double-deckers, rigid buses, articulated buses, etc. provided by different bus service companies. Similarly, the light rail category of some embodiments includes streetcars, trams, trolleys, etc. provided by different light rail service companies. As shown in this stage, the set of transit systems (i.e., transit vehicle types) that should currently be used in the transit routes includes only buses and subways as only the UI items 965 corresponding to these two transit systems are enabled. The second stage also shows that the user is adjusting the time to a different time of the day.

The third stage 915 shows that the user has set the departure time to a later time in the afternoon (i.e., from 1 pm to 4 pm). In some embodiments the departure time is the time, at or after which, the first transit vehicle in the route departs from the transit station shown on the map representation. In some embodiments, the departure time is the time, at or after which, the user leaves the current location of the device or a specified starting location (e.g., the user's home). In some embodiments the departure time depends on the distance between the location of the device and the first transit station. Some such embodiments provide the first departure time of the transit line when the device is in close vicinity (i.e., within a threshold distance) or inside the transit station. These embodiments provide the time to leave the current location of the device when the device is far from the transit station (i.e., outside the threshold distance). This stage also shows that the user selects the Back UI control 970 which directs the map application to return to the previous display area (i.e., the more routes display area 750).

The fourth stage 920 shows that the set of transit route summary representations 980 has been replaced by a new set of transit route summary representations 990. This is because the map application of some embodiments, after any new change in the set of preferences, reexamines the available transit trips that start from locations near the current location or specific starting location of the device and end at locations near the destination location. The map application then identifies a new set of transit routes based on such a reexamination and ranks the identified transit routes based on the set of criteria before displaying them. In the illustrated example, the map application (or the map service) examines the available routes after the change of time and realizes that some particular transit vehicles (all of the transit vehicles in this example) that were used by the transit routes are not available at the new temporal settings. As such, the map application identifies a new set of transit vehicles that are available at the newly set departure date and time.

Additionally as described above, in some embodiments, some of the customized preferences do not change while other preferences change after passage of a certain amount of time. In some embodiments, when a user changes the date and time of the departure to a desired new time, the map application modifies the date and time after passage of certain number of hours if the desired time is still not reached. In some other embodiments, the map application does not modify the customized date and time until the date and time lapses.

Figure 10:
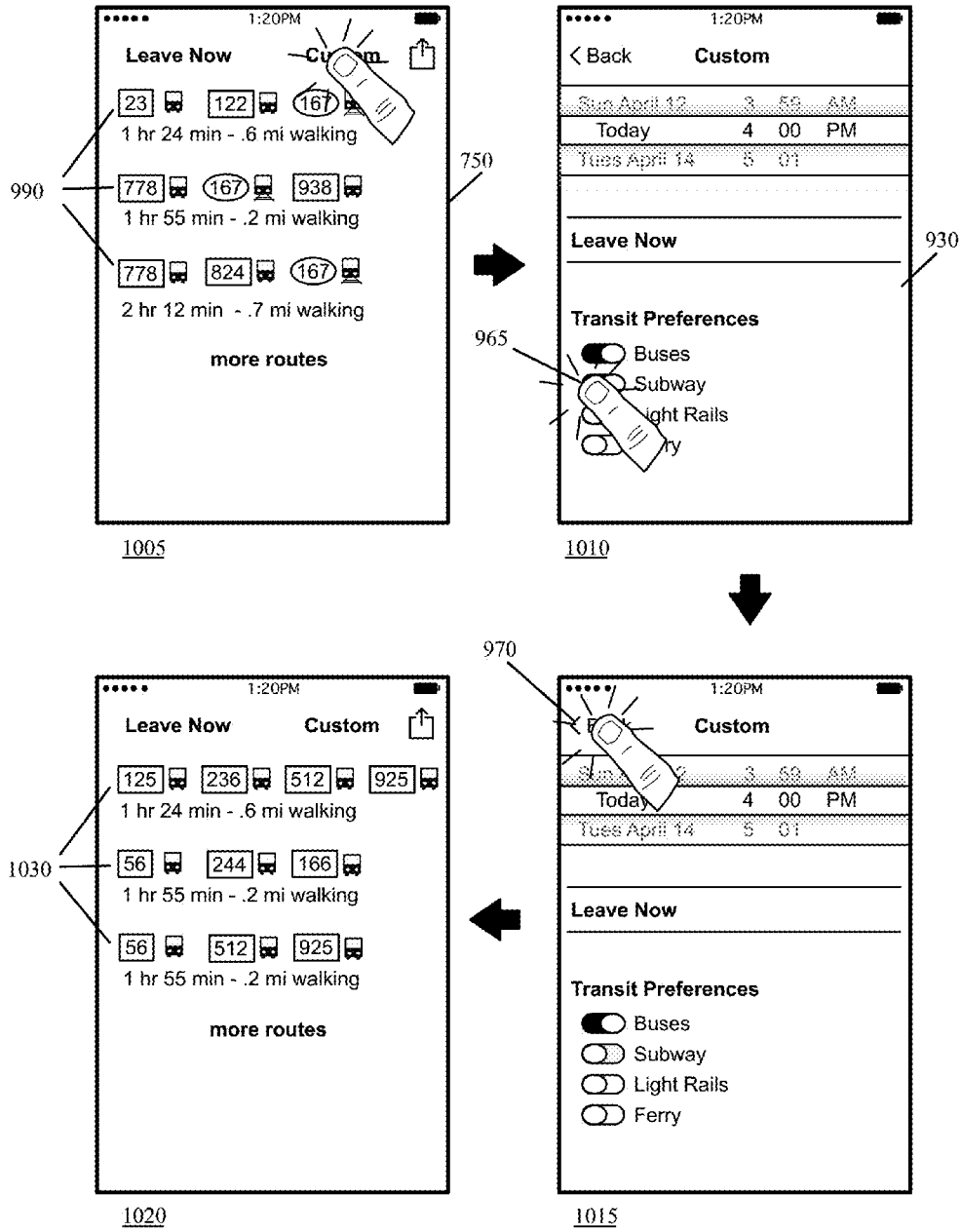
FIG. 10 illustrates another example of customizing a set of transit preferences in the custom display area.

FIG. 10 illustrates another example of customizing a set of transit preferences in the custom display area. More specifically, this figure shows how a user can view and modify the types of transit systems for which the application will provide transit routes to the user through four operational stages 1005-1020 of the UI of the map application. The first stage 1005 shows a similar UI to the UI displayed in the last stage 920 of FIG. 9. This stage further shows a set of transit route summary representations 990 in the more routes display area 750 and that the user is selecting the Custom UI control.

The second stage 1010 also shows a similar custom display area 930 as in the third stage of FIG. 9, except that in this stage, the user interacts with one of the UI controls 965 that is associated with the subway system under the transit vehicle type section. More specifically, the user disables the subway system through the UI control 965 (e.g., by tapping on the control, by dragging the control to the left, etc.).

The third stage 1015 of the figure shows that as a result of deselecting the subway, three of the four transit vehicle types (i.e., subway, light rail, and ferry) are now disabled and the only transit vehicle type that is enabled is the bus system. As described above, in some embodiments, when a user customizes the set of transit vehicle types, the customization remains the same until the user makes additional changes to the transit vehicle types. For instance, as long as the user doesn't change any of the transit vehicle types shown at this stage, for each subsequent transit route identification, the map application only identifies transit routes that use buses as their transit vehicles. This stage also shows that the user selects the Back control 970 (e.g., by tapping on the control) to view the previous display area.

The fourth stage 1020 shows that the set of transit route summary representations 990 has been replaced by a new set of transit route summary representations 1030. This is because after any new change in the set of preferences, the map application reexamines the available transit trips that start from locations near the current location of the device and end at locations near the destination location. The map application then identifies a new set of transit routes based on such a reexamination and ranks the identified transit routes based on the set of criteria before displaying them. In the illustrated example, the map application examines the available routes after the user disables the subway system. As such, all routes that use a subway for one or more portions (transit legs) in the set of transit summary routes 990 are replaced by transit routes that do not use subway system. As indicated in the new route summary representations 1030, all of the route summaries include only buses as the transit vehicles of the routes.

As discussed above, when the map application of some embodiments is not able to find any available transit route between two locations due to the settings of the user preferences, the application allows the user to change the settings back to default settings so that the application can examine all possible combinations of transit vehicles of different transit systems. The map application of some such embodiments provides such an option to the user when no routes are available using only the user's preferred transit vehicles.

The selection of this option enables the user to view the available transit routes between the two locations without having to return to the custom screen to change the preferences again. As discussed above, some embodiments determine whether any other route is available first and then provide an option to the user to switch all transit vehicle preferences to the default preferences (i.e., including all types of transit vehicles).

Figure 11:
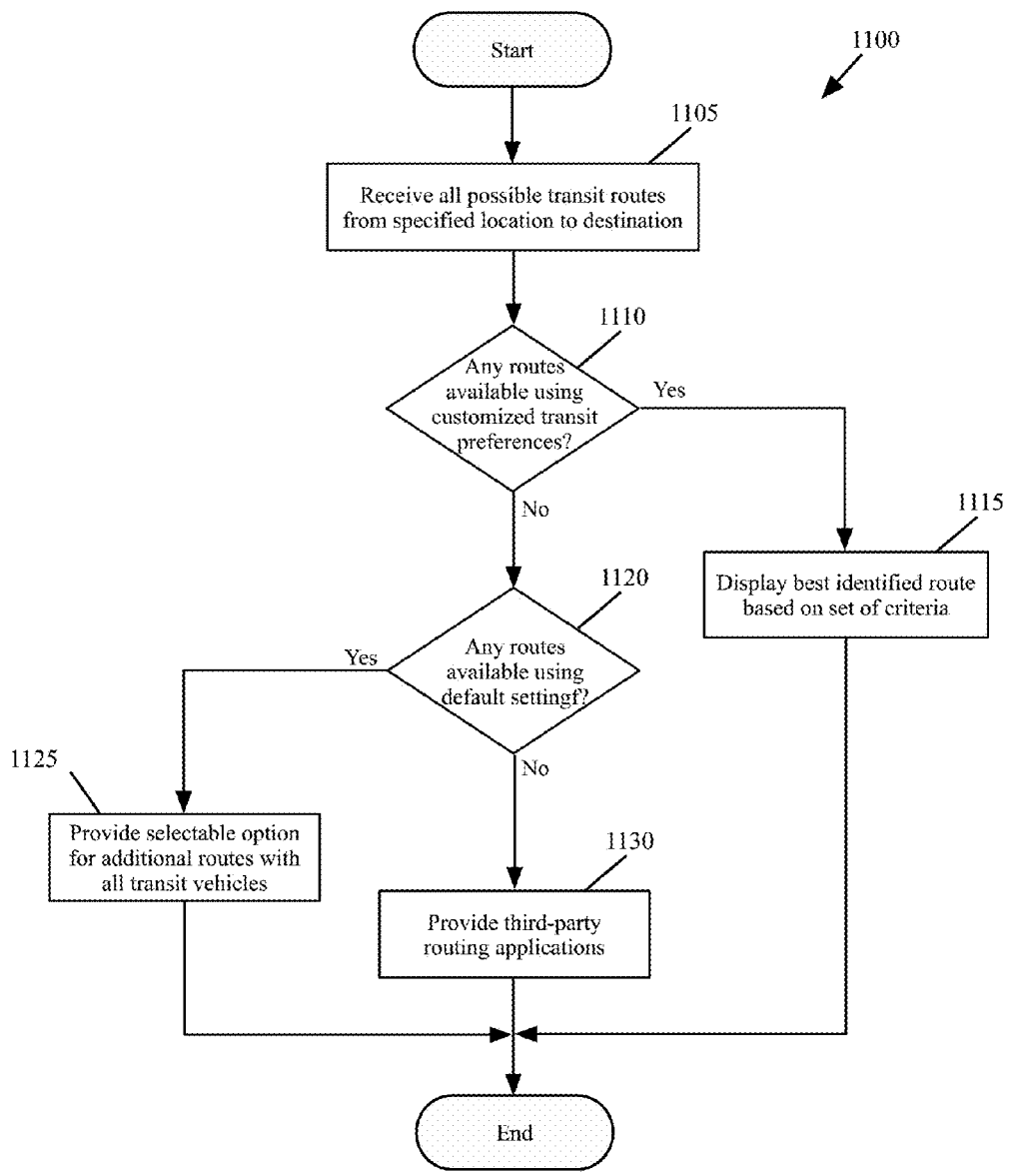
FIG. 11 conceptually illustrates a process that the mapping service of some embodiments performs to provide a transit route or a third-party routing application based on the availability of the transit route when a set of transit preferences is customized by the user.

FIG. 11 conceptually illustrates a process 1100 that the mapping service of some embodiments performs to provide a transit route or a third-party routing application based on the availability of the transit route when a set of transit preferences is customized by the user. In some embodiments the map application performs this process while the application receives different transit data required for performing the process from one or more mapping services.

The process 1100 begins by receiving (at 1105) all possible transit routes between a specified location (e.g., the current location of the device) and a destination (e.g. a searched location). As described above these transit routes include the transit routes that the application has identified (e.g., through a mapping service) as transit routes that each uses a combination of one or more transit vehicles that travels from a location near or at the specified location to a location near or at the destination.

The process 1100 then determines (at 1110) whether there is at least one transit route available based on the customized set of transit preferences. As described above a user can change the settings of the transit preferences in some embodiments. For instance the user may change the current location's departure time (the time that the user wishes to leave the current location) to a later time. The user may also wish to use a transit route that includes only one or more particular types of transit vehicles. For instance the user might set the transit vehicle types to include only buses, or only buses and subway trains. The process of some embodiments after receiving the identified routes determines whether any of the identified routes match the customized transit preferences set by the user.

When the process determines that one or more identified routes match the user settings, the process ranks the identified routes (based on a set of criteria) and displays (at 1115) the best ranked transit route to the user. The process then ends. As described above, the set of criteria may include the transit trip's duration, the transit trip's distance, the number of transit vehicle changes, the total walking distance for the trip, etc. In some embodiments the set of criteria changes based on different factors (e.g., the area in which the transit system is used, the time (time of day, week, etc.), the season, etc.). Some embodiments allow the user to change one or more of items in the set of criteria. In some other embodiments the set of criteria is predefined and the user cannot change it.

When the process determines that there is no available transit route based on the customized transit preferences, the process of some embodiments determines (at 1120) whether there is at least one transit route at the current time, or within a threshold time, that uses a combination of all possible types of transit vehicles (i.e., uses the default settings). Specifically, the process determines that if all transit vehicles of different types were available at this time, a transit route could be identified between the specified location and the destination.

If the process determines that at least one transit route could be identified that uses all possible combination of transit vehicles, the process provides (at 1125) a selectable option to the user to view the additional routes that use all types of transit vehicles. The process then ends. On the other hand, if the process determines that no transit route is available even after setting the transit preferences back to the default settings (in order to use all possible combinations of transit vehicles of different transit systems), the process provides (at 1130) a set of third-party routing applications in the manner described above by reference to FIG. 2. The process then ends.

Some embodiments perform variations of the process 1100. The specific operations of the process 1100 may not be performed in the exact order shown and described. Additionally, the specific operations may not be performed in one continuous series of operations, and different specific operations may be performed in different embodiments. For example, in some embodiments, instead of changing the transit preferences to default settings in order to determine whether other routes are available that use all possible combinations of transit vehicles, some embodiments first display the selectable option to the user. Some such embodiments allow the user to change the settings back to default settings by selecting the provided option and then examine all possible combinations of transit vehicles of different transit systems.

Figure 12:
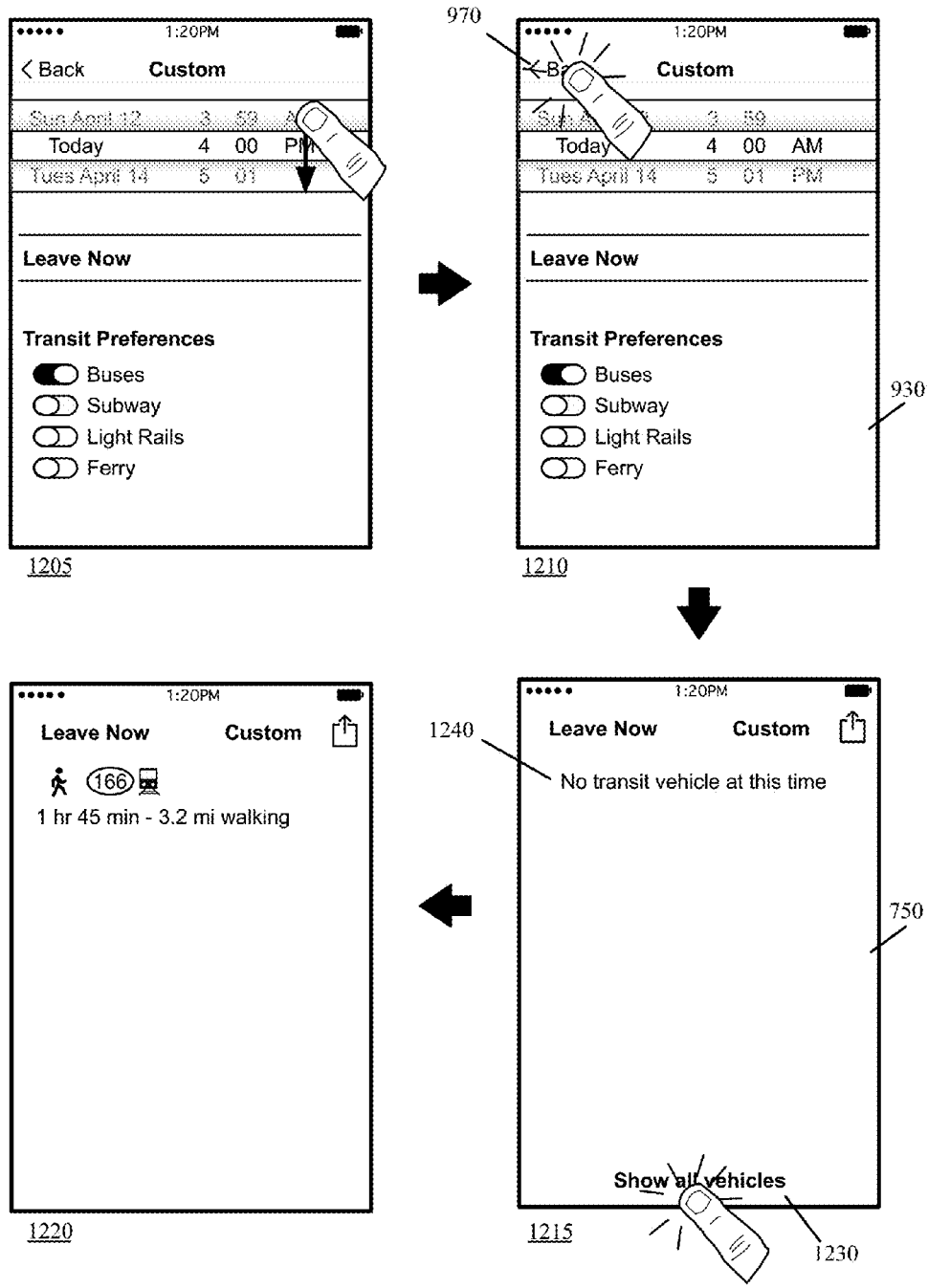
FIG. 12 illustrates how a single UI control directs the map application to examine all possible transit legs traveled by different transit vehicles between two locations when the current settings of the user preferences has left no transit route available to be displayed.

FIG. 12 illustrates, through four operational stages 1205-1220 of the map application UI of some embodiments, an example of using one such option. This figure shows how a single UI control directs the map application to examine all possible trips made by different transit vehicles between two locations when the current settings of the user preferences has left no transit route available to be displayed. The UI displayed in the first stage 1205 shows a similar UI to the displayed UI in the third stage 1015 of FIG. 10. This stage shows that the only transit system that is currently enabled and preferred is the bus system. As such, the map application only identifies transit routes that use buses as their transit vehicles. The first stage also shows that the user is modifying the time of the trip (e.g., by scrolling down the meridiem (am/pm)).

The second stage 1210 shows the same custom display area 930 that now displays the scheduled departure time as 4:00 am and the only preferred transit system as the bus system. This second stage also shows that the user is selecting the Back UI control 970 which directs the map application to return to the previous more routes display area 750.

The third stage 1215 shows that as a result of adjusting the departure time to 4:00 am, the more routes display area 750 is not displaying any route summary representation which means that no transit route with the current settings can be identified. This is because the only transit vehicle that the map application could examine for the transit route was buses and at the specified time of the day (i.e., 4 am) no bus is available for any route. This is further evinced by the text notification 1240 that is displayed in the display area 750. The text notification 1240 reads that no transit vehicle is available at this time. The third stage 1215 also shows that the user is selecting the Show All Vehicles UI control 1230 (e.g., by tapping on the UI control).

The fourth stage 1220 shows that selection of the UI control 1230 has caused the map application to look for all available transit vehicles that provide service during the specified time and between the specified starting location and destination location. As shown at this stage, the map application has identified only one transit route that uses a subway train (i.e., subway train 166) as the only transit vehicle that is available at the specified time and date. The more routes display area 750 also shows that the identified route requires a lot of walking (i.e., 3.2 miles of walking) The map application has identified a route that uses subway transit system despite the fact that the user had previously disabled this transit system.

In some embodiments, after the map application changes the user specified settings (e.g., enables all the previously disabled transit systems) and displays all of the possible transit routes to the user, the map application retrieves the previously specified settings (i.e., the previous customized user preferences) for future operations. That is, in the illustrated example, the map application disables all the transit systems except the bus system, after it shows the identified route to the user and after the user's interaction with the route summary presentation (e.g., selecting the route, canceling the route, etc.).

Figure 13:
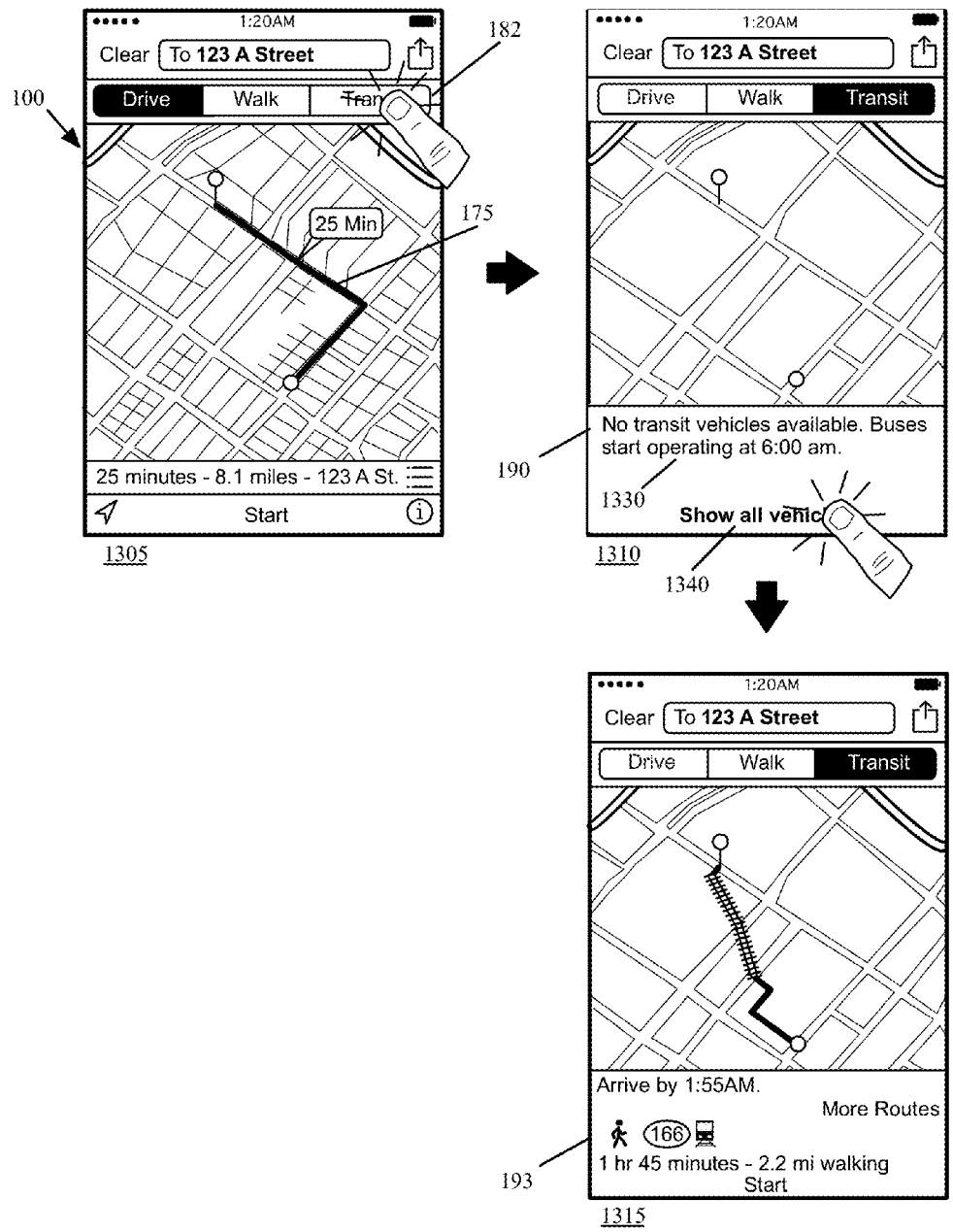
FIG. 13 illustrates another example of using a single UI control to enable all possible transit systems in route identification.

FIG. 13 illustrates another example of using a single UI control to enable all possible transit systems in route identification. This figure shows, through three operational stages 1305-1315, how a single UI control in another display area of the map application UI (e.g., the route planning UI) directs the map application to examine all possible trips made by different transit vehicles between two locations. The UI displayed in the first stage 1305 shows an identical UI 100 displayed in the third stage 115 of FIG. 1. This stage shows the three navigation mode controls through which the user can direct the map application to provide one or more driving routes, walking routes, and transit routes from the device's current location to the specified destination (i.e., to 123 A Street in this example). The first stage 1305 also shows the driving mode control is highlighted to indicate that the route 175 that the application initially provides is a driving route. This stage further illustrates that the user selects the transit control 182 (e.g., by tapping on the tab 182) to change the navigation mode of the application from a driving navigation mode to transit navigation mode.

The second stage 1310 shows that no transit route is displayed over the map presentation. In other words, the map application was not able to identify any transit route between the two specified locations. There are several reasons for a map application of some embodiment not to be able to find any available transit route. The map application of some embodiments does not identify a route between two locations when no transit vehicle provides service between the locations or when the application does not have data for transit services in the area. Another reason might be the customized set of preferences. In the illustrated example, a user might have disabled all transit vehicles except the bus lines (similar to the example illustrated in FIG. 12). On the other hand, the example shows the current time on the device as 1:20 am at which no bus line provides transit service in the area.

This is further evinced by the message 1330 shown in the incident display area 190 in the second stage. The displayed message states that no transit vehicle is available and buses start operating at 6:00 am. As shown, in some embodiments the map application uses multiple lines to display the incident information if necessary. The second stage also shows that the user selects the UI control to direct the application to examine all available transit vehicle types. That is, the user selects the Show All Vehicles UI control 1340 (e.g., by tapping on the UI control) to switch any specified user preferences back to the default mode and to enable all available transit vehicle types.

The third stage 1315 shows that as a result of selecting the UI control 1340, the application has identified one transit route 1350 that is a combination of a walking path and a subway train path each of which is presented by a different representation over the map presentation. This stage further shows that the incident display area 190 displays the estimated arrival time and the route summary display area 193 displays a walking person representation for the walking leg of the trip and a subway train representation for the subway leg of this transit route. The display area 193 at this stage also shows that the total trip time is 1 hour and 45 minutes which involves a total walking distance of 2.2 miles.

In some embodiments, when a user selects a presentation of a route summary (e.g., by tapping on the presentation), the map application provides a list view (e.g., a navigation list view) of the transit route that provides a list of detailed instructions on how to navigate the transit route. In some embodiments, each leg of the transit route that is traveled by a transit vehicle corresponds to a pair of navigation instructions in the list view.

More specifically, in some such embodiments, for each leg of the trip (the transit route) that is associated with a different transit vehicle, a first instruction sets forth the name of the transit station (e.g., bus stop, subway stations, ferry terminal, etc.) to board the transit vehicle and the second instruction states the name of the transit station to exit the transit vehicle. Some other embodiments display all the instructions related to a transit leg in one navigation instruction. Some embodiments also provide a navigation instruction for each walking portion (between the stations, from the departure point to the first station, and from the last station to the destination) of the transit route.

In some embodiments, in between each pair of instructions for a particular leg (portion) of the route, other information related to that particular leg is displayed. For example, in some embodiments, between the two instructions of each pair, the map application describes the distance associated with the leg, the number of transit stations (e.g., bus stops) while on the transit vehicle, and a total travel time for the leg. Additionally, the map application of some embodiments sets forth the required walks between the legs of the trip by presenting the walking distance and time between each leg that is associated with a transit vehicle.

Some embodiments provide the transit navigation instructions differently. For example, in some embodiments each instruction in the list is for a next transit maneuver of the passenger and therefore each walking instruction appears as a separate instruction in the list and not in between each pair of instructions. Additionally, some embodiments provide different transit information between each pair of instructions, or alternatively do not provide any additional information between the instructions.

Figure 14:
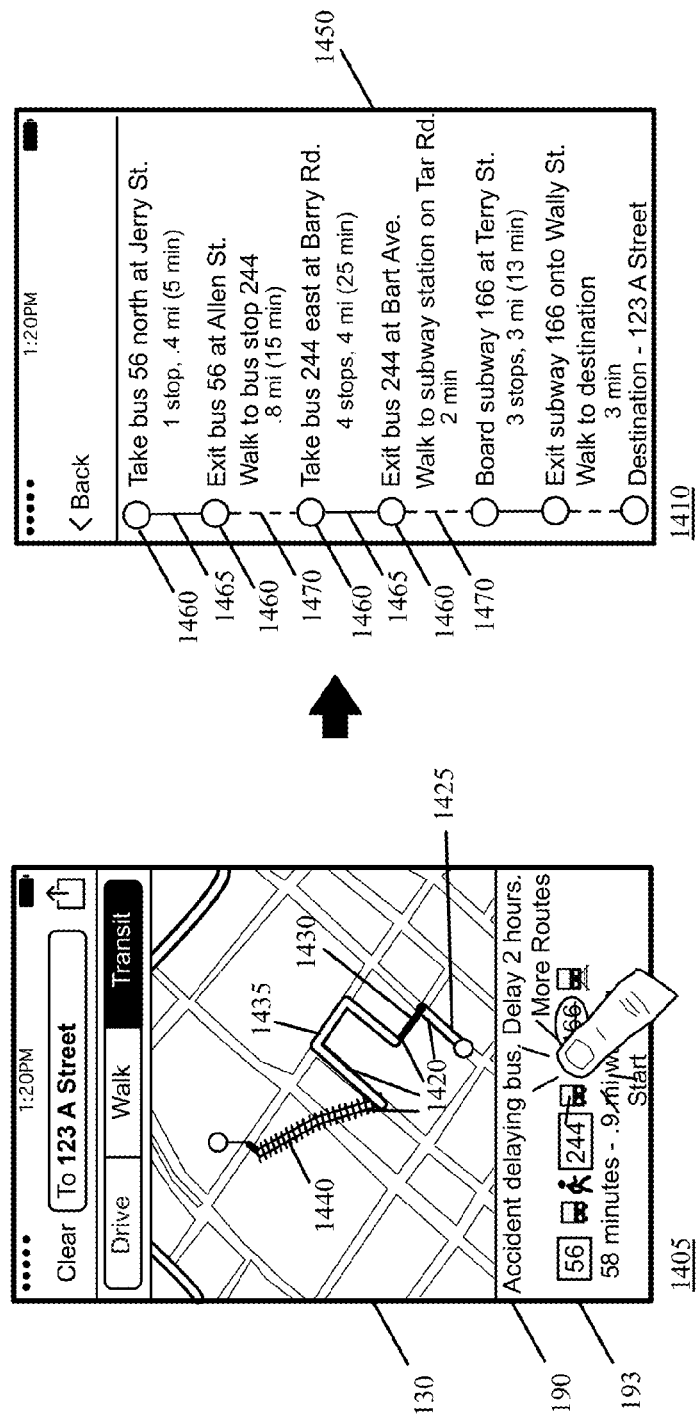
FIG. 14 illustrates how selection of a transit route summary representation directs the map application of some embodiments to provide a list of navigation instructions associated with a selected transit route.

FIG. 14 illustrates one such transit route list view. This figure illustrates, through two operational stages 1405-1410 of the UI of the map application of some embodiments, that selection of a transit route summary representation directs the map application of some embodiments to provide a list of navigation instructions associated with the selected transit route. The first stage 1405 shows a representation of the best identified route 1420 drawn over a portion of the map presentation displayed in the map presentation area 130. The identified transit route 1420 includes two different bus legs 1425 and 1435, a walking portion 1430, and a subway leg 1440.

The first stage 1405 also shows that the route summary display area 193 displays a transit route summary representation that includes a bus representation for the bus of the line 56 that travels the leg 1425, a walking person representation for the walking portion 1430, a bus representation for the bus of the line 166 that travels the leg 1435, and a subway train representation that travels the leg 1440 of the transit route. The incident display area 190 displays that an accident is delaying a bus line (e.g., the bus line 125 depicted in the fourth stage of FIG. 1). Lastly, the first stage 1405 shows that the user selects the transit route summary representation presented in the transit route summary display area 193 (e.g., by tapping on the transit route summary display area).

The second stage 1410 shows that upon selection of the transit route summary representation in the previous stage, the map application provides a list of navigation instructions for the transit route in a list view display area 1450. The list view display area 1450 is a scrollable display area and the user can scroll up and down to view next and/or previous information. As described above each pair of instructions in the list is associated with a particular leg of the trip traveled by a particular transit vehicle in some embodiments. Additionally, the map application of some embodiments displays representations of the walks that are required to go (1) from the current location (of the user) to the first transit station (e.g., bus stop, subway station, etc.), (2) between the transit stations of two consecutive legs of the trip, and (3) from the last transit station to the desired destination.

The second stage 1410 shows that the map application displays, in the list view display area 1450 three legs 1465 of the route that are depicted by solid lines and three walking distances 1470 that are depicted by dashed lines. Each pair of instructions 1460 in the set of instructions includes the information for boarding a transit vehicle at a first transit station and exiting the transit vehicle at a second transit station. For example, the first two instructions 1460 of the illustrated example instruct the user of the device to take the bus 56 northbound at Jerry Street and then exit the bus 56 at Allen Street. Similarly the second pair of instructions in the illustrated example instructs the user to take the bus 244 eastbound at Kellie Street and exit the bus 244 at Bart Avenue.

Giving the name of the boarding and exiting transit stations, however, might not be enough and a passenger can easily get confused about how many more stations the passenger should travel with the transit vehicle before exiting the transit vehicle. In order to help the passenger (user) even more, the map application of some embodiments also displays additional information about each leg 1465 of the route next to the leg. For example, the information next to the first leg 1465 of the illustrated example, provides the passenger with the number of bus stops (1 bus stop), the distance that should be traveled by the bus 56 (0.4 miles), and the estimated time of travel (5 minutes).

The second stage 1410 also shows that the map application provides the walking instructions in form of dashed lines 1470 in between each pair of instructions 1460. The walking instructions describe the walking distance and time between each pair. For example, the first walking instruction 1470 instructs the user to walk 0.6 miles (about 15) minutes after the user exits the bus 56 in order to reach the next bus stop for the second leg of the trip. The map application of some embodiments also provides the walking instructions between the current location of the user and the first transit station (not shown) and between the last transit stations and the destination (i.e., the last walking instruction 1470).

One example of displaying a list view and the different types of information and instructions shown in the list view in some embodiments was described through the second stage 1410 of FIG. 14. However, the type of information and the way this information is displayed may be different in different embodiments. For example, in some embodiments some or all of the additional information about a leg of a trip that is displayed next to the leg 1465 in the list view is different from what is shown in this stage. For instance, some embodiments do not provide the number of stations during each trip while some other embodiments provide more information such as the name of each station while traveling on a particular transit vehicle. Various embodiments may include other combinations of this information and the displayed information.

Furthermore, the information provided in the instructions 1460 is different in different embodiments. For example, some embodiments provide local directional terms that are used in each locality for different cardinal points in each instruction that involves boarding a transit vehicle. In the illustrated example, if the local term "uptown" is used for the vehicles that head "north," some such embodiments would display "take bus 56 uptown . . . " for the first instruction 1460, instead of displaying "take bus 56 north . . . " The labeling of directions based on the locality in which the transit route is displayed is further discussed in detail below with reference to FIG. 22.

Additionally, some embodiments provide a departure time of each transit vehicle in the first instruction of each pair of instructions 1460. In some embodiments, the format in which the departure time is displayed depends on whether the transit vehicle is classified as a high frequency or low frequency transit vehicle. For example for some types of transit vehicles, the departure time that is displayed includes a frequency of departures of a particular transit line from a particular transit station at a particular time period, while for some other types of transit vehicles (from a different transit system), the departure time that is displayed includes the time at which the transit vehicles of the line leave the station. In some embodiments the transit vehicles of the same type can be classified as high and low frequency vehicles for different lines, at different stations, or at different time periods. The different treatment of high and low frequency transit vehicles is further discussed in detail below with reference to FIGS. 24-25.

Figure 15:
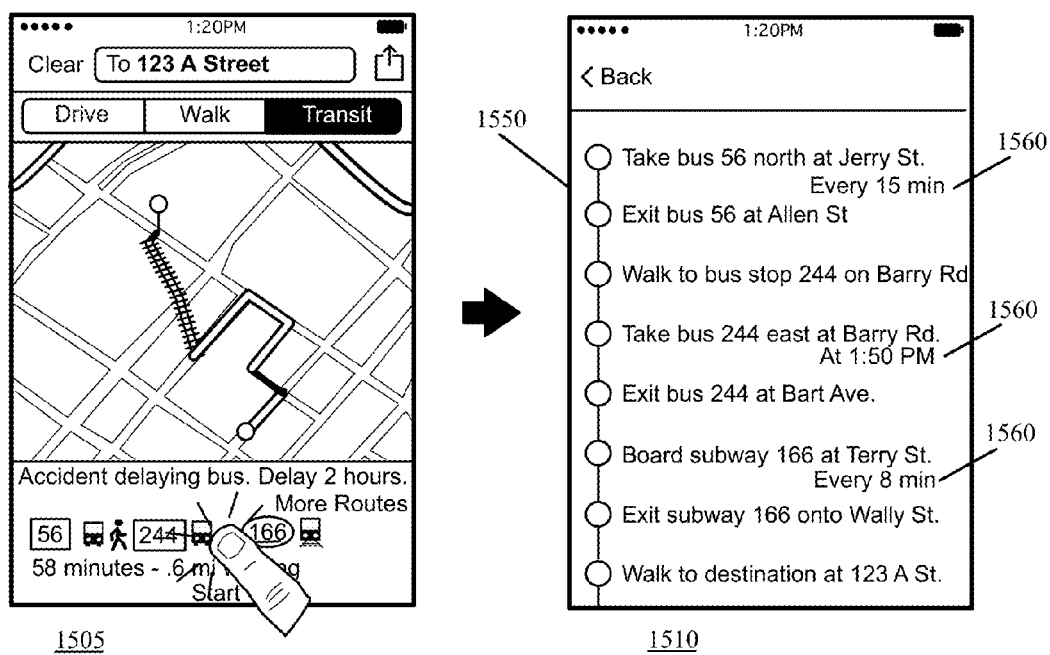
FIG. 15 illustrates another example of a list of navigation instructions associated with a selected transit route.

FIG. 15 illustrates another example of a list of navigation instructions associated with a selected transit route. This figure illustrates, through two operational stages 1505-1510 of the UI of the map application of some embodiments, that selection of a transit route summary representation directs the map application of some embodiments to provide a list of navigation instructions associated with the selected transit route. The first stage 1505 shows an identical UI of the application as the UI shown in the first stage of FIG. 14. The route summary displays a transit route summary representation that includes a bus representation for the bus of the line 56, a walking person representation for the walking portion, a bus representation for the bus of the line 166, and a subway train representation that travels the last leg of the transit route. The first stage 1505 also shows that the user selects the transit route summary representation presented in the transit route summary display area 193 (e.g., by tapping on transit route summary display area).

The second stage 1510 shows that upon selection of the transit route summary representation in the previous stage, the map application provides a list of navigation instructions for the transit route in a list view display area 1550. The list view display area 1550 is a scrollable display area and the user can scroll up and down to view additional information. Each navigation instruction in the list is associated with a particular leg of the trip traveled by a particular transit vehicle or a walking portion of the transit route in some embodiments. That walking portions of some embodiments are the walking distances that are required to go (1) from the current location (of the user) to the first transit station (e.g., bus stop, subway station, etc.), (2) between the transit stations of two consecutive legs of the trip, and (3) from the last transit station to the desired destination.

The second stage 1510 also shows that the map application displays in the list view display area 1550 a navigation instruction for each next transit maneuver in the transit route. Specifically, each navigation instruction in the list includes instructions for (1) a walking portion to reach the next transit station of the next leg of the transit route, (2) boarding the next transit vehicle that services the next leg, (3) exiting the transit vehicle, and (4) walking portion to the destination. Additionally, for each next transit vehicle, the navigation instruction provides the departure time 1560 of the transit line. As described above and below, the departure time can be in the form of frequency of departures for high frequency transit lines (e.g., bus line 56 and subway line 166) or departure time of the next transit vehicle from the station (e.g., bus line 244).

As stated before, this is one example of the navigation list view of some embodiments. Some embodiments provide more information in the instructions of the list view. For example, some embodiments display each transit leg's duration or each walking portion's duration in the navigation instructions.

III. Transit Information in Placecards

A. POI Placecards

Some embodiments provide a user interface for presenting different types of detailed information about a point of interest (POI). These information displays may be referred to as placecards or staging areas. The POI placecard of some embodiments includes a scrollable display area that includes different sections for displaying images of the POI as well as different types of information about the POI. The different types of information in some embodiments includes general information about the selected POI (e.g., address, photos, ratings, etc.) as well as different types of transit vehicles that are accessible from the POI (e.g., transit stations that are in the vicinity of the POI).

As described above, the map application of some embodiments displays a banner above a pin that is displayed over a map presentation for a searched location. In some embodiments, the user can select a UI item in the banner for more information about the POI. Upon selection of the UI item in the banner of some such embodiments, a display area (placecard) opens up for that POI. The different ways of displaying placecards (or stages) of some embodiments and the different types of information that they provide are further described in U.S. Patent Publication 2013/0326384, published on Dec. 5, 2013, which is incorporated herein by reference.

Figure 16:
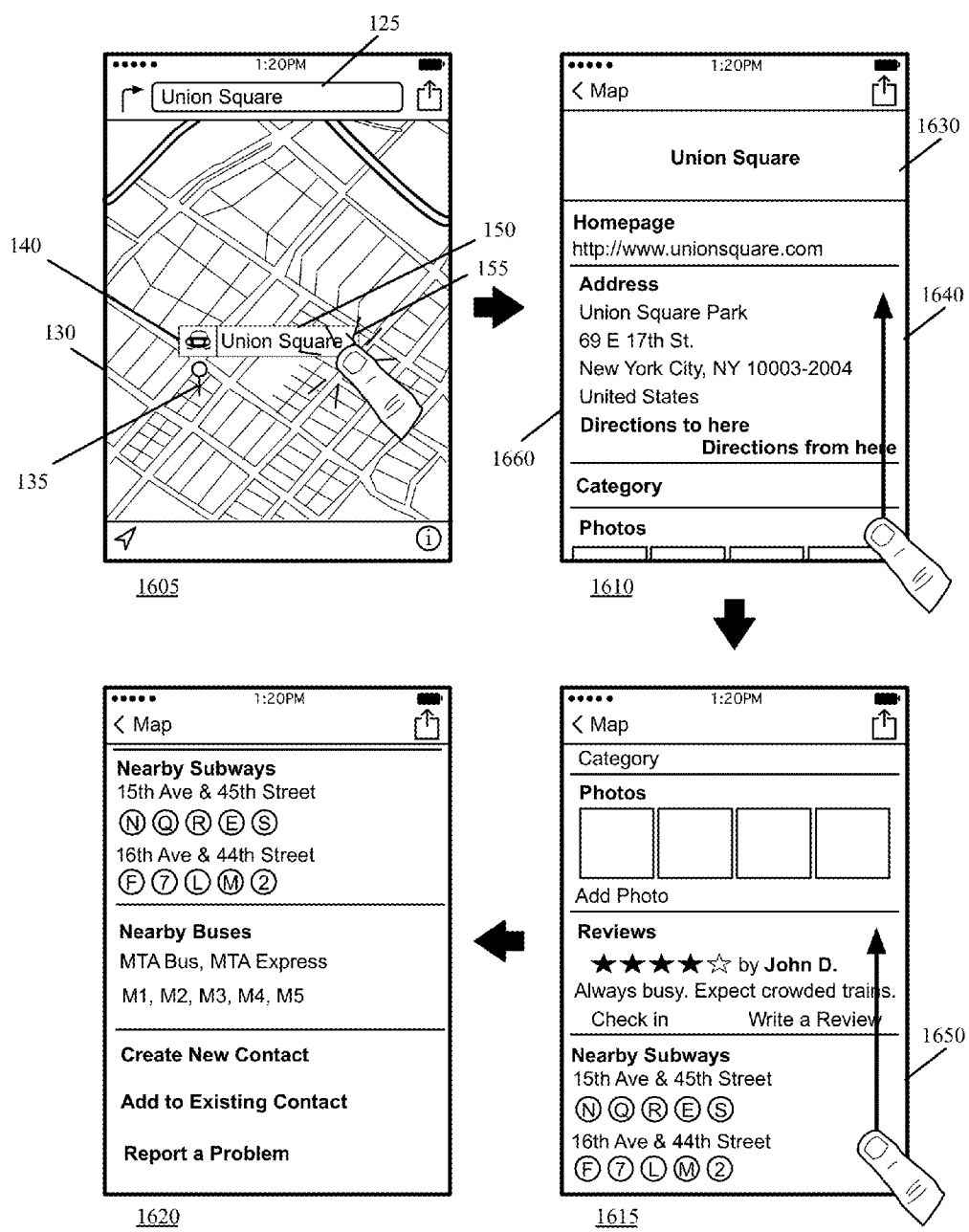
FIG. 16 illustrates how a placecard for a point of interest (POI) can be requested and displayed in some embodiments.

FIG. 16 illustrates, in four operational stages 1605-1620 of the UI of the map application, how a placecard for a point of interest (POI) can be requested and displayed in some embodiments. Some embodiments provide the user with a search box to search for a particular location. The user may then enter an address of a particular place or alternatively a name of the place in the search box. When the address (or name) of the place is specified, the map application of some embodiments drops a pin over a presentation of the map to display the exact location of the place on the map presentation. In addition, some such embodiments display a banner over the pin for providing more information about the place.

The first stage 1605 of FIG. 16 illustrates a search box 125, a map presentation area 130 that displays a geographical area, a pin 135, and a banner 140. The banner 140 includes a selectable route control 145, which is depicted as a presentation of a car, a name 150 of the searched place, and a selectable control 155, which is depicted as a right arrow. In the search box 125, a user can enter a search parameter to search for a particular location for display in the map presentation area 130. In some embodiments, the search parameter can be an address or name of an entity (e.g., a business, organization, person, etc.), or some other parameter. When the map application can identify one or more locations for a search parameter that it receives, the map application in some embodiments (1) displays in the presentation area 130 a map that displays some or all of the identified locations, and (2) displays a pin 135 or other location indicator for each displayed location to identify the position of the identified location. Also, in some embodiments, the map application display a banner 140 over one of the pins 135 for providing access to more information about the location identified by the pin.

The first stage 1605 of the figure shows that the user has entered a name of a POI in the search box 125 (union square). As a result, the application displays, in the map presentation area 130, a map of a particular geographical area in which the POI is located. This stage also shows that the application further displays (1) the pin 135 over the map presentation to identify the location of the POI on the map and (2) the banner 140 over the pin. As shown, this banner includes the name of the POI "Union Square," and a selectable control 155, which when selected causes the map application to present a display area (e.g., a placecard) that provides more information about the identified location. The first stage also shows that the user selects the UI control 155 to see more information about the place including the transit stations in the vicinity of the place.

The second stage 1610 shows that as a result of selection of the UI control 155, the map application displays a placecard for the searched POI. The placecard of some embodiments displays different types of information about the place in the scrollable display area 1660 of the placecard. This information can be categorized into three different categories that are displayed in three different sections of the display area 1660 in some such embodiments. These three different sections include the media section 1630, the general information section 1640, and the transit information section 1650, although other embodiments may include additional sections.

The media section 1630 of some embodiments displays different media about the POI. In some embodiments, the map application initially displays a 3D animation of the POI when it displays the placecard, while in some other embodiments the map application displays a set of images from inside and outside the POI. When the data for the animated 3D view of the POI is not available (e.g., the data is not available in the map server or other local storage), the map application of some embodiments finds the next available type of image to display in the media section 1630 of the display area 1660. For instance, the map application may display a satellite view of the POI. In some embodiments, in order to provide an animated effect, the map application rotates (e.g., clockwise) the satellite image of the POI.

In some embodiments, the map application determines the type of media of the POI to initially display in the media section 1630 based on the type of POI that is selected. For instance, when the POI is a restaurant, the map application of some embodiments initially displays images of culinary dishes the restaurant offers or interior images of the restaurant. When displaying such images, the map application of different embodiments employs different effects to display different images. More information about the media section and the information included in the media section is described in U.S. Patent Publication 2013/0326384, published on Dec. 5, 2013.

The general information section 1640 of the display area 1660 in some embodiments includes different information about the POI such as a URL for the POI, the address of the POI, directions to and from the POI, the reviews gathered by information aggregation entities (e.g., Yelp, Facebook, Twitter, etc.) about the POI, photos gathered by the information aggregation entities, etc. Although in the illustrated example, only the aforementioned information are depicted, one of ordinary skill in the art realizes that the information can include other information such as hours of operation (e.g., when the POI is a business), category, suitability for children, etc. The second stage also shows that the user scrolls the display area up to see more information about the POI including the transit information.

The third stage 1615 illustrates that new information about the POI is now displayed in the display area 1660 after scrolling up the information shown in the previous stage. This stage also shows that the third section 1650 of the display area includes the transit information for the selected POI (i.e., Union Square). More specifically, the displayed information in the third section 1650 now includes the subways that are in close vicinity with the POI. The different subway lines in the illustrated example are shown under a first subway station that is located on the 15$^{th}$ Avenue and 45$^{th}$ Street, and a second subway station that is located on the 16$^{th}$ Avenue and 44$^{th}$ Street. The third stage also shows that the user scrolls the display area up to see more transit information (if any) about the POI.

The fourth stage 1620 shows the display area 1660 displaying more transit information in the transit section 1650 after the user scrolls up the screen. The displayed information in the third section 1650 includes other available transit vehicles that are close to the POI, which in the illustrated example are nearby bus stops and the bus lines that stop at these bus stops. One of ordinary skill in the art would realize that the display format and the content of the displayed information can be different in different embodiments. For instance, in some embodiments, more information about the nearby transit vehicles is displayed to the user. In some such embodiments, the provided information includes the departure time of each transit vehicle (e.g., both as a frequency of departures for high frequency vehicles and the scheduled departure time for low frequency vehicles), the walking distance to each displayed transit station, etc. This stage also shows that the user can create a new contact for the selected POI in the device's contact list or add the POI to one of the current contacts through the corresponding selected UI items. The user may also report a problem through the Report a Problem UI item.

B. Transit Station Placecards

In addition to providing transit information for a selected point of interest, the map application of some embodiments provides detailed transit information for a particular transit station when the particular transit station is selected. In some embodiments, when a user selects a transit station on a map view (e.g., by tapping on a selectable representation of the station that is displayed on a map presentation), the map application provides a display area (transit placecard) that includes various information about the transit station and the different transit lines that depart from the transit station. For instance, the map application of some embodiments provides the name and address of the transit station as well as the departure schedule of the different transit lines from the transit station.

Figure 17:
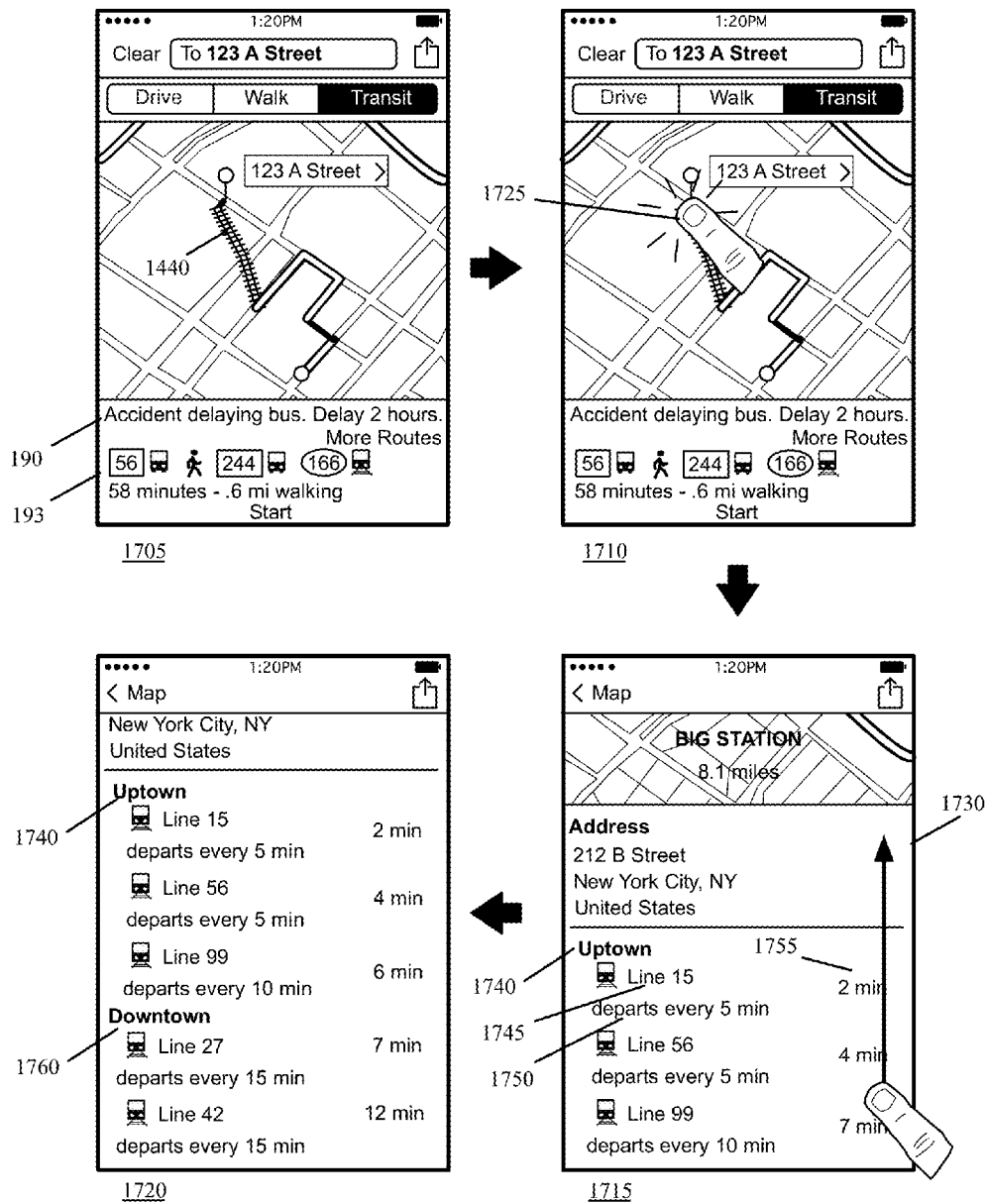
FIG. 17 illustrates how a user can access and view a transit station placecard that provides transit information related to the transit station.

FIG. 17 illustrates how a user can access and view a transit station placecard that provides transit schedules related to the transit station. More specifically, this figure shows, through four operational stages 1705-1720 of the map application UI, a user selecting a particular transit station that is displayed on a map of a geographical area. The user can then view the departure schedule of all of the transit vehicles that stop at the particular transit station. The map application of some embodiments takes into account the locality in which the transit station is located as well as the type of the transit vehicles (e.g., to which transit system the transit vehicles belong) in providing the information in the departure schedule.

The first stage 1705 shows a similar map application UI to the UI displayed in the first stage 1405 of FIG. 14. This stage shows a representation of the best identified transit route that is drawn over a portion of the map presentation. The identified transit route includes two different bus legs, a walking leg, and a subway leg 1440. This stage also shows that the route summary display area 193 displays a transit route summary representation that includes a bus representation for the bus of the line 56, a walking person representation for the walking portion, a bus representation for the bus of the line 166, and a subway train representation for the leg 1440 of the transit route. The incident display area 190 displays an incident report that informs the user an accident is delaying one of the two bus lines used in the transit route.

The second stage 1710 shows that the user selects the last transit station 1725 of the displayed transit route. In some embodiments each transit station for which a transit station placecard is available is presented on a map with a selectable transit station representation. In some other embodiments, the map application displays a transit station representation for every transit station that is displayed on the map presentation. In yet other embodiments, the map application does not display any transit station representation over the map presentation and selecting the transit station (e.g., by tapping on the display area over the map presentation at or around the area that the transit station is located) would cause the map application to display a transit station placecard for the selected transit station. In some embodiments, selecting the transit station on the map directs the application to provide a banner similar to the banner displayed for the destination in this stage. The user can then select the transit station placecard by selecting the corresponding control on the banner (e.g., the right arrow depicted on the right hand side of the banner for "123 A Street" destination).

The third stage 1715 illustrates that the map application, in response to the selection of the subway station 1725, displays a display area 1730 for the transit station placecard which includes general information about the transit station (i.e., subway station 1725) as well as the departure schedule of the transit vehicles (i.e., subway trains) of different lines. Although in the illustrated embodiment, the general information only includes the name and address of the transit station, some other embodiments provide a variety of information about the transit station in the transit station placecard. For instance, the map application of some embodiments provides information such as directions to and/or from the station, images of the station (e.g., from both inside and outside the station), the reviews gathered by information aggregation entities (e.g., Yelp, Facebook, Twitter, etc.) about the transit station, etc.

The third stage also shows the departure schedule for all subway trains that leave the station in the Uptown direction. More specifically, this stage shows a trip heading 1740 for all the trains that travel north (i.e., in the Uptown direction), a line number 1745 for each train, a frequency of departure 1750 of each train, and a countdown 1755 to the next scheduled train's departure. As will be discussed in more detail below with reference to FIG. 22, the map application of some embodiments identifies a local directional term for every cardinal direction towards which a set of transit vehicles travel (if such a term is available). The map application of some embodiments identifies these terms based on the geographical area in which the transit station located (e.g., the terms that are used in a certain locality). The map application then displays the identified term as a header for the set of transit vehicles that travel in each particular direction.

In the illustrated example, the term that is used (e.g., by the passengers and transportation system of this particular geographical area in which the subway station located) for the north is "Uptown." Hence the map application has identified and displayed Uptown as a header for the subway trains that travel northbound from the subway station. Under the header, the map application lists subway trains of the lines that are scheduled to depart from the subway station in the specified direction. That is, the map application of some embodiments displays a list of subway lines, the trains of which will leave the subway station during a certain time period from the current time (e.g., the subway trains that leave the station in the next 15 minutes). In the shown example of stage 1715, three different subway trains of the lines 15, 56, and 99 will leave the station in the Uptown direction in the next 7 minutes from the current time of the device (i.e., 1:20 pm).

The frequency of departure 1750 of each train in the third stage 1715, shows the time intervals at which a next train of the line leaves the subway station. As will be discussed in more detail below by reference to FIGS. 24-25, the map application of some embodiments provides a departure time for each transit vehicle of a transit line in a particular format. The map application of some such embodiments categorizes the transit lines into two categories of high frequency transit lines and low frequency transit lines. Depending on the category of the transit line the map application displays the departure time of the transit vehicles of that line in a different format. For a high frequency transit line, the map application displays the departure times in a frequency format, which includes the frequency of departures of the transit vehicles of the line from the station. For a low frequency transit line, the map application displays the departure times of the transit vehicles of the line in an absolute time format, which includes the time at which the transit vehicle leaves the station.

In order to determine whether a transit line is high frequency or low frequency, the map application of some embodiments first evaluates the frequency of departures of the transit vehicles of the line from a transit station. The application then determines whether the evaluated frequency is greater than a threshold (e.g., a predefined time period). When the evaluated frequency is greater than the threshold, the map application of some such embodiments categorizes the transit line as a low frequency transit line. On the other hand, when the evaluated frequency is less than or equal to the threshold, the map application categorizes the transit line as a high frequency transit line.

In the illustrated example, the map application has categorized the subway trains of this line at this particular subway station as high frequency transit vehicles. As such, the departure schedule of the subway train of line 15 is displayed in frequency format (i.e., every 5 minutes). Similarly, the map application has determined that subway trains of the line 99 are high frequency trains at this station. Consequently, the departure schedule of the subway trains of line 99, although different from the subway trains of line 15, is displayed in frequency format as well (i.e., every 10 minutes). Some embodiments provide a novel method of calculation of the frequency of departures of the transit vehicles of different lines from different transit stations. The method of calculation of the frequencies of departures of different transit vehicles is also described in details below by reference to FIGS. 26-28.

The third stage 1715 further shows a countdown 1755 to the next scheduled subway train's departure of each subway line. The map application of some embodiments provides a countdown to the next scheduled transit vehicle's departure in order to provide a more precise time of departure to the user. The combination of the countdown and the frequency provides the user with all the information needed for the departure schedule of a transit vehicle. In other words, a user would realize how long more the user has to wait for the next train of the line by looking at the countdown information. At the same time, the user would know how much more the user has to wait if he misses the next train by looking at the frequency of the departures.

Lastly, the third stage shows that the user is scrolling up the information displayed in the transit station placecard in order to view other transit information provided by the placecard. Consequently, a user, with a glance at the illustrated placecard, would realize that three different subway trains of the lines 15, 56, and 99 will leave the station in the Uptown direction in the next 7 minutes from the current time of the device (i.e., 1:20 pm). The subway trains of subway lines 15 and 56 depart towards Uptown every 5 minutes while the subway trains of the line 99 departs towards Uptown every 10 minutes. The next scheduled departure for the subway line 15 will be in 2 minutes, the next scheduled departure for the subway line 56 will be in 4 minutes, and the next scheduled departure for the subway line 99 will be in 7 minutes.

The fourth stage 1720 shows the transit station placecard displaying additional departure information after scrolling the information up. The display screen 1730 now displays the Uptown departure schedule under the trip heading 1740, as well as the schedule for the subway trains that depart towards Downtown. More specifically, this stage shows a trip heading 1760 for all the trains that travel south (i.e., in the Downtown direction), a line number for each train, a frequency of departure of each train, and a countdown to the next scheduled train's departure.

In the illustrated example, the term that is used (e.g., by the passengers of this particular geographical area in which the subway station located) to refer to southbound train is "Downtown." Therefore, the map application has identified and displayed Downtown as a trip heading for the subway trains that travel in the southbound direction from the subway station (i.e., towards the Downtown geographical region). Under the trip heading, the map application lists subway trains of the lines that are scheduled to depart from the subway station next. That is, the map application of some embodiments displays a list of trains of different lines that will leave the subway station during a certain time period from the current time (e.g., the subway trains that leave the station in the next 15 minutes). In the example shown in stage 1720, two different subway trains of the lines 27 and 42 will leave the station towards Downtown in the next 12 minutes from the current time of the device (i.e., 1:20 pm). Both of these subway lines have trains that depart towards Downtown every 15 minutes. The next scheduled departure for the subway line 27 will be in 7 minutes and the next scheduled departure for the subway line 42 will be in 12 minutes.

While the examples shown in this figure involve subway stations and subway trains, one of ordinary skill in the art would realize that the examples are equally applicable to other types of transit stations and other types of transit vehicles (e.g., from different transit systems) as well. For instance, the map application of some embodiments provides a bus stop placecard that provides the schedule for the buses that stop at the bus stop. Similarly, some embodiments provide ferry terminal placecards and rail placecards for ferries and light rails, respectively, with each placecard providing different departure schedule for the respective transit vehicles.

The illustrated example shows a transit station placecard for a subway station in which all the subway trains of different lines are scheduled to depart from the station within short intervals (e.g., every 15 minutes or less). As such, all the departure schedules are displayed in the frequency formats. As described above, the map application of some embodiments also provides transit station placecards that display departure schedules for low frequency transit vehicles (e.g., transit vehicles that depart from the transit station at longer time intervals such as every 30 minutes or more). The map application of some such embodiments displays the departure schedule differently in such transit station placecards.

As an example, when a user selects a bus stop representation that is displayed on a map presentation of a geographical area provided by the map application, the application provides a bus stop placecard for the selected bus stop. The placecard may then show a departure schedule for two different bus lines from the selected bus stop. The first bus line may include buses that depart from the bus stop with a frequency of every 12 minutes. The second bus line may include buses that depart from the bus stop with a frequency of every 30 minutes.

The map application of some embodiments displays, in the placecard, the first bus line schedule the same way as depicted in stage four of the figure. That is, the map application displays a trip heading for the line, the line number, and a frequency of departure that states "every 12 minutes." For the second line, however, the map application of some embodiments displays the format of departures differently. For example, in some embodiments, the map application displays the trip heading, the line number under the trip heading, and a set of one or more bus representations (e.g., bus logo), with a time of departure in front of each bus representation. The number of bus representations in the set varies in different embodiments. Some embodiments display only the next bus and its time of departure from the bus stop, while other embodiments display a certain number of next scheduled departures.

The above-described example illustrated a transit placecard for a subway station. In some embodiments, a user may select a transit hub representation on a displayed map presentation. A transit hub in some embodiments is a large transportation facility that includes different types of transit stations (e.g., train station, bus stop, subway station, etc.) for different transit vehicles (e.g., light rail trains, buses, subway trains, etc.). Some such embodiments, upon selection of the transit hub representation, provide a transit hub placecard with a scrollable display area that includes the departure schedules of all the different types of transit vehicles from the different types of transit stations. The user may then scroll through the different transit lines for different types of transit vehicles to view the desired transit station and the departure schedules of the transit vehicles from the desired transit station.

Figure 18:
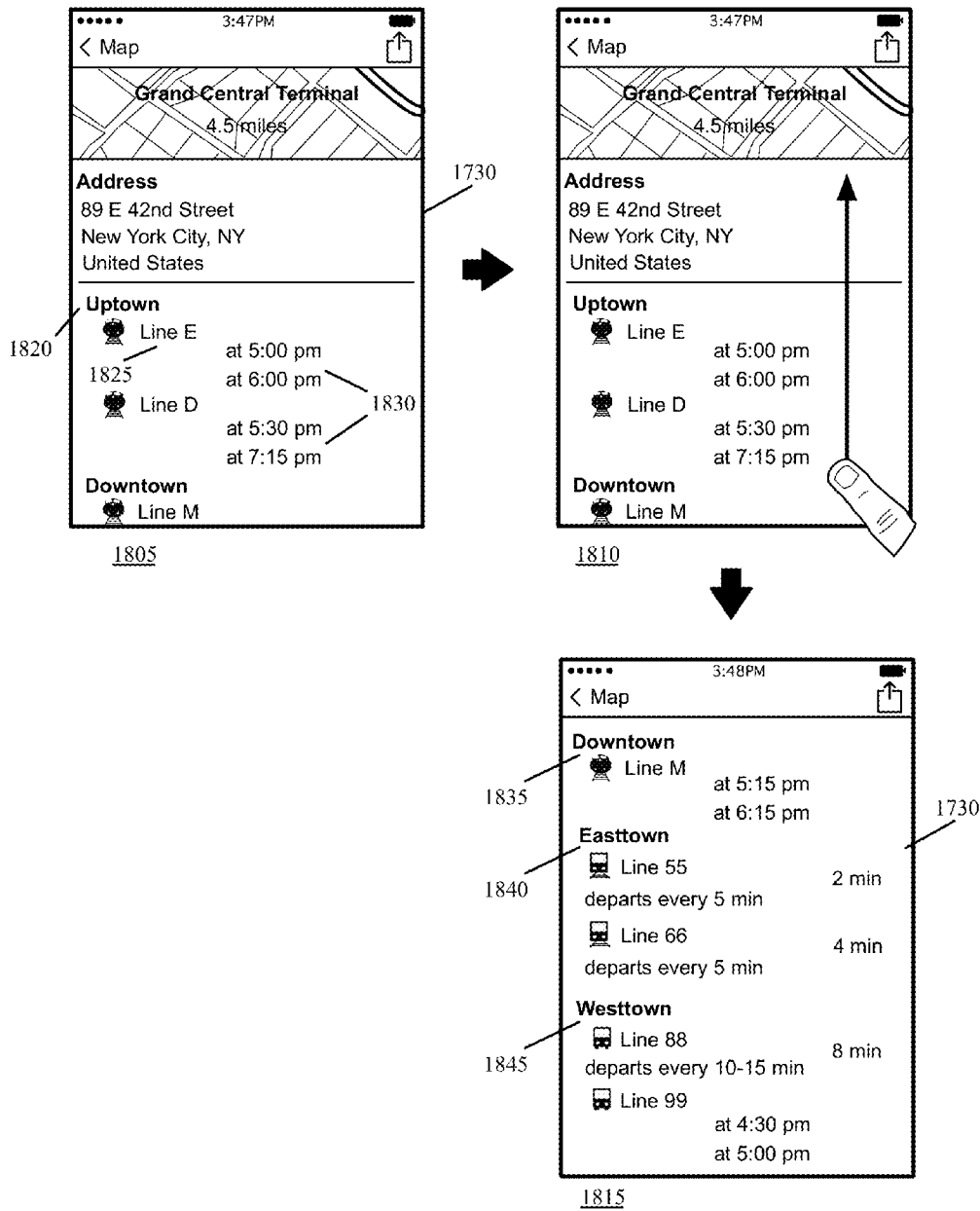
FIG. 18 illustrates an example of a transit hub placecard that provides transit information for different types of transit vehicles and transit lines departing from the transit hub.

FIG. 18 illustrates an example of a transit hub placecard that provides transit schedules for different types of transit vehicles and transit lines departing from the transit hub. Specifically, this figure shows, through three operational stages 1805-1815 of the map application UI, the transit hub placecard and user interaction with the placecard to view more information about the different transit lines' departure schedule from the transit hub.

The first stage 1805 illustrates that the map application displays, in the transit placecard display area 1730, general information about a transit hub as well as the departure schedule of different transit vehicles (i.e., rail trains) of different lines. The placecard display area can be displayed for example in response to a selection of the transit hub representation on a map presentation similar to the example shown in FIG. 17. Although in the illustrated example, the general information about the transit hub only includes the name and address of the hub, some embodiments provide a variety of information about the transit hub in the transit station placecard. For instance, the map application of some embodiments provides information such as directions to and/or from the station, images of the station (e.g., from both inside and outside the station), the reviews gathered by information aggregation entities (e.g., Yelp, Facebook, Twitter, etc.) about the transit station, etc.

The first stage also shows the departure schedule for all trains that leave the hub in the Uptown direction. More specifically, this stage shows a trip heading 1820 for all the trains that travel north (i.e., in the Uptown direction), a line number 1825 for each train, and the departure times 1830 of each train of each line. Similar to the last example, in the illustrated example, the term that is used (e.g., by the passengers and transportation system of this particular geographical area in which the subway station located) for the north is "Uptown." Hence the map application has identified and displayed Uptown as a header for the trains that travel northbound from the subway station. Under the header, the map application lists the different train lines that are scheduled to depart from the hub in the specified direction. In the shown example of stage 1805, two different train lines E and D leave the station in the Uptown direction.

Unlike the previous example though, the departure schedule of the train lines are not shown in frequency format. This is because these train lines are categorized as low frequency transit lines and as such, and as will be discussed in more detail below by reference to FIGS. 24-25, their departure times are displayed in absolute times. That is, for each train line, the map application displays the time at which the next available train of the line leaves the station. In some embodiments, for low frequency transit lines, the map application displays the time of departure of a next certain number of transit vehicles of the line.

In the illustrated example, for each line, the map application shows the next two departure times. One of ordinary skill in the art would realize that different embodiments may show different number of departures for each line (e.g., the next three departures, the next four departures, etc.). The second stage 1810 shows that the user is scrolling up the information displayed in the transit station placecard in order to view other transit information provided by the placecard. In the illustrated example, the current time shown on the device is 3:47 pm and therefore the map application displays the next available departure time for the line E at 5:00 pm and after that there is no other train departing in Downtown direction until 6:00 pm. Similarly, the next available departure time for the train line D is at 5:30 pm and after that there is no other train departing in Downtown direction for this line until 7:15 pm.

The third stage 1715 shows the transit hub placecard displaying additional departure information after scrolling the information up. The display screen 1730 now displays the Downtown departure schedule under the trip heading 1835 for the train lines that depart towards Downtown (the local directional term for southbound trains), the Easttown departure schedule under the trip heading 1840 for the subway lines that depart towards Easttown (the local directional term for East in this locality), and the Westtown departure schedule under the trip heading 1845 for the bus lines that depart towards Westtown (the local directional term for west in the locality).

In the illustrated example, the subway trains of the lines 55 and 66 are listed under the trip header Easttown which shows that these lines are scheduled to depart from the subway station every 5 minutes. This is because these subway lines are categorized by the map application (or a mapping service that provides these information to the mapping application) as high frequency lines. The next scheduled departure for the subway line 55 will be in 2 minutes while the next scheduled departure for the subway line 66 will be in 4 minutes. The third stage 1815 also shows that the buses of the lines 88 and 99 are listed under the trip header Westtown which shows that these bus lines depart in the west direction from this transit hub. However, as shown, the bus line 88 is categorized as a high frequency bus line and as such the departure schedule for this line is displayed in frequency format in the placecard, while the bus line 99 is categorized as a low frequency bus line and as such the departure schedule for this line is displayed in absolute time format (i.e., the time at which the next bus/buses of the line leave the transit hub).

Figure 19:
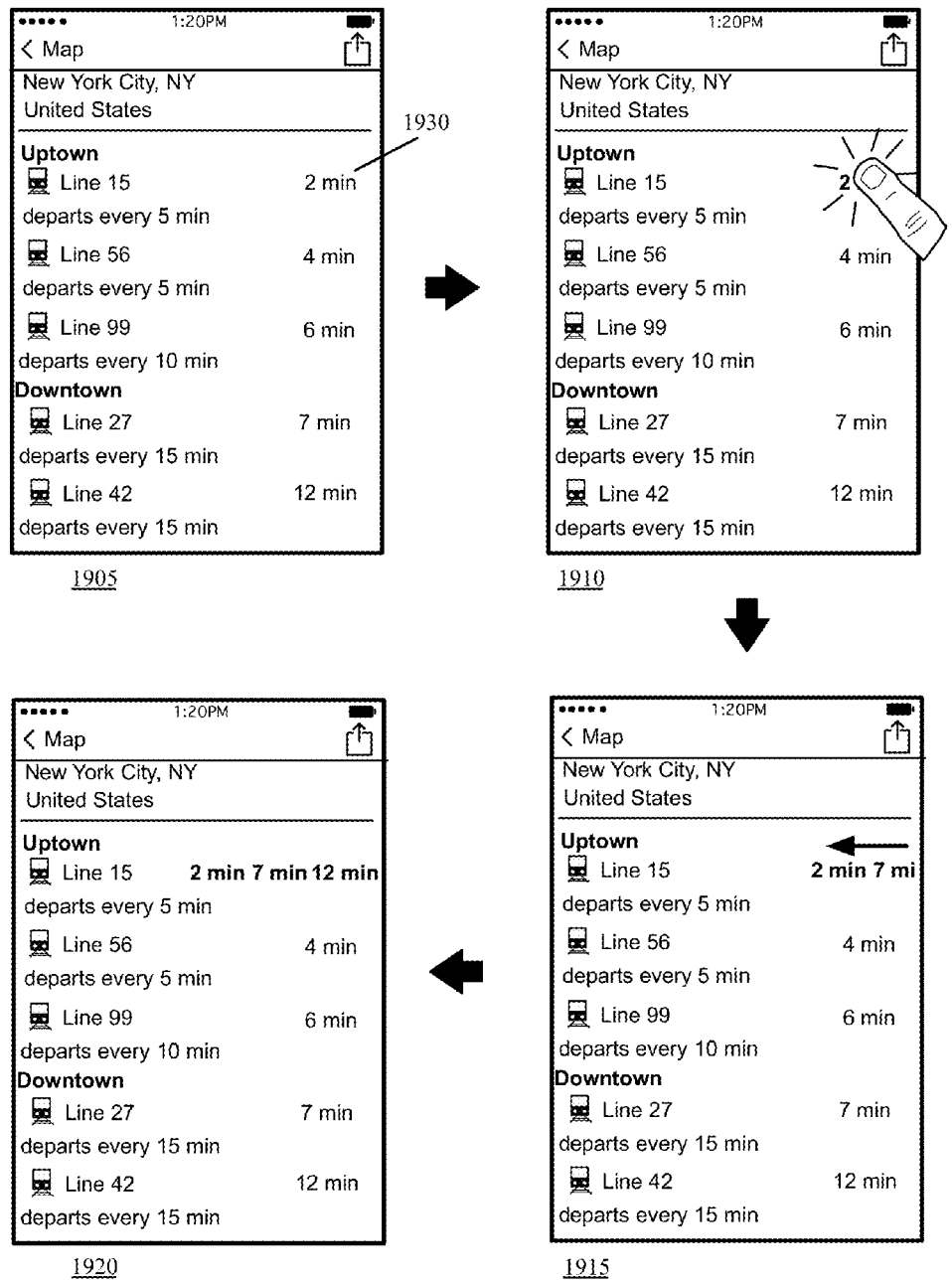
FIG. 19 illustrates an example of requesting and viewing additional transit information in a transit station placecard.

FIG. 19 illustrates an example of requesting and viewing additional transit information in a transit station placecard. The figure shows, through four different stages 1905-1920, a user's interaction with the displayed information in the transit station placecard which causes the map application of some embodiments to provide additional transit information based on the interaction. The first stage 1905 shows a transit station placecard with a display area that is identical to the display area showed in the fourth stage 1720 of FIG. 17. The placecard displays the Uptown departure schedule under the trip heading 1740, as well as the schedule for the subway trains that depart towards Downtown under the trip heading 1760. The schedules include the line number of each subway train as well as the frequency of departure and the countdown to the next scheduled departure of each line.

The second stage 1910 shows that the user selects the countdown 1930 (by tapping on a portion of the display area that displays the countdown), which shows the countdown to the next scheduled departure for subway line 15. One of ordinary skill in the art would realize that the illustrated method of selection of the countdown to view the additional information is merely exemplary and several other methods can be employed to view the additional information in other embodiments. For instance, instead of tapping on a portion of the display area that the countdown is displayed, in some embodiments, a user can scroll the displayed countdown to the left or right to see the additional information (e.g., by contacting the display screen over the portion of the display area that is displaying the countdown, and then dragging the finger to the left or right, respectively).

The third stage 1915 shows that, upon selection of the countdown 1930, the map application of some embodiments starts providing the next two countdowns by sliding the displayed countdown 1930 to the left and scrolling in the two additional countdowns. The two additional countdowns are for two additional scheduled departures of the subway line 15. The fourth stage 1920 shows that the placecard now displays the countdown to the next three departures of the line which are 2, 7, and 12 minutes, respectively. The map application of some embodiments provide the additional countdowns so the user knows the exact departure times of the trains in the future and be able to adjust his/her own schedule accordingly. Again, the number of the countdowns for future departures is merely exemplary. For instance, in some embodiments, the map application provide more countdowns while in other embodiments the map application provide less number of countdowns.

In addition, in some embodiments the user can select other lines (e.g., line 99 towards Uptown) to see additional departure countdowns for those lines. In some such embodiments the application leaves multiple departure countdowns displayed for both lines, while in other embodiments, the application removes all but the first departure countdown for the first line (line 15) while displaying multiple countdowns for the last selected line (line 99).

Figure 20:
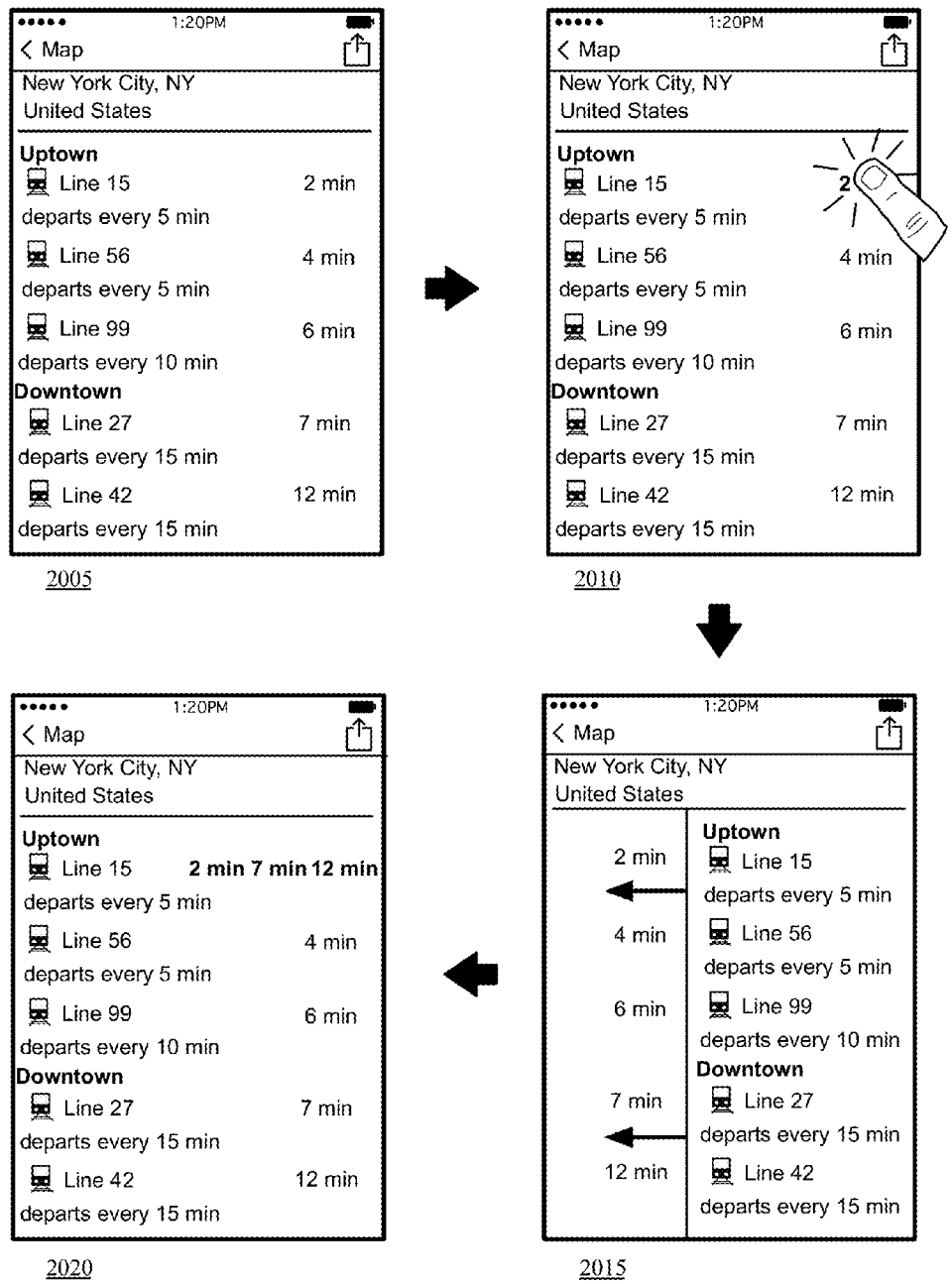
FIG. 20 illustrates another example of requesting and viewing additional transit information in a transit station placecard of some embodiments.

FIG. 20 illustrates another example of requesting and viewing additional transit information in a transit station placecard of some embodiments. This figure shows, through four different stages 2005-2020, a user's interaction with the placecard's information that causes the map application of some embodiments to provide additional transit information in the placecard. The first stage 2005 shows a transit station placecard with a display area that is identical to the display area of the placecard displayed in the first stage 1905 of FIG. 19. The placecard displays the Uptown departure schedule under the trip heading 1740, as well as the schedule for the subway trains that depart towards Downtown under the trip heading 1760. The schedules include the line number of each subway train as well as the frequency of departure and the countdown to the next scheduled departure of each line.

The second stage 2010 shows that the user selects the countdown 1930 (by tapping on a portion of the display area that displays the countdown), which shows the countdown to the next scheduled departure for subway line 15. The third stage 1915 shows that, upon selection of the countdown 1930, the map application of some embodiments starts providing the next two countdowns by sliding all of the currently displayed information to the left and scrolling in a new display screen to replace the current display screen. The new display screen of the placecard in the fourth stage 1920 displays two additional countdowns that are for two additional scheduled departures of the subway line 15. The bus stop placecard now displays the countdown to the next three departures of the bus line 15, which are 2, 7, and 12 minutes, respectively.

IV. Labeling Transit Directions

As described above, the map application of some embodiments uses direction labels (e.g., received from a mapping service running on one or more dedicated servers) in order to display trip headings (departure directions) of different transit lines. In some embodiments, a mapping service that provides traffic routes and data (including transit data) to the map application, labels the directions in which different transit vehicles travel with terms other than the customary cardinal and/or ordinal directions. In some embodiments these local directional terms often represent names of particular locations (e.g., Uptown, Downtown, Union Station, Transamerica, etc.) that are used in different localities for different directions. As such, the same label (local directional term) can be used as a trip heading for two transit vehicles that travel in different (e.g., opposite) directions but towards a same location and/or place. In addition, a single transit line in the same cardinal direction may have different labels in different localities.

For instance if a bus in a particular geographical area travels south or south east in the Downtown direction, and in that particular geographical area the term "Downtown" is used for those directions towards the Downtown, the mapping service identifies and labels the departure direction of the bus as "Downtown" at the bus stops that are on the bus route before the bus reaches Downtown. Conversely, for other buses that travel north from the opposite side of the particular geographical area (i.e., buses that travel north towards Downtown), the mapping service labels the departure directions (trip headings) of the buses as "Downtown" as well. Therefore, one particular trip heading (e.g., Downtown) can be used for both (1) departure direction of the transit vehicles that travel in a first direction (e.g., south), and (2) departure direction of the transit vehicles that travel in a second different direction (e.g., north).

In order to label the directions, the mapping service of some embodiments divides a scheduled route of a transit vehicle that begins from a first transit station (e.g., a bus terminus as the starting station, etc.) and ends at the last transit station, into different geographical areas. The mapping service then identifies a local directional term that is used in each geographical area division (i.e., in each separated locality) for the direction in which the transit vehicle travels. That is, the mapping service identifies a local directional term that is used in each locality for the traditional cardinal direction in which the transit vehicle travels.

In some embodiment, the map application receives this information (i.e., local directional terms) from one or more remote servers (from a mapping service running on the remote server(s) as described above), while in other embodiments, the map application stores this information locally on the device on which the application executes. In yet other embodiments, the map application stores a part of this information on the device and receives another part of the information from one or more remote servers. Some embodiments identify the direction of the route and send the identified direction to a remote server and in return, receive the local directional term from the server. Some embodiments use these local directional labels as trip headings of the transit vehicles in different display areas of a map application (e.g., placecards, navigation list views, navigation banners, etc.).

This way, for a single transit line, the trains of which travel in one specific direction and pass through several different geographical areas, the trip headings (departure directions) can be different at different transit stations of the different geographical areas. For instance, when the buses of a particular bus line travel south and pass through two different localities with two different local directional terms for south, the particular bus line will have a first trip heading that is used at the bus stops (e.g., displayed in the placecards of the bus stops) of the first locality and a second different trip heading that is used at the bus stops of the second locality.

Figure 21:
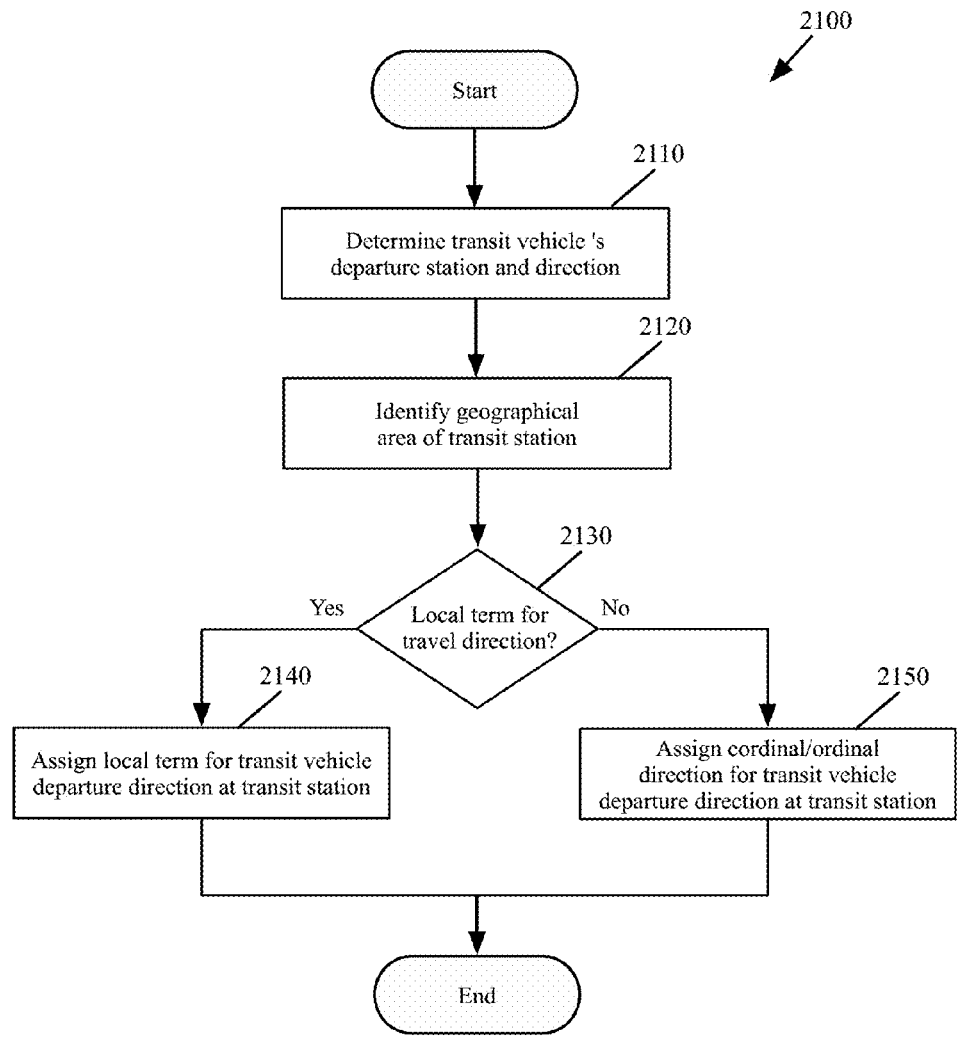
FIG. 21 conceptually illustrates a process that some embodiments perform to assign local directional terms as trip headings of different transit vehicles.

FIG. 21 conceptually illustrates a process 2100 that some embodiments perform to assign local directional terms as trip headings of different transit vehicles. In some embodiments this process is performed by a mapping service that provides transit data to a map application. In some other embodiments the process is performed by a specific server of a mapping service that is dedicated for this purpose. In yet other embodiments the process is performed by the map application.

The process 2100 begins by determining (at 2110) the transit vehicle's departure station and direction. Specifically, the process determines the trip heading of the transit vehicle at a particular transit station for which a local directional term is sought. That is, the process determines in which direction the transit vehicle departs from the particular transit station (e.g., the vehicle departs in north direction, in south direction, etc.).

The process 2100 then identifies (at 2120) the geographical area in which the particular transit station is located. The process of some embodiments identifies the particular division of the geographical area in which the transit station is located. As described above, each division of a geographical area is situated between a particular pair of borders on the route of a transit vehicle. Some embodiments define these borders based on the different local terms that are used for different directions in each division. Some other embodiments divide a geographical area based on the divisions made by the different transit service providers. Some other embodiments divide the geographical areas to different localities based on a combination of these factors or some other factors.

Next, the process determines (at 2130) whether a local directional term is used for the identified departure direction at the particular transit station in the identified locality. The process of some embodiments receives this data from a mapping service that has gathered and stored the local directional terms for such purpose. When the process determines that no local directional term is used for the particular direction in this locality, the process of some embodiments assigns (at 2150) the traditional cardinal and/or ordinal direction as the trip heading of the transit vehicle at the station. For example, after the process determines that the departure direction of the transit vehicle is southwest and there is no local direction term for this direction in this area, the process assigns the trip heading of the transit vehicle at the particular station as "Southwest." The process then ends.

On the other hand, when the process determines that a local directional term exists at the locality, the process assigns (at 2140) the identified term as the trip heading for the transit vehicle. For example, when the process determines that "Famous Building" is a local directional term that is used for north at a particular bus stop in a particular locality, the process assigns the "Famous Building" as the trip heading for the buses that travel north and stop at the particular bus stop (e.g., in the bus stop's placecard, in a navigation banner with a navigation instruction that includes the bus stop, etc.). The process then ends.

Some embodiments perform variations of the process 2100. The specific operations of the process 2100 may not be performed in the exact order shown and described. Additionally, the specific operations may not be performed in one continuous series of operations, and different specific operations may be performed in different embodiments. For example, the process of some embodiments (1) identifies a particular transit station's location (without identifying a particular transit vehicle's departure), (2) identifies all different departure directions from the particular transit stations, and (3) based on the locality of the station, assigns different local directional terms as different trip headings of the different transit lines that depart from the particular transit station.

Figure 22:
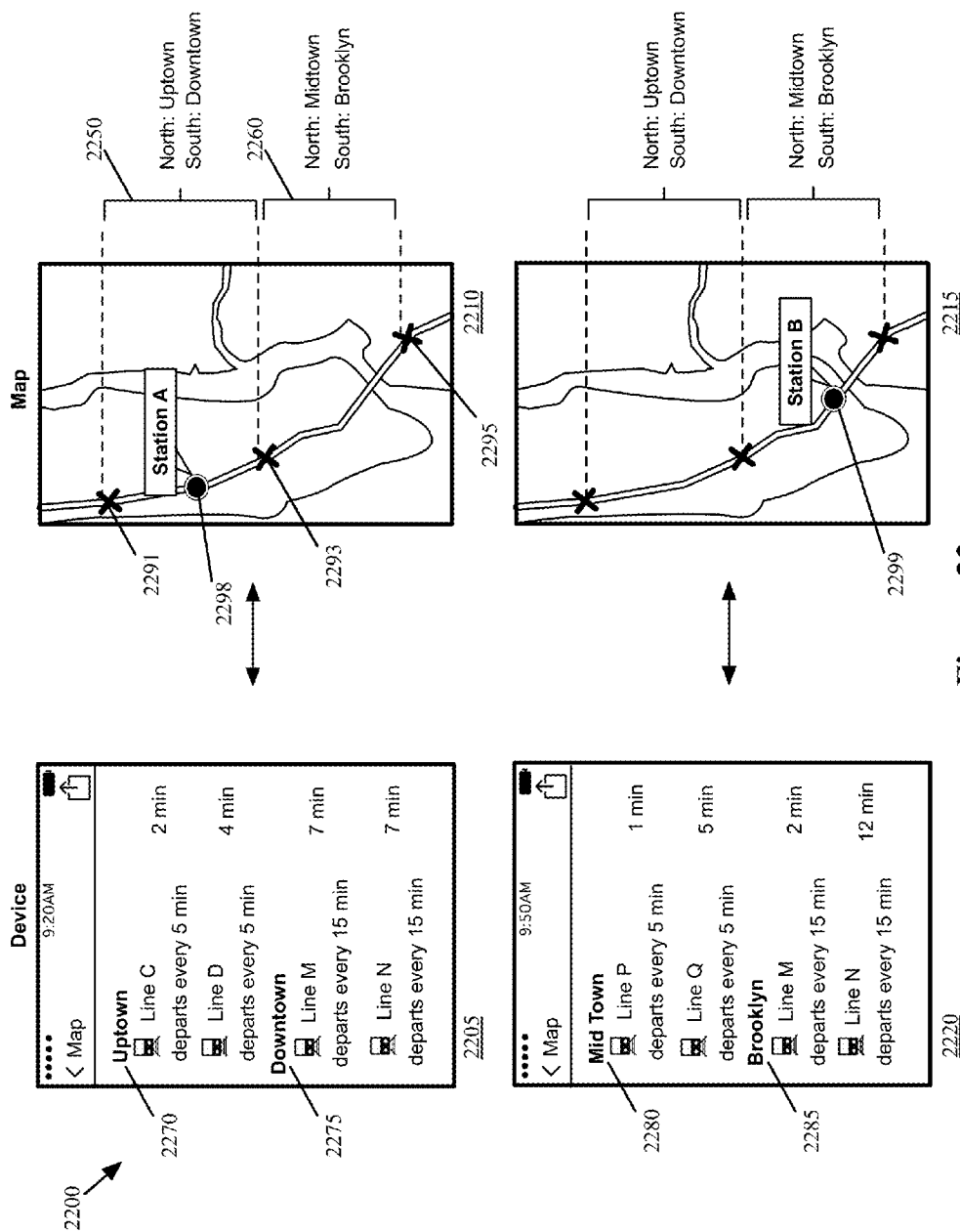
FIG. 22 illustrates labeling the directions of a transit vehicle differently in different localities.

FIG. 22 illustrates labeling the directions of a transit vehicle differently in different localities. This figure is described in terms of two different examples 2205 and 2210 of the map application UI 2200 and two top-down views 2215-2220 of the map that illustrate the position and orientation of the transit vehicle in two geographical areas that corresponds to the two examples 2205 and 2210, respectively.

In the first example 2205 the map application UI 2200 includes a transit station placecard that displays the departure schedules of two different trips from the transit station (Station A) that is located in a particular geographical area. The schedules includes departure schedules for the subway lines C and D under the trip heading 2270, and departure schedules for the subway lines M and N under the trip heading 2275. The corresponding top down view 2215 of the first example 2205 shows that the particular geographical area covers an area 2250 of the map that is between two borders (also referred to as inflicition points) 2291 and 2293. The top down view 2215 further shows that the subway station 2298 is located in this geographical area 2250.

The map application, in the first example 2205, has identified the location of the transit station (e.g., after the user selected this subway station to view the departure schedule for the subway line M from this station). The map application then determines that the geographical area (locality) of the transit station is the geographical area 2250. The map application then identifies the local directional terms that are used in this locality (e.g., through the mapping service described above) for the different directions of the subway trains departing from this transit station. As illustrated in the top down view 2215, the local directional term in this locality for "north" (e.g., the subway trains that travel north) is "Uptown" and for "south" (e.g., the subway trains that travel south) is "Downtown." These terms, however, can be different for the same directions in a neighboring locality (i.e., a locality before the infliction point 2291 or after the infliction point 2295). This is further shown in the top down view 2215, where the local directional term for "north" in the geographical area 2260 is "Midtown" and the local directional term for "south" in this locality is "Brooklyn."

Accordingly, the first example 2205 of the UI shows that the map application has identified and displayed Uptown as the trip heading 2270 for the subway trains that travel northbound from the subway station. Under the trip heading 2270, the map application lists the departure times of the subway trains from lines C and D that are scheduled to depart from the subway station next. More specifically, this example shows that a subway train of line C is scheduled to depart from the station in 2 minutes and a subway train of line D is scheduled to depart from the station in 4 minutes. Both lines C and D have a departure frequency of 5 minutes.

Similarly, the first example 2205 shows that the map application displays Downtown as the trip heading 2275 for the subway trains that travel southbound from the subway station. Under the trip heading 2275, the map application lists the departure times of the subway trains from the lines M and N that are scheduled to depart from the subway station next. More specifically, this example shows that a subway train for line M is scheduled to depart from the station in 7 minutes and a subway train of line N is also scheduled to depart from the station in 7 minutes. Both lines M and N have a departure frequency of 15 minutes.

The second example 2210 of the UI 2200 shows a different transit station placecard that displays the departure schedules of two different trips from a second transit station (Station B) that is located in a different geographical area compared to the first example 2205. The schedules in this example include departure schedules for the subway lines P and Q under the trip heading 2280, and departure schedules for the same subway lines M and N under the trip heading 2285. The corresponding top down view 2220 of the second example 2210 shows that the new geographical area covers an area 2260 of the map that is between two infliction points 2293 and 2295. The top down view 2220 further shows that the subway station 2299 is located in this geographical area 2260.

The map application, in the second example 2210, has identified the location of the second transit station 2299 (e.g., after the user selected this subway station to view the departure schedule for the subway line M from this station). The map application then determines that the locality of the transit station is now the geographical area 2260. The map application then identifies (e.g., through the mapping service running on a dedicated server) the local directional terms that are used in this locality for the different directions of the subway trains of different lines departing from this transit station. As illustrated in the top down view 2220, the local directional term in this new locality for north direction is "Midtown" and for the south direction is "Brooklyn."

The second example 2210 of the UI shows that the map application has identified and displayed Midtown as the trip heading 2280 for the subway trains that travel northbound from the subway station. Under the trip heading 2280, the map application lists the departure times of the subway trains from lines P and Q that are scheduled to depart from the subway station next. More specifically, this example shows that a subway train of line P is scheduled to depart from the station in 1 minute and a subway train of line Q is scheduled to depart from the station in 5 minutes. Both lines P and Q have a departure frequency of 5 minutes.

The second example 2210 also shows that the map application displays Brooklyn as the trip heading 2285 for the subway trains that travel southbound from the second subway station. Under the trip heading 2285, the map application lists the departure times of the subway trains from the lines M and N that are scheduled to depart from the subway station next. More specifically, this example shows that a subway train of line M is scheduled to depart from the station in 2 minutes and a subway train of line N is also scheduled to depart from the station in 12 minutes. Both lines M and N have a departure frequency of 15 minutes.

As shown in the illustrated example, the same transit lines (lines M and N) are listed under two different trip headings in two different transit station placecards while the transit vehicles of these lines depart from the two different stations in the same direction. That is, the subway trains of lines M and N in both of illustrated localities travel southbound. However, in the placecard of the first subway station (i.e., Station A) which is in the first locality, these transit lines' departure directions are labeled "Downtown," while in the placecard of the second subway station that is in the second locality, their departure directions are labeled "Brooklyn." As stated above, the reason for this is that in each of these localities the local term that is used (e.g., used in transportation system of each locality) for the south direction is different. Some embodiments display the traditional cardinal (and ordinal) directions as trip tiles when these embodiments do not identify any particular local directional term to replace the traditional cardinal (and ordinal) directions. Some other embodiments do not display the directions in the trip headings when they do not identify any replacement local directional term in a particular locality.

While the examples shown in this Figure involve subway stations and subway trains, one of ordinary skill would realize that the examples are equally applicable to other types of transit stations and other types of transit vehicles (e.g., from different transit systems) as well. For example the transit station can be any one of a bus stop, light rail station, ferry terminal, etc. in different embodiments. Conversely, the transit vehicle of the illustrated example can be replaced by any one of a bus, a trolley, a tram, a ferry, etc. Furthermore, while the illustrated examples describe the usage of local directional terms in transit station placecards, these terms are equally used to display the trip direction of a transit vehicle in other display areas and user interfaces of the map application in some embodiments. For instance, the map application of some embodiments displays the local directional terms in the route (navigation) list view (as described above) and navigation banners (as will be discussed below) to display the traveling direction of the transit vehicle.

Additionally, although many of the embodiments described above, two different departure directions are shown at each transit station, one of ordinary skill in the art would realize that there can be more than two departure directions for different transit lines' vehicles departing from a transit station. For instance, as described above in FIG. 18, a transit hub may have four or more directions (north, south, east, west, northwest, etc.) for the different transit lines that depart from the hub, in which case, each departure direction will be labeled with a directional term that is used in the locality of the transit hub (if a local term is used for the direction). Also, the local terms are the terms that are used for different directions by the transportation system in a locality (e.g., passengers of the locality, transit authorities, transit service providers, etc.). Lastly, in some embodiments, the map application dynamically determines the local terms (e.g., by demanding the data from one or more mapping service providers) when the application displays this information. In some embodiments the directional terms are predetermined and stored by the map application or the mapping service (e.g., in a predefined placecard for a transit station).

V. High and Low Frequency Transit Vehicles

A. Displaying Departure Schedules

As described above, in some embodiments, a transit line is characterized as a high frequency or a low frequency transit line based on the number of departures of the transit vehicles of the line from a particular transit station during a particular period of time. Similarly, in some embodiments a transit vehicle of a particular line is characterized (1) as a high frequency transit vehicle when the transit vehicle belongs to a high frequency line, and (2) as a low frequency transit vehicle when the line of the vehicle is a low frequency transit line.

Accordingly, in some embodiments, a first transit line (e.g., a first bus line) can be characterized as a low frequency transit line at a particular transit station, while a second, different transit line (e.g. a second bus line) can be characterized as a high frequency transit line at the particular transit station. Conversely, in some embodiments, a transit line can be characterized as a high frequency transit line at a particular transit station during a first time period (e.g., on even days of the week, in the mornings, between two particular hours, etc.), while the same transit line can be characterized as a low frequency transit line at the same particular station but during a second different time period (e.g., on odd days of the week, in the evenings, between two particular hours, etc.).

The map application of some embodiments treats the high frequency transit lines differently than the low frequency transit lines. As one example, the application presents the departure times of high frequency transit vehicles in a first manner while it presents the departure times of low frequency transit vehicles in a second different manner in different display areas of the UI of the application. Additionally, the application of some embodiments classifies high frequency transit lines into different classes and presents the frequency of departure for each class differently.

In some embodiments, categorizing the transit lines into high and low frequency lines and computing the frequency of departures of a particular transit line are done by a mapping service that runs on one or more dedicated servers. In some embodiments the mapping service is the same mapping service from which the map application receives the different mapping data (e.g., road data, traffic data, etc.) and routing data. In some embodiment the map application computes the departure frequencies, while in other embodiments part of the departure frequencies is computed by the device on which the map application executes and the other part of the departure frequencies is received from one or more mapping services.

In order to determine the frequency of departures of a transit line from a transit station during a particular time period, the mapping service of some embodiments first determines whether the transit vehicles of the line depart from the transit station on average at least once during a certain time period (e.g., 30 minutes). This certain time period can be different in different areas or for different transit lines of the same or different transit systems. When the mapping service of some such embodiments determines that the vehicles of the transit line depart at least once during the certain time period, the service categorizes the transit vehicles of the line as high frequency transit vehicles. The mapping service then calculates the frequency of departures for high frequency transit lines.

For example, in order to determine whether a bus line at a bus stop is a high frequency line or a low frequency line, the mapping service determines whether a bus of the line departs from the bus stop every N (e.g., 25) minutes for the next M hours (e.g., 3 hours). If there is at least one bus that departs from the stop in every N minutes for the next M hours, the mapping service categorizes the bus line as a high frequency line at the station for the next M hours. In some embodiments the mapping service makes such a determination based on the transit data that it receives from one or more transit service providers. In some embodiments, the mapping service periodically requests for or automatically receives the transit data from the transit service providers while in other embodiments the mapping service requests the transit data when it receives a request (e.g., from a map application) for departure frequency of a line.

In order to compute the frequency, the mapping service of some embodiments first identifies the time intervals between each pair of departures of the transit vehicles of the line that head the same direction from the same transit station during a particular time period. The service then applies a series of mathematical functions and formulas to the identified numbers (i.e., the sequence of the gaps between the departure times) in order to calculate the frequency of departures for the line. In some embodiments the calculated departure frequency can be a number that represents the exact frequency of departures (e.g., every 5 minutes), a number that represents an approximation of frequency of departures (e.g., about every 5 minutes), or a range of numbers (e.g., every 5-8 minutes). Some embodiments first determine whether an exact frequency can be used, then determine (if no exact frequency is found) whether one of a set of frequency ranges can be used, and only attempt to find an approximate frequency value if the first two options are unsuccessful.

Depending on the frequency category of a transit line at a transit station, the map application of some embodiments displays the departure schedule of the transit line in a different format on different display areas of the UI of the application (e.g., on placecards, navigation banners, etc.). For example, for a high frequency transit line, the map application displays the departure time of the line in a frequency format. That is, the application displays the frequency of departures of the transit vehicles of the line (e.g., every 5 minutes, 5-10 minutes, etc.) from the transit station. For a low frequency transit line, however, the map application of some such embodiments displays the departure time in an absolute time format. That is the map application displays the time at which the transit vehicles of the line leave the station (e.g., at 2:30 pm, at 3:30 pm). In some embodiments, the application displays only one frequency of departures for a high frequency line (e.g., under the trip heading in a placecard), while it displays multiple departure times for the next transit vehicles of a low frequency line (e.g. the next three departure times of a train line under the trip heading of the line).

Figure 23:
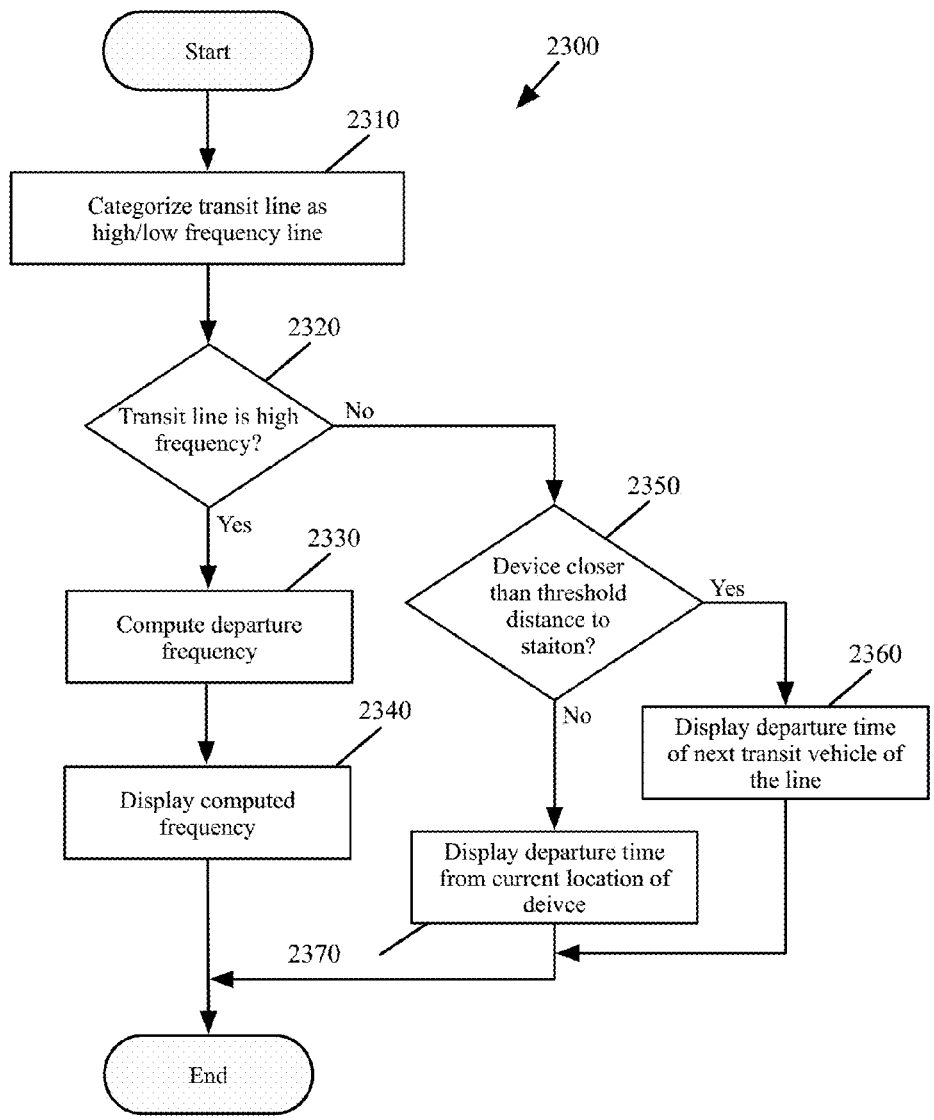
FIG. 23 conceptually illustrates a process that some embodiments perform to provide departure schedule of a transit line.

FIG. 23 conceptually illustrates a process 2300 that some embodiments perform to provide departure schedule of a transit line. In some embodiments, this process is performed by the mapping service as described above while in other embodiments the process is formed by the map application. The process 2300 is initiated by categorizing (at 2310) the transit line as either a high frequency transit line or a low frequency transit line. As described above, some embodiments categorize a transit line as a high frequency transit line when the transit vehicles of the line depart from a particular transit station on average at least once during a certain time period (e.g., 30 minutes) in a certain duration of time (e.g., 2 hours). Otherwise some such embodiments categorize the line as a low frequency transit line.

The process then determines (at 2320) whether the transit line is a high frequency transit line or low frequency. When the process determines that the transit line is high frequency, the process computes (at 2330) the departure frequency of the transit line. As described above and below, the process of some embodiments computes the departure frequency of the line by determining whether a collection of successive gaps in the departure times of the transit line from a particular transit station can be expressed by (1) a single exact number, (2) a single approximate number, or (3) a pair of numbers that describe the range of gaps between successive departure times.

After computing the departure frequency of the high frequency transit line, the process 2300 provides (at 2340) the computed frequency (e.g., "every 5 minutes," "about every 10 minutes," or "4-8 minutes") as the departure schedule of the transit line. The process then ends. The process of some embodiments provides the departure frequency to be displayed in different display areas of the map application. For example the departure frequency can be displayed, as the departure schedule of a transit line, in a transit station's placecard from which the transit line departs, in the navigation banner that shows navigation instruction related to the transit line, etc. On the other hand, when the process determines (at 2320) that the transit line is a low frequency transit line, the process determines (at 2350) whether the device is closer than a threshold distance to the transit station at which the departure schedule of the transit line was sought to be displayed.

When the process determines that the device is closer than the threshold distance, the process provides (at 2360) the departure time of the transit line's next transit vehicle. That is, the process provides (e.g., in the transit station's placecard, in the navigation banner, etc.) an absolute departure time at which the next transit vehicle of the line leaves the transit station (e.g., "Departs at 2:30 pm," etc.). The process then ends.

Alternatively, when the process determines that the device is outside the threshold distance from the transit station, the process provides (at 2370) the departure time from current location of the device. That is, the process provides (e.g., to be displayed in a route planning display area, in a navigation banner, etc.) the time by which the user should leave the current location to be able to board the next transit vehicle of the line at the transit station. As discussed above, some embodiments, display only one frequency of departures for a high frequency line (e.g., under the trip heading in a placecard), while these embodiments display several departure times for the next transit vehicles of a low frequency transit line (e.g. the next three departure times of a train line under the trip heading of the line at the train station). The process then ends.

Some embodiments perform variations of the process 2300. The specific operations of the process 2300 may not be performed in the exact order shown and described. Additionally, the specific operations may not be performed in one continuous series of operations, and different specific operations may be performed in different embodiments. For example, the process of some embodiments displays one or more countdowns to the next departure times of a transit line next to the computed frequency when the process displays the computed frequency.

As stated above, in addition to the category of frequency (i.e., high frequency or low frequency), the map application displays the departure schedules of transit lines based on other factors as well. For instance, in some embodiments, the map application displays different formats for departure schedules based on the frequency category as well as the position of the device in relation to the transit station. FIGS. 24 and 25 illustrate different formats of displaying the departure schedules of transit vehicles from a transit station based on the frequency category of the transit vehicles and based on the position of the device. More specifically, FIG. 24 illustrates the UI 2400 of the map application of some embodiments that displays the departure schedule of a subway train from a subway station in terms of three different examples 2405-2415.

In the first example 2405, the map application UI 2400 shows the best transit route 2420 to an address (i.e., 345 B Street) drawn over a presentation of a map in the map presentation area 130. The current device's location 2425 is also shown on an area of the map presentation that is relatively far from the subway station 2430. The route summary display area 193 displays a walking person representation for the walking leg of the trip and a subway train representation that travels the subway leg of the transit route 2420. The display area 193 in this example also shows that the total trip time from the current position of the device to the address is 1.6 hour (1 hour and 36 minutes) which includes a total walking distance of 1.2 miles. The first example 2405 further shows that the display area 2490 displays a departure schedule of every 5-10 minutes for the subway train line 166 which takes the user (passenger) to the destination address.

The illustrated example shows, in the display area 2490, the frequency of departures of the subway trains of line 166. In this example though, the subway train of line 166 is the only high frequency transit vehicle required to reach the destination. Different embodiments show different schedules in the display area 2490 based on the number of legs of the trip and based on whether each leg of the tip is traveled by a high frequency transit vehicle or a low frequency transit vehicle. In some embodiments, the map application provides the frequency of departures of the first transit vehicle that travels the first leg of the trip when there is a combination of high and low frequency transit vehicles traveling different legs of the transit route.

In some other embodiments, when all the transit vehicles of the transit route are high frequency transit vehicles, the map application provides a total frequency of departures of the trip. That is, in some such embodiments, the application calculates the transit route frequency based on different sequence of departure gaps in each leg of the transit route, and then provides the transit route frequency (i.e., total frequency of departures of the lines that are used in the transit route) in the display area 2490. The method of computation of the departure frequency of a transit route of some embodiments is described in detail below by reference to FIGS. 29 and 30.

The second example 2410 of FIG. 24 shows the best transit route 2440 to another address (i.e., 567 C Street) drawn over the map presentation in the map presentation area 130. The current device's location 2425 in this example, however, is at or very close to the subway station 2430. As a result, the route summary display area 193 does not display a walking person representation for any walking leg of the trip. Instead this display area only includes a subway train representation that travels the subway leg of the transit route 2440. The display area 193 in this example also shows that the total trip time from the current position of the device to the address is 25 minutes and includes a total walking distance of only 0.1 miles. The second example 2410 further shows that the display area 2490 displays a departure schedule of every 5 minutes for the subway train line 188 which takes the user (passenger) to the destination address in this example.

The third example 2415 shows the same UI of the second example 2410 with the same transit route 2440 to the same address (i.e., 567 C Street). The current device's location 2425 in this example is also at the subway station 2430. However, in this example the time of day is 11:30 pm, whereas the time of day in the second example was 1:20 pm. The display area 193 at this example also shows that the total trip time from the current position of the device to the address is 25 minutes and includes a total walking distance of only 0.1 miles. The third example 2415, however, shows that the display area 2490 now includes a departure schedule of "about every 13 minutes" for the same subway line 188. This is because the subway line at this time of the day has fewer departures from the transit station compares to earlier in the afternoon. The reason for displaying the departure frequencies in a different format in each of the above-described examples (i.e., "every 5-10 minutes," "every 5 minutes," and "about every 13 minutes") is described below in details by reference to FIGS. 26 and 28.

FIG. 25 illustrates the UI 2500 of the map application of some embodiments that displays the departure schedule of a train (e.g., a light rail train) from a train station in terms of two different examples 2505 and 2510. As described above, the map application of some embodiments groups different transit vehicles into high frequency transit vehicles and low frequency transit vehicles. The application looks at the departure intervals of the transit vehicles of a line from a station and if the intervals are greater than a threshold (e.g., 30 minutes), the application groups those transit vehicles as low frequency transit vehicles. In this example, the intervals between departures of every train of line E from the train station is an hour, hence the trains of this line are categorized as low frequency trains.

In the first example 2505, the map application UI 2500 shows the best transit route 2520 to an address (i.e., 789 D Street) drawn over a presentation of a map in the map presentation area 130. The current device's location 2525 is also presented on an area of the map presentation that is relatively far from the train station 2530. The route summary display area 193 displays a walking person representation for the walking leg of the trip and a train representation that travels the train leg of the transit route 2520. The display area 193 in this example also shows that the total trip time from the current position of the device to the address is one hour and 45 minutes which includes a total walking distance of 1.4 miles. The first example 2505 further shows that the display area 2590 displays the time by which the user should leave the current location of the user (i.e., 1:35 pm) to be able to catch the next train of line E which takes the user (passenger) to the destination address.

As described above, the map application of some embodiments can intelligently guide the user to plan for a transit trip based on the user's location. The map application of some such embodiments first identifies the location of the device on which the application runs. The application then evaluates the distance between the device and the first transit station at which the user boards the first transit vehicle. When the application realizes that the user is far away from the transit station (e.g., farther than a threshold distance), the application displays the time by which the user should start the transit trip (i.e., the user should leave the current location towards the first transit station). On the other hand, when the user is at or near the transit station (e.g., closer than the threshold distance), the application displays the time at which the first transit vehicle of the line leaves the transit station.

The second example 2510 shows the same transit route 2520 to the destination address as in the first example, drawn over the map presentation. The current device's location 2525 is, however, very close to the train station 2530 in this example (the device is shown almost at the transit station). The route summary display area 193 does not display a walking person representation in example 2510 and only shows the train representation that travels the train leg of the transit route 2520. The display area 193 in this example also shows that the total trip time from the current position of the device to the address is 45 minutes which includes a total walking distance of 0.1 miles. The second example 2510 further shows that the display area 2590 displays the time at which the first train of line E is scheduled to depart from the train station (i.e., 2:30 pm). This is because, in this example, the map application has identified that the user is within the vicinity of the train station and therefore it shows the departure time of the train instead of the time at which the user should leave the her current location.

B. Computing Departure Frequency

As described above, the mapping service of some embodiments calculates the frequency of departures of high frequency transit vehicles of a transit line and then displays the calculated frequency. In order to calculate the frequency of departures, the mapping service of some embodiments uses a novel method that receives a transit line's departure schedule (e.g., a departure timetable of the transit line) for a particular route of the line and produces frequencies of departure of the line at each station along the particular route for any given time and day. The received departure schedule of the route in some embodiments includes the departure times of the transit vehicles of the line at each transit station of the particular route during a particular time period (e.g., a day, a week, a month, etc.).

The method first generates a window group for each departure time of the line at a particular station. In some embodiments each window group includes a sequence of departure times that starts with the corresponding departure time at the station and continues with the departure times that are after the corresponding departure time, up to a reasonable time bound into the future. The time bound in some embodiments can be set to include at least L departures times (e.g., 4 departure times) and at most H departure times (e.g., 10 departure times), such that the last departure time is no more than T hours (e.g., 2 hours) into the future with respect to the start time.

For example, when the departure times for the bus line X at the bus stop Y are "4:49, 5:04, 5:19, 5:34, 6:04, 6:19, 6:34, 6:49, 7:04, 7:19," the window group for the departure time 4:49 at the station includes the departure times "4:49, 5:04, 5:19, 5:34, 6:04, 6:19, 6:34," which is between four and ten departure times and at the same time the latest time in the group is not more than two hours from the start time. Similarly, the window group for the departure time 5:04 at the station includes the departure times "5:04, 5:19, 5:34, 6:04, 6:19, 6:34, 6:49, 7:04," and the window group for departure time 5:19 would include "5:19, 5:34, 6:04, 6:19, 6:34, 6:49, 7:04, 7:19," and so on.

The method of some embodiments does not generate a window group when no such contiguous subsequence is feasible (i.e., the subsequence of departure times). In some embodiments the subsequence is not feasible when the departure schedule data is not available or the departure times at the station are drastically different (e.g., there are two departures in the morning and three departures in the evening). In some other embodiments, the method generates an empty window group when no such contiguous subsequence is feasible. Each generated window group (i.e., for each associated departure time at the station) is then processed independently by the method of some embodiments.

The method processes each window group by approximating the sequence in each window group using a single number that expresses the gaps in the departure sequence (i.e., the intervals between each consecutive pair of departures), or a pair of numbers that expresses a range of gaps in the departure sequence. The size of the expression generated by the method of some embodiments is independent of the departure sequence size. Therefore the resulting expression succinctly expresses the sequence.

Figure 26:
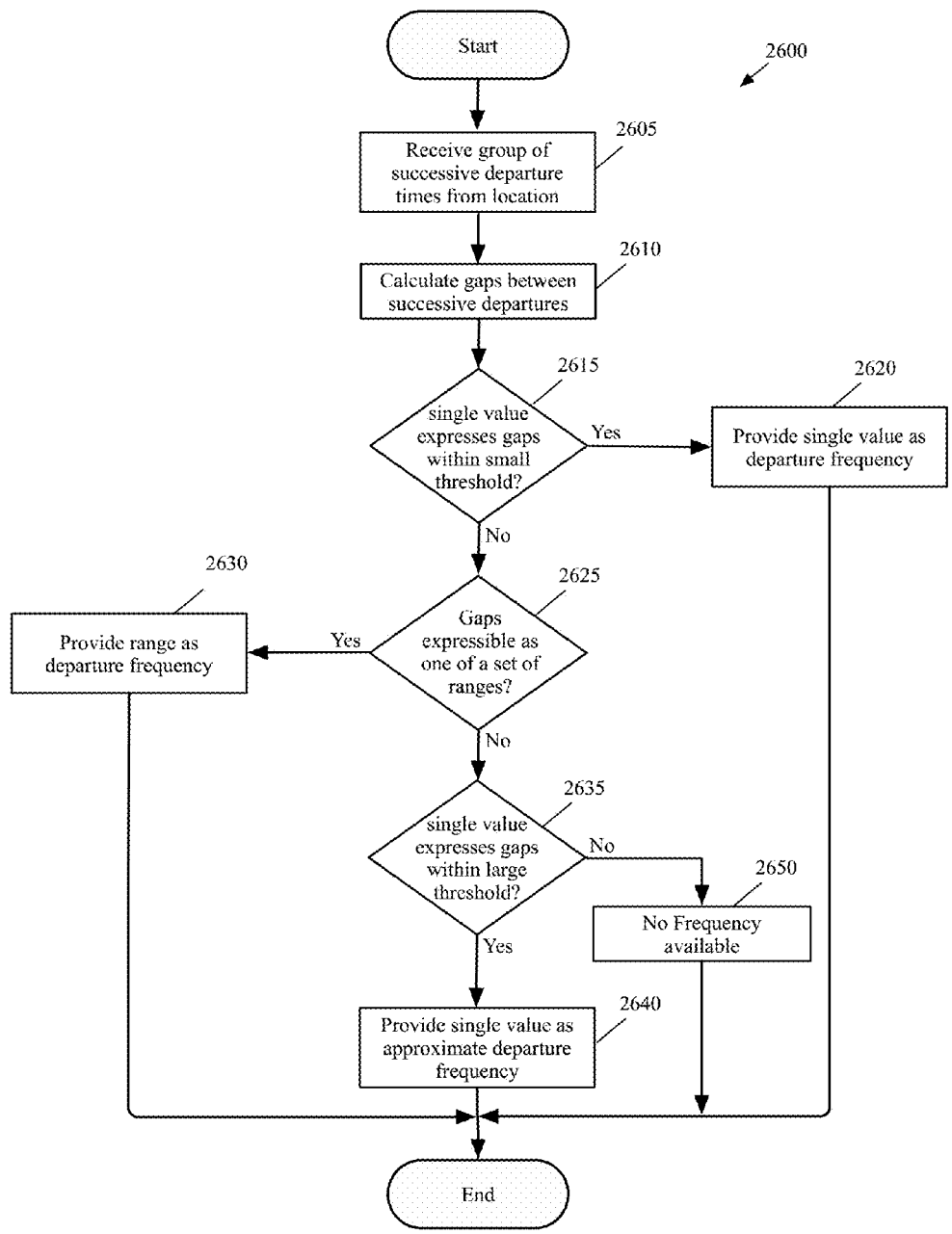
FIG. 26 conceptually illustrates a process that some embodiments perform to determine how to express (present) the departure schedule of a high frequency transit line.

The method of some embodiments tries to express the sequence of gaps (intervals between departures) with respect to a specification that includes several thresholds that are used to determine whether the collection of successive gaps in the departure times can be expressed by (1) a single exact number, (2) a single approximate number, or (3) a pair of numbers that describe the range of gaps between successive departure times. FIG. 26 conceptually illustrates a process 2600 that some embodiments perform to determine how to express (present) the departure schedule of a high frequency transit line. Specifically, the process 2600 determines whether to express the departure intervals with an exact number, an approximate number, or a range of numbers. In some embodiments a mapping service that runs on one or more dedicated servers performs the process and stores the results to be sent to the map application or returns the results in real time (i.e., upon request) to the map application. In some other embodiments, the process is performed by a map application that executes on a device.

In some embodiments, the process is performed by a mapping service that runs on one or more servers and provides the transit data (e.g., routing, navigation, incidents, direction labeling, etc.) to the map application. In some other embodiments, the process is performed by one or more servers that are designated specifically for computing departure frequencies. In some embodiments, the server pre-computes the departure frequencies of different transit lines and upon startup loads the pre-computed frequencies into memory (e.g., volatile memory, etc.) and organizes the frequencies in the memory.

In some such embodiments a map application sends a request for the departure schedule of a transit line to the server. The request for the departure schedule in some embodiments specifies the transit line, the transit station from which the transit vehicles of the transit line depart, the particular time for which the schedule is needed, and the trip heading of the line at the transit stations. Upon receipt of such a request, the server retrieves the related contiguous group of frequencies of departures from the memory and sends the retrieved group back to the requesting map application. In some embodiments, the server also sends back a particular number of frequencies of departures corresponding to near future times of the requested time to the requesting map application.

Figure 27:
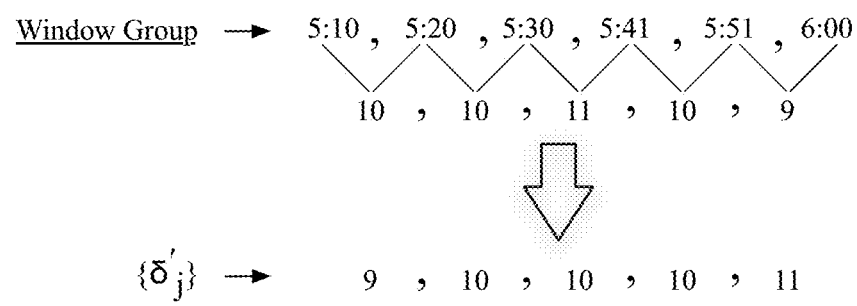
FIG. 27 provides an example for calculating a range of departures as the departure schedule of a transit line at a particular station.
Figure 27:
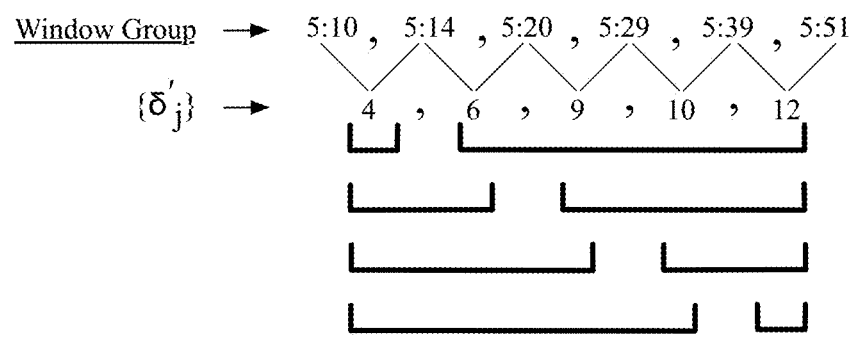

The process 2600 is described by reference to FIG. 27, which provides an example for calculating a range of departures as the departure schedule of a transit line at a particular station. The process 2600 begins by receiving (at 2605) a window group that includes a sequence of departure times of transit vehicles of a transit line that head in the same direction from a particular transit station during a certain period of time. In FIG. 27 the window group is shown as a sequence of departure times "5:10, 5:20, 5:30, 5:41, 5:51, and 6:00." These departure times correspond for example to departure times of a subway line at a particular subway station within one hour.

In some embodiments the window group is generated from a departure schedule of a line (e.g., departure timetable) for a particular route as discussed above. Some embodiments receive the schedule for the line, among a collection of departure schedules for a collection of transit lines, from one or more transit service data providers. Some such embodiments store the received transit data and update the stored data periodically. Some other embodiments update the stored transit data when the updates are available by the transit service data providers.

The process 2600 then calculates (at 2610) the gaps between the successive departure times of the transit line in the window group. In other words, the process calculates a sequence of differences between successive departure times in the window group, $\Delta=\{\delta'_j\}$, where each $\delta'_j = t_{j+1} - t_j$. As illustrated in FIG. 27, the sequence of gaps for the window group shown in this figure is "10, 10, 11, 10, and 9." After calculating the gaps, the process of some embodiments sorts the calculated sequence of the gaps. Therefore, in this example, the process generates a sorted sequence of the gaps such as $\Delta=\{9, 10, 10, 10, 11\}$.

The process then determines (at 2615) whether a single value accurately expresses the calculated sequence corresponding to the departure times in the window group. That is, the process determines whether a single number within a small threshold expresses the sequence. The process of some embodiments makes such a determination with respect to an input parameter, $\sigma_e$. The process examines the variance of the set $\Delta$ and determines whether the variance is at most $\sigma_e^2$. When the variance is less or equal to $\sigma_e^2$, the process determines that the mean departure frequency ($\mu(\Delta)$) expresses the gaps exactly and returns (at 2620) the variance as a single value that represents the departure frequency. That is, when the process determines that the departure gaps are within a small threshold deviation of a mean time gap, the process returns the mean time gap as the departure frequency of the transit line.

In the example shown in FIG. 27, the variance is 0.4 minutes. That is, as long as the threshold $\sigma_e^2$ is greater than 0.4, the process returns the mean departure gap of "10" as the departure frequency for this window group. That is, the departure frequency of this subway line is "every 10 minutes." One of ordinary skill in the art would realize that the numbers given in this example (and other examples) are only exemplary and the real numbers are in fact different. For instance the threshold that is used by the process could be significantly smaller than 0.4 in some embodiments.

On the other hand, when the process is unable to express the sequence of gaps exactly, the process determines (at 2625) whether one of a set of ranges can express the calculated sequence. Specifically, the process determines whether the sequence can be expressed by a pair of deltas from amongst a canonical set of ranges, C. In some embodiments, C is a hand-curated collection of univariate pairs of Gaussian distributions that is defined by $C=\{(N_i^l(\mu_i^l, \sigma_i^l), N_i^h(\mu_i^h, \sigma_i^h))\}_i^K=1$, with the first Gaussian in the pair expressing the low range, and the second Gaussian expressing the high range. The hand-curated collection of pairs of some embodiments includes a set of predefined pairs (e.g., "2-3, 2-5, 5-7, 5-10, 10-15, 10-20, 15-20, . . . ") that could be used as candidate pairs for computing the range.

In order to evaluate the pair of deltas, the process of some embodiments defines a set of feasible solutions, and then optimizes the defined set of solutions. To do so, the process tries all possible bi-partitions of the sorted sequence, $\Delta=\{\delta'_j\}$. The second window group of FIG. 27 is a sequence of departure times "5:10, 5:14, 5:20, 5:29, 5:39, and 5:51."

a set of feasible Gaussian pairs from amongst the canonical set of Gaussian pairs, C. For the pair of Gaussians corresponding to the partition, $(N_i^l, N_i^h)$, and a candidate canonical Gaussian pair, $(N_c^l, N_c^h)$, the process determines that the candidate is feasible if $N_i^l$ is "well inside" $N_c^l$ and $N_i^h$ is "well inside" $N_c^h$. This notion of "well-inside" is expressed by a parameter $\varepsilon$.

For the set of feasible solutions thus defined, the process picks a feasible canonical candidate whose average statistical distance is the smallest, over the low and the high deltas. In the above example, the process would determine that the bi-partition (4, 6; 9, 10, 12) could fit well inside the candidate range of 5-10 minutes and therefore the process returns the departure range as being between 5-10 minutes. Specifically, the first group (4, 6) has a mean of 5 and a variance of $\sigma^2$ of 1, while the second group (9, 10, 12) has a mean of 10.3 and a variance of $\sigma^2$ of 1.6. Again, the numbers are exemplary and the real number and values that are used in these distributions and formulas may be significantly different than the number and values illustrated in the above and below examples.

The process of some embodiments uses the standard concept of Hellinger Distance between a pair of Gaussians. One of ordinary skill in the art would realize, however, that other appropriate forms of statistical distances between a pair of Gaussians could be equally applicable. Algorithm 1 below describes this accurately. Some notations are abused to let $\Delta$ also denote the sorted sequence corresponding to the set $\Delta$, that is $\Delta[i] \leq \Delta[j]$, $i<j$, for the sake of notational convenience. Also, in Algorithm 1, $\Delta[i \ldots j]$, $1 \leq i \leq j \leq L$ denotes the consecutive subsequence of $\Delta$ between i and j.

---

Algorithm 1: FindBestRange($\Delta[1 \ldots L]$, C)

closest ← ∞
for i ← 1:L do
    $N_i^l \leftarrow (\mu_i(\Delta[1...i]), \sigma_i(\Delta[1...i]))$
    $N_i^h \leftarrow (\mu_i(\Delta[i+1...L]), \sigma_i(\Delta[i+1...L]))$
    $F_i \leftarrow \{(N_c^l, N_c^h) : d_1(N_i^l, N_c^l) < \varepsilon, d_1(N_i^h, N_c^h) < \varepsilon, (N_c^l, N_c^h) \in C\}$
    $(N_c^l, N_c^h) \leftarrow \arg\min_{c \in F_i} \{d_2(N_i^l, N_c^l) + d_2(N_i^h, N_c^h)\}$
    if $d_2(N_i^l, N_c^l) + d_2(N_i^h, N_c^h) <$ closest then
        closest ← $d_2(N_i^l, N_c^l) + d_2(N_i^h, N_c^h)$
        $(N_O^l, N_O^h) \leftarrow (N_c^l, N_c^h)$
if closest < ∞ then
    return $(N_O^l, N_O^h)$
return ∅

---

Therefore, the sequence of gaps for this window group in the figure is "4, 6, 9, 10, and 12." The possible bi-partitions of the sequence as shown in FIG. 27 are (4; 6, 9, 10, 12), (4, 6; 9, 10, 12), (4, 6, 9; 10, 12), and (4, 6, 9, 10; 12).

One of ordinary skill in the art would realize that the departure times given in this example are only exemplary and the real departure times could be in fact different. In other words, the departure times in the example are selected in such a way to render a sorted sequence of gaps for simplicity of description and a sequence of real departure times may render an unsorted list of gaps between the successive departures. Some embodiments, as described above, sort the sequence of gaps (e.g., from the lowest number to the highest) after calculating the gaps in the sequence of departures.

Each bi-partition, in some embodiments, includes a set of small deltas and large deltas. The process interprets the associated deltas as a Gaussian. Thus, for each bi-partition, the process generates a pair of Gaussians, one of which describes the set of small deltas, and the other one describes the set of large deltas. For each such choice, the process finds In the above Algorithm 1, $d2(.,.)$ is the Hellinger Distance between two Gaussians. In Algorithm 2 below, $d1(.,.)$ is defined.

---

Algorithm 2: $d_1(N_a, N_b)$ $l_a \leftarrow \mu_a - \sigma_a$
$h_a \leftarrow \mu_a + \sigma_a$
$l_b \leftarrow \mu_b - \sigma_b$
$h_b \leftarrow \mu_b + \sigma_b$
if $(l_a, h_a)$ and $(l_b, h_b)$ do not overlap then
    return 1
$S \leftarrow (\min\{h_a, h_b\} - \max\{l_a, l_b\}) / (h_a - l_a)$
return $1-S$

---

In the above Algorithm 2, in order to prevent the result of $h_a - l_a$ from being zero and hence S being undefined, some embodiments, subtract a small value ($\varepsilon'$) from $l_a$ and add the same small value to $h_a$ at the beginning of the algorithm. The same small value ($\varepsilon'$) is also added to and subtracted from $h_b$ and $l_b$, respectively.

When the process determines that one of the pair of deltas (i.e., one of the pairs in the set C) as described above expresses the gaps, the process returns (at 2630) the pair as the range of departure frequency. On the other hand, when the process is unable to express the sequence of gaps using one of the pairs in the set C, the process determines (at 2635) whether a single value approximately expresses the gaps, $\Delta=\{\delta'_j\}$ corresponding to the departure times in the window group. That is, the process determines whether a single number within a large threshold expresses the sequence. The process of some embodiments makes such a determination with respect to an input parameter, $\sigma_a$, which is greater than the input parameter $\sigma_e$ ($\sigma_a > \sigma_e$). The process of some such embodiments examines the variance of $\Delta$ and determines whether the variance is at most $\sigma_a^2$. When the process determines that the variance is less or equal to $\sigma_a^2$, the process realizes that the mean departure frequency ($\mu(\Delta)$) expresses the gaps approximately and returns the variance (at 2640) as a single value that represents the approximate departure frequency. In some embodiments, when the process determines that the variance does not express the gap approximately, the process returns (at 2650) a variable (e.g., a zero) that shows no frequency can be determined for the departures.

The map application of some embodiment deploys this process or a process similar to this to calculate the frequency of departures of a high frequency transit line upon a request. For instance when the map application receives a request for a placecard of a transit station, it calculates the departure frequencies of the different transit lines departing from the transit station and provides the departure frequencies in the placecard, as discussed above. Or when the map application receives a request for a navigation presentation, the application calculates and displays the departure frequencies in the corresponding navigation banners. In some other embodiments, when a map application receives a request for a departure schedule (e.g., to be displayed in a placecard, a navigation banner, etc.), the application sends a request to one or more servers that are dedicated for frequency schedules and calculations and receives the requested information back from those servers.

The servers of some such embodiments calculate the departure frequencies when they receive a request from the map application. Alternatively, or conjunctively, the dedicated servers pre-calculate the frequency schedules (e.g., after receiving a new or updated set of departure timetables) and store the calculated frequencies in one or more data storages for later use (e.g., to be displayed in different user interfaces of the map application). Upon receiving the request for departure schedules from a map application, these servers retrieve the related stored schedules and send them to the requesting map application.

Figure 28:
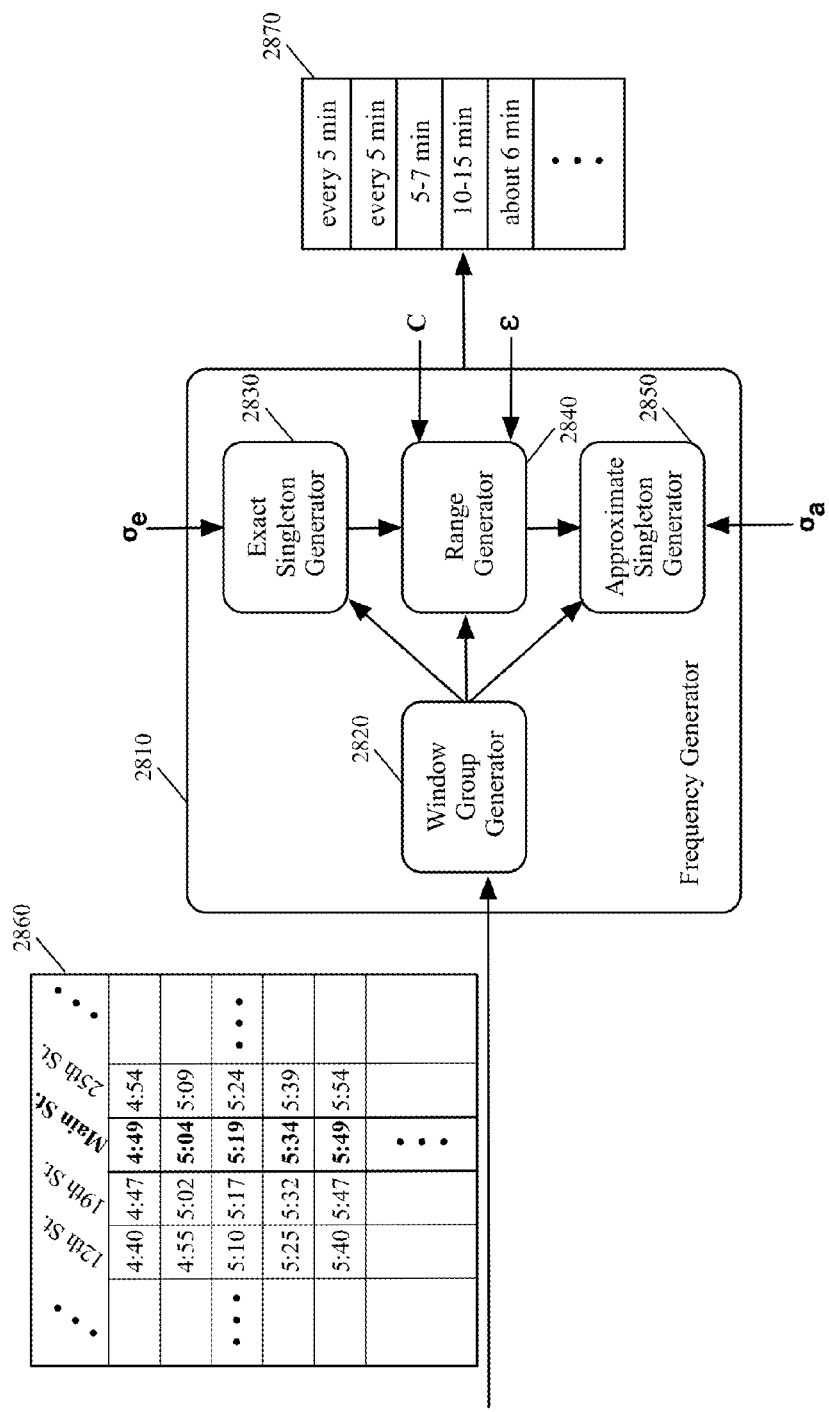
FIG. 28 conceptually illustrates a frequency generator module that some embodiments use for determining in which format the frequency of departures should be displayed for a particular transit line leaving a particular transit station at a particular time of day.

FIG. 28 conceptually illustrates a frequency generator module that some embodiments use for determining in which format the frequency of departures should be displayed for a particular transit line leaving a particular transit station at a particular time of day. More specifically, the frequency generator module determines which one of the above three expressions can be applied to the sequence of the departure gaps. As shown, the frequency generator module of some embodiments includes several other modules which are a window group generator module 2820, an exact singleton generator module 2830, a range generator module 2840, and an approximate singleton generator module 2850.

The frequency generator module 2810 receives a departure timetable 2860 as an input. The timetable in some embodiments is one of a collection of timetables that the module receives from one or more transit data providers. As shown in the figure, the timetable 2860 includes a set of columns and a set of rows. The columns of the timetable correspond to the transit stations at which the transit vehicles of the transit line stops. The rows of the timetable correspond to a sequence of departure times of the transit vehicles of the transit line at each transit station. For example the first row shows the departure times of the first bus of the line at each bus stop, the second row shows the departure times of the second bus of the line at the bus stops, and so on.

The window group generator module of the frequency generator module receives the timetable and as described above, iteratively generates a window group for each departure time of a column of the timetable (e.g., the highlighted column for the bus stop of Main Street). For each transit station column then, the frequency generator module outputs a column with multiple cells that each includes a departure frequency for each corresponding cell of the transit station column. Each cell of the output column represents the frequency of departures for the next transit vehicle of the line and can be in one of the three above-described formats (i.e., exact time, approximate time, or a time range).

As shown in the figure, the output column 2870 which corresponds to the departure frequency of the highlighted column of the timetable 2860 (for the Main Street stop) has several cells. The two first cells of the column show that the departure frequencies for the first and second buses of the line at Main station are every 5 minutes (i.e., the time interval between each pair of departures of the line at this station is 5 minutes). The third cell of the column shows that the departure frequency for the third bus of the line at Main station is between 5-7 minutes while the fourth cell shows that the departure frequency for the fourth bus is between 10-15 minutes. Finally, the fifth cell of the column shows that the departure frequency for the fifth bus of the line at Main station is between approximately about 6 minutes.

In order to produce this output, the frequency generator module of some embodiments, for each generated window group that corresponds to a departure time of the line, computes the differences between successive cells of the window group ($\sigma'_i = t_{j+1} - t_j$) and generates a sequence of time gaps ($\{\delta'_j\}$). The sequence is then fed into the exact singleton generator module 2830 along with an input parameter $\sigma_e$. The exact singleton generator, as described above, examines the variance of $\Delta$ in the sequence and determines whether the variance is at most $\sigma_e^2$. When the module determines that the variance is less or equal to $\sigma_e^2$, it renders the variance as the exact frequency of departures.

When such determination is not feasible, the next module, which is the range generator module 2850, starts to determine whether the generated sequence of gaps can be expressed by a pair of deltas from amongst a canonical set of ranges, C. The module receives the sequence ($\{\delta'_j\}$) along with a canonical set $C(\{(N_i^l(\mu'_i, \sigma'_i), N_i^h(\mu_h^i, \sigma_i^h)\}_{i=1}^K)$ and a parameter $\varepsilon$ (e.g., 0.05). As described above, the range generator module then tries to separate the sequence into two Gaussians that best fit an element of the canonical set C.

When such determination is not feasible either, the next module, which is the approximate singleton generator module 2850, starts to determine whether a single number can approximate the generated sequence of gaps $\{\delta'_j\}$ with respect to an input parameter $\sigma_a$ that the module receives. In some embodiments the input parameter $\sigma_a$ is greater than the input parameter $\sigma_e$. The approximate singleton generator module examines the variance of $\Delta$ in the sequence and determines whether the variance is at most $\sigma_a^2$. When the module determines that the variance is less or equal to $\sigma_a^2$, it returns the variance as a singleton that approximately represents the departure frequency.

All the frequency schedules that are described thus far are schedule (or departure) frequencies. In other words, the above-described frequencies are departure frequencies of the transit vehicles of a particular transit line that depart from a particular transit station. The map application of some embodiment also displays a transit frequency or route frequency for a selected transit route that includes multiple legs from a starting location to a destination. Each leg of a selected transit route either uses a different transit vehicle or is a "walk" directive through a navigable pedestrian network.

The map application of some embodiments can also calculate and provide an overall transit frequency (or request the calculation of such from a mapping service running on one or more dedicated servers) and display the calculate frequency when all the legs of the transit route are serviced by high frequency transit vehicles. In some other embodiments, the map application calculates (or requests the calculation) and displays the transit frequency for a transit route even when the transit vehicles of the different legs of the transit route are a combination of high frequency and low frequency transit vehicles.

Figure 29:
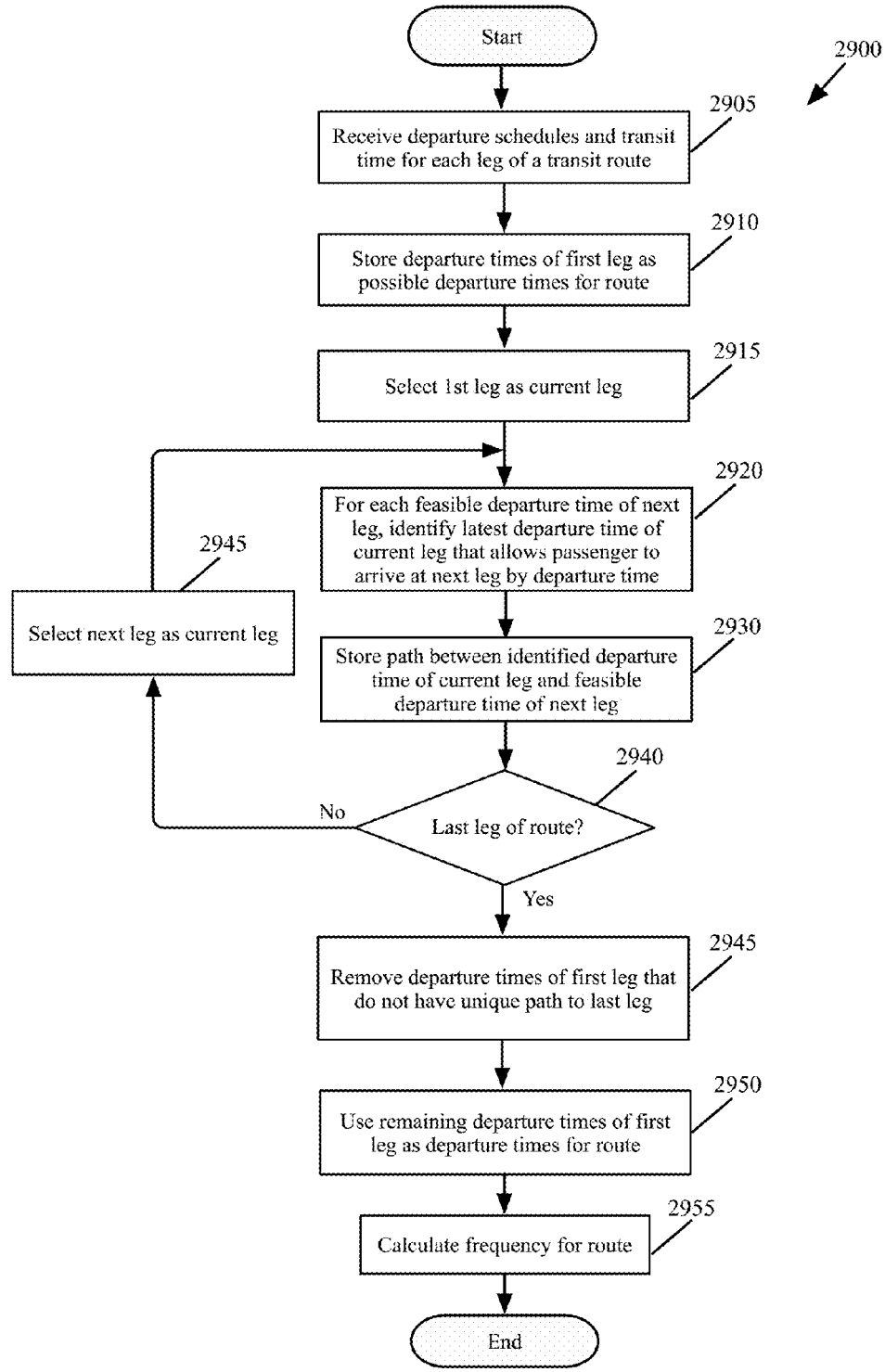
FIG. 29 conceptually illustrates a process that some embodiments perform to calculate the overall transit frequency for a selected transit route.

FIG. 29 conceptually illustrates a process 2900 that some embodiments perform to calculate the overall transit frequency for a selected transit route. Specifically, the process 2900 generates a window group for the transit route that can be used as an input for the process described above by reference to FIG. 26 in order to generate the transit route's frequency. The computed window group for the transit route includes a sequence of departure times from the starting location in the first leg. Each departure time in the sequence is the latest departure time from the starting location in order to make a temporally feasible and independent transit trip to the destination during the time period used to compute the window group.

In some embodiments a mapping service that runs on one or more dedicated servers performs the process and stores the results to be sent to the map application or returns the results in real time (i.e., upon a request) to the map application. In some other embodiments, the process is performed by a map application that executes on a device. In some embodiments because of the high temporal variability and combinatorial complexity involved in pre-computing transit routes' schedules (frequencies), the map application and/or dedicated servers compute the transit frequency on demand only. That is, a mapping service, or one or more dedicated servers that are designated for computing departure frequencies, compute the overall transit frequency for a transit route only when they receive a request for such from a map application.

Figure 30:
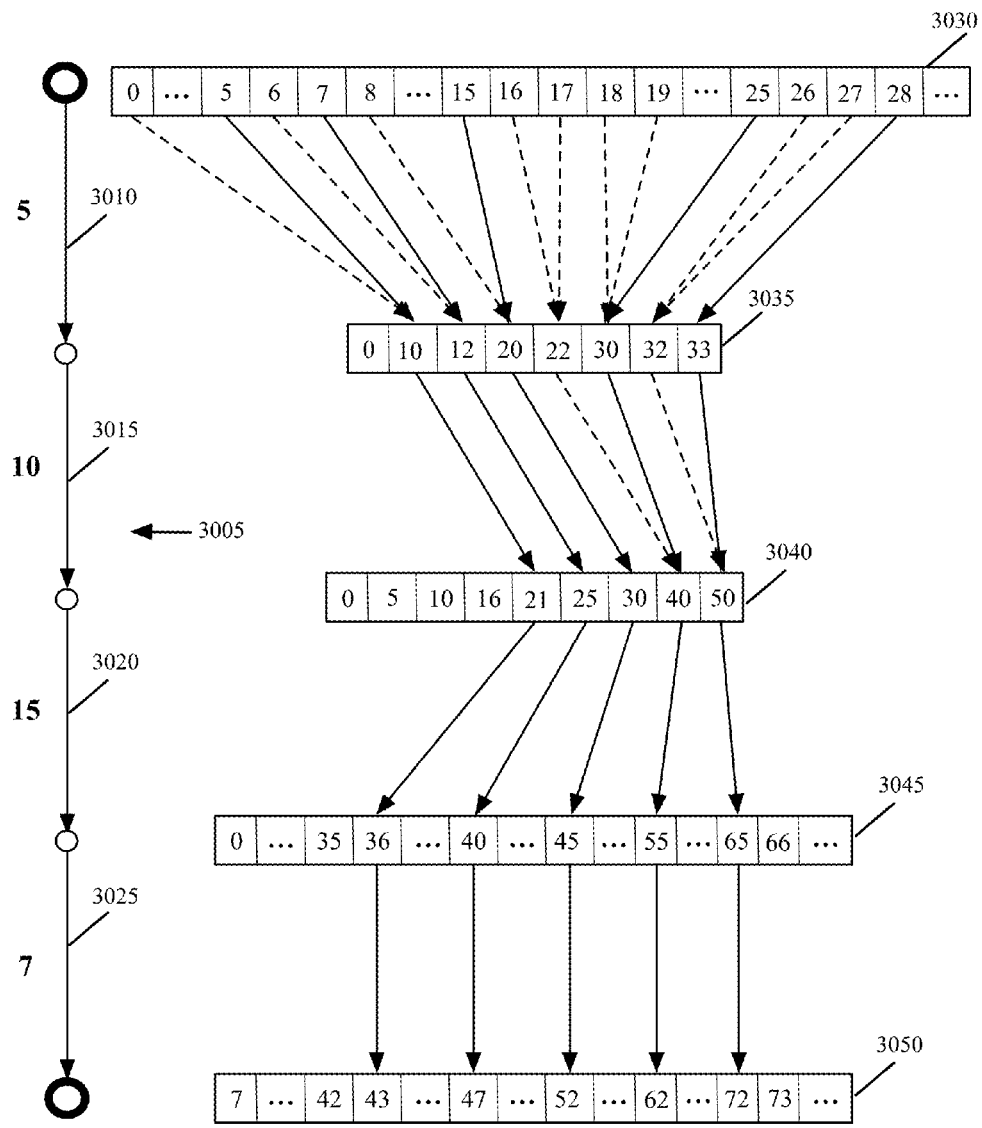
FIG. 30 provides an example for calculating a sequence of departures (i.e., a window group) that includes the departure times from the current position of the device.

The process 2900 will be described by reference to FIG. 30, which provides an example for calculating a sequence of departures (i.e., a window group) that includes the departure times from the current position of the device. FIG. 30 illustrates a transit route 3005 that includes four transit legs 3010-3025. The first transit leg 3010 represents a walking route from the starting location of the passenger to the first transit station. The last transit leg 3025 also represents a walking route from the last transit station to the desired destination. The second and third legs 3015 and 3020 use two different transit vehicles. The number of minutes next to each leg (on the left hand side of the figure) is the expected length of time to make the corresponding trip. For instance the trip time for the first walking leg is five minutes while the trip time for the last walking leg is seven minutes.

Some embodiments treats the walking routes as transit routes that depart every minute, thus, are unconstrained. Some such embodiments set aside a one-minute transition time at each transit station that acts as a buffer, allowing the passenger to make a feasible transition to the next leg of the transit route. These embodiments charge this transition cost to the transit duration of the previous leg in the transit route.

The process 2900 begins by receiving (at 2905) the departure schedule and transit time of each leg of a selected transit route. In the example of FIG. 30 the process receives the departure schedules 3030-3045 which are sequences of numbers that represent the departure times from the source of the corresponding legs 3010-3025. As stated above, the pedestrian legs are treated as transit routes that depart every minute, hence the departure schedules 3030 and 3045 include departure times that occur every minute at the source of the corresponding pedestrian leg. Additionally, the numbers in the last sequence 3050 represent the arrival times at the destination using the last walking leg.

The process 2900 then stores (at 2910) the departure times of the first leg (i.e., schedule 3030) as the possible departure times of the route. That is the departure times of the first leg are initially stored by the process as a potential sequence of departure times that could be the latest departure times from the starting location in order to make a temporally feasible transit trip to the destination. In the illustrated example, therefore, the sequence 3030 is stored as the potential departure times.

Next, the process selects (at 2915) the first leg as the current leg to process. The process then identifies (at 2920), for each feasible departure of the next leg, the latest departure time of the current leg that would allow the passenger to arrive at the next leg by that departure time. In other words determines what departure time in the current leg would be the latest time that the passenger can depart from the source of the current leg in order to catch a particular one of the departure times of the next leg. Therefore, in the example of FIG. 30, the process identifies departure time minute 5 in the first leg as the latest time in order to catch the departure time minute 10 in the second leg. This is because the passenger has to walk for 5 minutes (i.e., the transit time for the first leg) in order to get to the starting transit station of the second leg.

Similarly, the process identifies departure time minute 7 in the first leg as the latest time in order to catch the departure time minute 12 in the second leg, departure time minute 15 in the first leg as the latest time for the departure time minute 20 in the second leg, departure time minute 17 as the latest time for minute 22, departure time minute 25 as the latest time for minute 30, departure time minute 27 as the latest time for minute 32, and finally the departure time minute 28 as the latest time to catch the departure time minute 33 in the second leg.

After identifying the latest departure time in the current leg for each feasible departure time in the next leg, the process 2900 stores (at 2930), for each identified departure time, a path (link) from the identified departure time in the current leg to its corresponding feasible departure time in the next leg. In the example of FIG. 30, the process stores a path (link) from minute 5 in the first leg (which is the current leg when processing the first leg), to its correspond departure time in the second leg which is minute 10. Similarly, the process stores paths (links) from minute 7 of the first leg to minute 12 of the second leg, from minute 15 to minute 20, from minute 17 to minute 22, from minute 25 to minute 30, from minute 27 to minute 32, and finally from minute 28 to minute 33.

The process then determines (at 2940) whether the next leg for processing is the last leg of the transit trip. If the process determines that next leg for processing is not the last leg of the transit route, the process selects (at 2945) the next leg as the current leg for processing and returns to 2920 to identify the latest departure times for that leg. In the example of FIG. 30, the process determines that there are more legs to process and therefore selects the second leg as the current leg to process. The process then identifies minute 10 as the latest departure time in the second leg to catch the departure time minute 21 in the third leg.

This is because the trip time of the second leg is 10 minutes and thus the first departure time in the second leg (minute 10) can catch the departure time minute 21 in the third leg. Similarly, the process identifies departure time minute 12 in the second leg as the latest time to catch the departure time minute 25 in the second leg, departure time minute 20 as the latest time for minute 30, departure time minute 30 as the latest time for minute 40, and finally the departure time minute 33 as the latest time to catch the departure time minute 50 in the second leg. The process then stores a path from each identified departure of the second leg to its corresponding departure time in the third leg.

That is, the process stores a path between minute 10 of the second leg and minute 21 of the third leg, between minute 12 of the second leg and minute 25 in the third leg, between minute 20 of the second leg and minute 30 of the third leg, between minute 30 of the second leg and minute 40 of the third leg, and finally between minute 33 of the second leg and minute 50 of the third leg. The process iteratively performs these steps until the last leg of the transit route is also processed. After processing the last leg (i.e., the second to last leg in the transit route), the process has stored, for each identified departure time of the first leg, a path that starts from the first leg and either reaches a departure time in the last leg or ends somewhere in between. That is, after storing all the paths (links), there might be some links that do not connect any identified departure times of the first leg to any feasible departure time of the last leg.

When the process 2900 determines (at 2940) that the it has reached the last leg of the transit route, the process removes (at 2945) the departure times of the first leg that do not have a unique path to a feasible departure time in the last leg. In other words, the process examines the paths that it has stored (at 2930) for each identified departure time of each leg. If the process can connect the paths from each identified departure time in the first leg to make a unique path from the first leg to the last leg, the process keeps that departure time of the first leg, otherwise the process removes the departure time from the list of identified departure times of the first leg.

In the example of FIG. 30, the process starts with the minute 5 of the first leg, which was identified as a potential transit departure time. By examining the stored paths, the process realizes that minute 5 of the first leg is linked to minute 10 of the second leg, which in turn is linked to minute 21 of the third leg, and minute 21 of the third leg is linked to minute 36 of the last leg. Therefore the process determines that there is a direct path (link) between minute 5 of the first leg and minute 36 of the last leg. The same determination is made for minutes 7, 15, 27, and 27. However, for minute 17, the process determines that there is a link between minute 17 of the first leg and minute 22 of the second leg, but the link is disrupted there and there is no more links to the third leg from the minute 22 of the second leg.

Consequently the process removes departure time minute 17 from the first leg, hence the link from this departure time to the next leg is shown with dashed line instead of a solid line. The process also determines that there is not a unique link from minute 27 of the first leg to any departure time of the last leg and therefore it is removed from the first leg as well. As a result, the remaining departure times in the first leg, after removal of non-linked departure times in the list of identified departure times of the first leg, will be departure times 5, 7, 15, 27, and 28 which are shown in the figure as connected to the next leg with a solid ling.

The process then uses (at 2950) the remaining departure times of the first leg (i.e., departure times 5, 7, 15, 27, and 28) as the departure times of the transit route. Specifically, the process of some embodiments uses the remaining sequence as a window group for the transit route and calculates (at 2955) the transit route's departure frequency based on this window group. The process of some embodiments calculates the departure frequency by using the window group as an input for the process described above by reference to FIG. 26 in order to generate the transit route's frequency. The process then ends. As stated above, each departure time in this window group would be the latest departure time from the starting location (i.e., the current location of the passenger) in order to make a transit trip to the destination during the time period used to generate the window group.

Some embodiments perform variations of the process 2900. The specific operations of the process 2900 may not be performed in the exact order shown and described. Additionally, the specific operations may not be performed in one continuous series of operations, and different specific operations may be performed in different embodiments. For example, in some embodiments, the process returns the generated window group (the remaining transit routes in the sequence) to the map application. The map application of some such embodiments then displays the sequence to the user so the user would know when to leave the current location to be able to catch the transit vehicles of a particular transit route. The user could also easily determine the time of arrival at the destination if the user takes a particular transit route that departs at one of the identified departure times of the first leg.

For example, in the above described FIG. 30, a user by looking at the departure sequence would realize that if the user starts his trip at minute 5 (e.g., 5 minutes after the current time), the user would be able to board a transit vehicle at the first transit station at minute 10, board a transit vehicle at the second transit station at minute 21, and arrive at the destination at minute 43. Similarly, if the user starts his trip at minute 28, the user would be able to board a transit vehicle at the first transit station at minute 33, board a transit vehicle at the second transit station at minute 50, and arrive at the destination at minute 72.

VI. Navigating a Transit Route

As described above, the map application of some embodiments can operate in one or more different modes such as map browsing mode, routing mode, navigation presentation mode, etc. The map-browsing mode allows a user to browse a map of a locality and to perform searches for map locations based on addresses, names (e.g., people, businesses, etc.) or other search parameters. The navigation presentation mode of some embodiments includes a driving navigation mode to provide driving navigation directions, a walking navigation mode to provide walking navigation directions, and a transit navigation mode to provide transit navigation directions.

When a user starts navigation in the transit navigation mode (e.g., by selecting a start navigation control), the map application of some embodiments provides a transit navigation presentation that displays instructions for each transit maneuver (e.g., in a transit leg) of a transit trip. As described above, a transit leg refers to a portion of a transit route that starts or ends with a transit maneuver that requires a transit vehicle change or a walking portion of the transit route (i.e., between two transit vehicle portions, or at the start or end of a transit route). The different transit maneuvers in some embodiments include boarding a transit vehicle of the transit route, exiting a transit vehicle, walking to a transit station, and walking to the destination of the transit route. Some embodiments combine the navigation instructions for two or more transit maneuvers that relate to the same transit leg. For example, some embodiments display a single navigation instruction for walking to a transit station and boarding a transit vehicle at the station. Some other embodiments, on the other hand, provide a separate navigation instruction for entering each transit station of a transit route.

In some embodiments, a transit navigation presentation provides navigation instructions that specify navigation maneuvers that use one or more transit vehicles (e.g., buses, rapid-transit train vehicles, commuter-rail vehicles, long-distance train vehicles, ferries, etc.) as the device traverses a transit route from a starting location to a destination location. The transit navigation presentation in some embodiments also includes walking instructions that provide directions to transit stations or from transit stations. In some embodiments, the map application displays navigation banners to provide navigation instructions during a transit navigation presentation.

In some embodiments, the map application allows a user to select and scroll through a set of navigation banners representing the different transit maneuvers of a selected transit route when the user starts the navigation presentation mode. As the user scrolls through each navigation banner (e.g., by swiping the navigation banner to the left or right), the portion of the route (e.g., a transit leg) associated with the currently in-focus navigation banner is presented to the user in a second display area. A representation of the currently displayed transit maneuver in the second display area of some embodiments is highlighted on the transit route (e.g., through color highlighting).

In some embodiments, the representation of the transit leg in the second display area (i.e., the representation of the transit leg drawn over a portion of the map that corresponds to the transit maneuver) is augmented to display more details about the transit maneuver on the map. Additionally, some embodiments prioritize road labels based on proximity to transit maneuvers and the current displayed maneuver. That is, in some embodiments, the road labels (e.g., street signs) that correspond to the transit maneuver are displayed in the second display area over a portion of the map that is related to the displayed navigation banner in the first display area.

Figure 31:
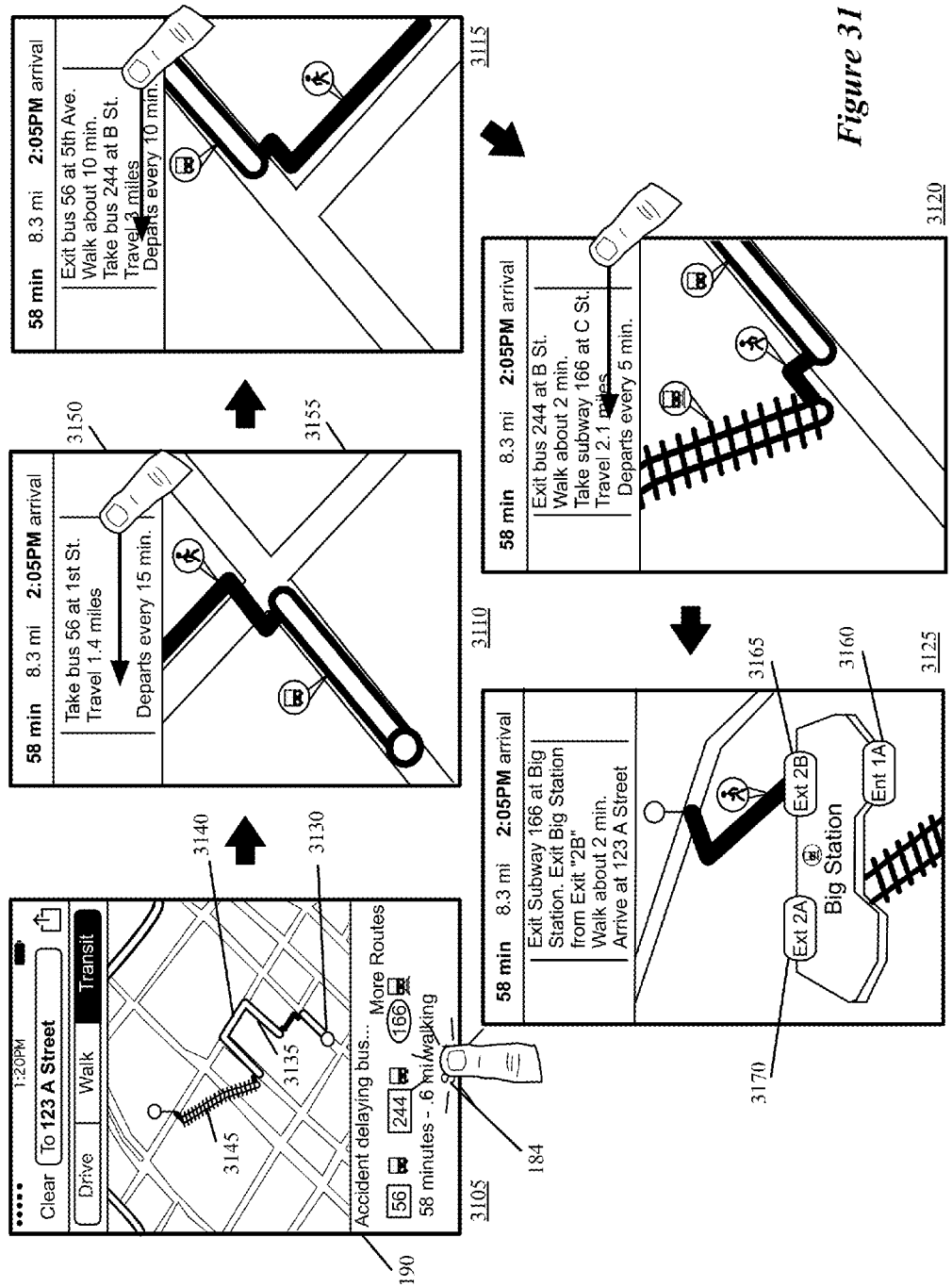
FIG. 31 illustrates a navigation presentation that provides transit navigation directions from the device's current location to the destination.

In some embodiments, each navigation banner provides a navigation instruction for a transit maneuver related to one leg of the transit route. In some embodiments the transit leg includes a portion of the transit route that is traveled by a different transit vehicle or a portion of the transit route that is walked for more than a particular distance. When the map application is displaying a transit route overview presentation (such as the one shown in the fourth stage 120 of FIG. 1), the selection of Start control 184 directs the map application to start a transit navigation presentation that provides transit navigation directions from the device's current location to the destination. FIG. 31 illustrates an example of such a transit navigation presentation in terms of five operational stages 3105-3125 of map application UI.

The first stage 3105 illustrates a representation of a transit route between a starting location and a destination location that is drawn over a portion of a map of a region after a user selected the transit navigation mode. The representation of the transit route includes three different transit legs 3135-3145. In the illustrated example, the first and second transit legs 3135-3140 (i.e. the first and second portions of the transit route) are traveled by two buses of different lines while the third transit leg 3145 is traveled by a subway train. The first stage 3105 also shows a representation 3130 of the current location of the device. As shown, the device is currently located at the first transit station (i.e., the first bus stop) of the transit route, hence no walking distance is presented between the current location of the user and the first transit station.

The incident display area 190, in stage 3105, displays an incident report that might be related to the currently displayed transit route or the reason for not displaying another transit route, as described in detail above by reference to FIG. 5. The route summary display area 193 shows two bus representations of different lines 56 and 244 that travel the first and second legs of the transit route and a subway train representation of the line 166 that travels the last leg of the transit route. The route summary display area also shows that the total trip time is 58 minutes which includes a total walking distance of 0.6 miles. The first stage 3105 further shows that the user selects the Start control 184 to start a navigation presentation experience.

The second stage 3110 shows the initiation of the transit navigation presentation after selection of the Start control 184. As shown, the transit navigation presentation in some embodiments includes one or more navigation banners and one or more maneuver map views. In some embodiments, each navigation banner corresponds to one maneuver map view. In some such embodiments each maneuver map view and its associated navigation banner provide pictorial and text instructions that describe a transit navigation maneuver, which typically is associated with a transit leg of the transit route. For example each pair of navigation banner and map view corresponds to a starting point of a transit leg or an ending point of a transit leg. In some embodiments (e.g., when the walking distance is more than a certain distance), a pair of navigation banner and map view may also correspond to a walking leg of a transit route, an entire leg of a transit route that is traveled by a transit vehicle (e.g., instructions for entering and exiting the transit vehicle), a transit station along the transit route (e.g., when the transit station has multiple entrances and or exits), etc.

Some embodiments provide navigation instructions (e.g., in a navigation banner) intelligently based on the position of the device. These embodiments detect the current position of the user and provide a text (and/or pictorial) instruction that is related to the current position of the user. For example, when the user is detected to be outside a transit station, some embodiments provide a text (and/or pictorial) instruction that instructs the user to "enter" the transit station. On the other hand, when some such embodiments detect the position of the user to be inside the transit station, the embodiments provide a text (and/or pictorial) instruction (e.g., in a navigation banner for the same transit leg of the route) that instructs the user to "board" the transit vehicle.

As shown in the second through fifth stages 3110-3125, the user of the device can swipe through the navigation (instruction) banners to see successive transit navigation maneuver views along the transit route. Specifically, the second stage 3110 shows, after the user has started the navigation presentation, a scrollable navigation banner displayed in the banner display area 3150 that provides a navigation instruction for the first bus leg 3135 of the transit route. Additionally, the first maneuver map view that is associated with the first transit leg is displayed in the map view display area 3155. The maneuver map view for the first leg includes a bus route representation for bus line 56 along with a walking portion after the user exits the bus. Some embodiments, as described above, also prioritize and display in the map view (although not shown in the illustrated example) the road labels (e.g., street signs) of the roads that are in the proximity of the transit maneuver.

As described above, each transit leg of the transit route, in some embodiments, includes a portion of the transit route that is traveled by a different transit vehicle, which can further include a start or end of a walking portion of the transit route. When the device's location is within one or more of the maneuver map views, the map application of some embodiments displays the device's location on the map view(s) so that the user can orient him/herself with the required transit navigation maneuvers. For instance, the map application of some embodiments displays the device's location on a walking leg in the map view display area when the application determines that the user who is holding the device is walking along the walking leg, the representation of which is currently displayed in the map view display area.

When the map application of some embodiments determines that the device is on a walking portion of the transit route that is longer than a particular threshold distance, the map application automatically presents a walking direction indicator to identify the orientation of the device with respect to the desired walking-navigation direction of the walking portion of the route. As the walking-navigation direction changes, the user of the device can properly orient himself/herself along the desired walking direction by aligning the walking-direction indicator with the desired walking direction.

In addition to, or instead of, providing a walking-direction indicator during the walking portion of a transit navigation presentation, the map application of some embodiments provides a user selectable option to switch to the walking navigation presentation in order to obtain a richer walking navigation experience (e.g., to obtain turn-by-turn walking navigation instructions). In some embodiments, the application provides the option to switch to a walking navigation presentation during the transit navigation presentation as a selectable user-interface (UI) item in a navigation banner (e.g., in the navigation banner that corresponds to the walking portion). The application provides this option in some embodiments through other mechanisms, such as voice input instructions that (through a speech recognition interface of the device) direct the navigation application to switch from the transit navigation presentation to a walking navigation presentation. Switching between a transit navigation presentation and a walking navigation presentation during a walking portion of a transit route is further described in the concurrently filed U.S. Provisional Patent Application 62/172,218 entitled "Walking Guidance During Transit Navigation", which is incorporated herein by reference.

The navigation instruction in each navigation banner describes the associated transit maneuver and provides some information about this maneuver. For instance, in the second stage 3110, the navigation banner that is displayed in the display area 3150 describes the bus line and bus stop that starts the transit trip, the distance traveled by the first bus, and the frequency of departures of the buses of this line. As described above, the application of some embodiments first identifies whether the transit vehicle that travels each leg of the trip is a high frequency transit vehicle or a low frequency transit vehicle. In these embodiments, the application provides, in the navigation banner, the frequency of departures when the transit vehicle is a high frequency transit vehicle, and the departure time of the next transit vehicle of the line when the transit vehicle is a low frequency transit vehicle.

In some embodiments, the transit maneuver banners provide other information than what is depicted in this example figure. For example, some embodiments provide the amount of required walking in terms of time instead of distance, while other embodiments provide both time and distance for the walking portion as well as each leg of the trip. Additionally, some embodiments do not provide the departure schedule of the transit vehicle in every banner while other embodiments provide additional information about the transit trip or the transit vehicle associated with a particular section of the transit trip in the navigation banner. The second stage 3110 also shows that the user is swiping through the first navigation banner in order to see the next banner in the sequence. In some embodiments, a user swipes through the navigation banners by touching (contacting) the touch-sensitive display screen of the device with one or more fingers and dragging the finger(s) to the left or right on the display screen to scroll the screen to the left or right, respectively.

The third stage 3115 shows that as a result of the user's swipe gesture on the banner display area 3150, the first navigation banner has scrolled out of the display screen and a second navigation banner that provides navigation instruction for the second leg of the transit route is scrolled in and displayed in this display area. The navigation instruction for the second transit leg includes the bus stop at which to exit the bus line 56, the walking distance to the next bus stop, the line and the bus stop for the next leg of the trip, the total travel distance of the next leg, and the departure schedule of the next bus line.

The third stage 3115 also shows that the map view display area 3155 displays the second maneuver map view that is associated with the second transit leg. The maneuver map view for the second leg in this stage includes a bus route representation for the bus line 244 along with a walking portion to the bus stop for this line. Although in the illustrated example the navigation instruction is for the combination of three different transit maneuvers (i.e., exiting the bus 56, walking for 10 minutes, and taking the bus 244), as described above, some embodiment provide three different banners each of which includes a navigation instruction for one of these three transit maneuvers. The third stage 3115 further shows that the user is swiping the second navigation banner to the left in order to see the next navigation banner in the sequence and its associated maneuver map view.

Additionally, as described before, some embodiments provide more (detailed) instructions when the walking distance in a walking portion of the transit route is more than a certain amount (i.e., more than a threshold distance). For instance, in the illustrated example, if the walking distance between the first leg (bus line 56) and the second leg (bus line 244) was more than a certain distance (e.g., 1 mile) and/or covered a series of different maneuvers (e.g., covered several turns on different streets), then some embodiments provide one or more pairs of navigation banners and their associated map views for that walking portion alone.

The fourth stage 3120 shows that the banner display area 3150 now displays a third navigation banner that provides navigation instructions for the third leg of the transit route. This navigation banner is scrolled into the display area and the last navigation banner is scrolled out of the display area 3150 after the user swipes through the previous navigation banner. The navigation instruction for the third transit leg includes the bus stop to exit the bus 244, the walking distance to the next transit station, the line and the transit station for the next leg of the trip, the total travel distance of the next leg, and the departure schedule of the subway trains of this line.

The fourth stage 3120 also shows that the map view display area 3155 displays the third maneuver map view that is associated with the third transit leg 3145. The maneuver map view for the third leg includes a subway route representation for the subway line 166 along with a walking portion to the subway station for this line. Although in the illustrated example the navigation instruction in the banner is for the combination of three different transit maneuvers (i.e., exiting the bus 244, walking for 2 minutes, and taking the subway 166), similar to the third stage, some embodiments may provide three different banners that each includes a navigation instruction for one of the three transit maneuvers. Some other embodiments display other combinations of the three instructions in their navigation banner display area. The fourth stage 3120 further shows that the user is swiping through the third navigation banner in order to see the next navigation banner in the sequence and the maneuver map view that is associated with the next navigation banner.

The fifth stage 3125 shows a fourth navigation banner that provides navigation instructions on how to exit the subway station and arrive at the desired destination. In some embodiments, the map application shows a navigation banner that provides navigation instructions on how to enter or exit a transit station when the transit station is a large structure with several entrances and/or exits. In some other embodiments the map application provides a navigation banner for every transit station of a particular transit system (e.g., subway station, train station, etc.). Yet, the map application of some other embodiments does not provide a separate navigation banner for a transit station. In some such embodiments, the application provides the instructions about entrance to, or exit from, a transit station in a navigation banner that is associated with a transit leg that starts from the transit station or ends at the transit station, respectively.

In the illustrated example, the last transit station is a large structure with multiple entrance and exit ways. As such, the last navigation banner of the fifth stage 3125 provides navigation instructions for exiting the subway train at the subway station as well as instructions on how to exit from the subway station towards the destination. Specifically, the navigation instruction in the last navigation banner includes the subway station at which to exit the subway train 166, the exit door of the subway station to leave the station, and the walking distance to the destination. The fifth stage 3125 also shows that the map view display area 3155 displays a representation for the subway station that includes an entrance 3160 to the subway station and two exits 3165 and 3170 from the station. The display area 3155 also displays the walking portion representation on the map which takes the user from the exit 3165 of the subway station to the destination.

Figure 32:
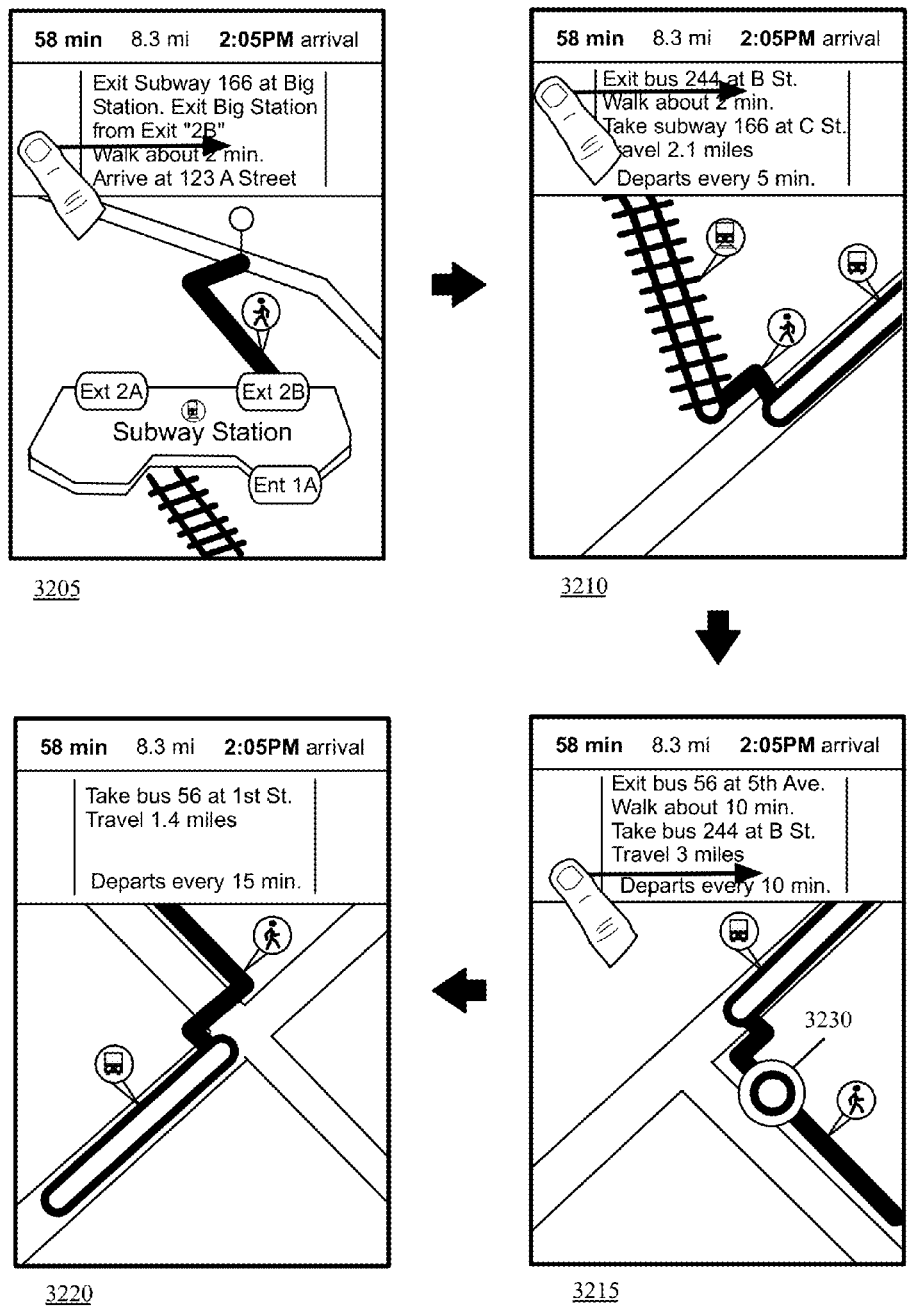
FIG. 32 illustrates an example of displaying the current location of the device while scrolling through the different navigation banners of a navigation presentation.

As described above, when the device's location is within one or more of the maneuver map views, the map application of some embodiments displays the device's location on the map view(s) so that the user can orient him/herself with the required transit navigation maneuvers. FIG. 32 illustrates an example of displaying the current location of the device while scrolling through the different navigation banners of a navigation presentation. This figure shows in terms of four operational stages 3205-3220, when a map view covers a geographical area in which a user is currently holding the device, the maneuver map view displays the current location of the device on the map presentation when a corresponding navigation banner is displayed on the device.

In the first stage 3205 the figure shows the same map application UI that was shown last in the fifth stage 3125 of FIG. 31. This stage shows the same navigation banner as shown in the previous figure after scrolling through all the navigation banners in the navigation presentation mode. This stage also shows that the user now is scrolling back to review the previous banners and instructions (e.g., by contacting the touch-sensitive display screen of the device with one or more fingers and dragging the finger(s) to the right on the display screen to scroll the display area to the right or back).

The second, third, and fourth stages 3210, 3215, and 3220 show similar user interfaces as the ones shown in the fourth, third, and second stages 3120, 3115, and 3110 of FIG. 31, respectively. However, in these three stages, instead of swiping the screen to the left to see the next navigation banner, the user swipes the display screen to the right in order to see the prior navigation banner. In addition, the third stage 3215 shows the current position of the device through the current position indicator 3230 that is drawn on a walking portion of the map between the first and second legs of the transit route.

This is because the map application of some embodiments iteratively monitors the current position of the device along the transit route. In some such embodiments, when the application determines that the currently displayed navigation banner is for a transit leg that is associated with the current location of the device, the application automatically, and without user intervention, displays a current position indicator on the map (in the map view display area) that that represents the current position of the device (user).

A. Auto Stepping

In some embodiments, when the user stops scrolling through the navigation banners during a navigation presentation, the map application automatically scrolls back (or forward) the display screens (i.e., the navigation banner and map view screens) to display the current navigation banner and map view when the application determines the current location of the device along a particular leg of the transit route that is not currently displayed on the device. In other words, the application auto steps to the current transit leg of the transit route and displays the pair of navigation banner and maneuver map view that is associated with the current location of the device when a number of conditions are met. Some of these conditions in some embodiments are, identifying a certain inactivity period, during which, the user has not interacted with the navigation banners, determining that there is enough reception to identify the current location of the device, and identifying that the currently displayed pair of navigation banner and map view is not associated with the current position of the device.

Figure 33:
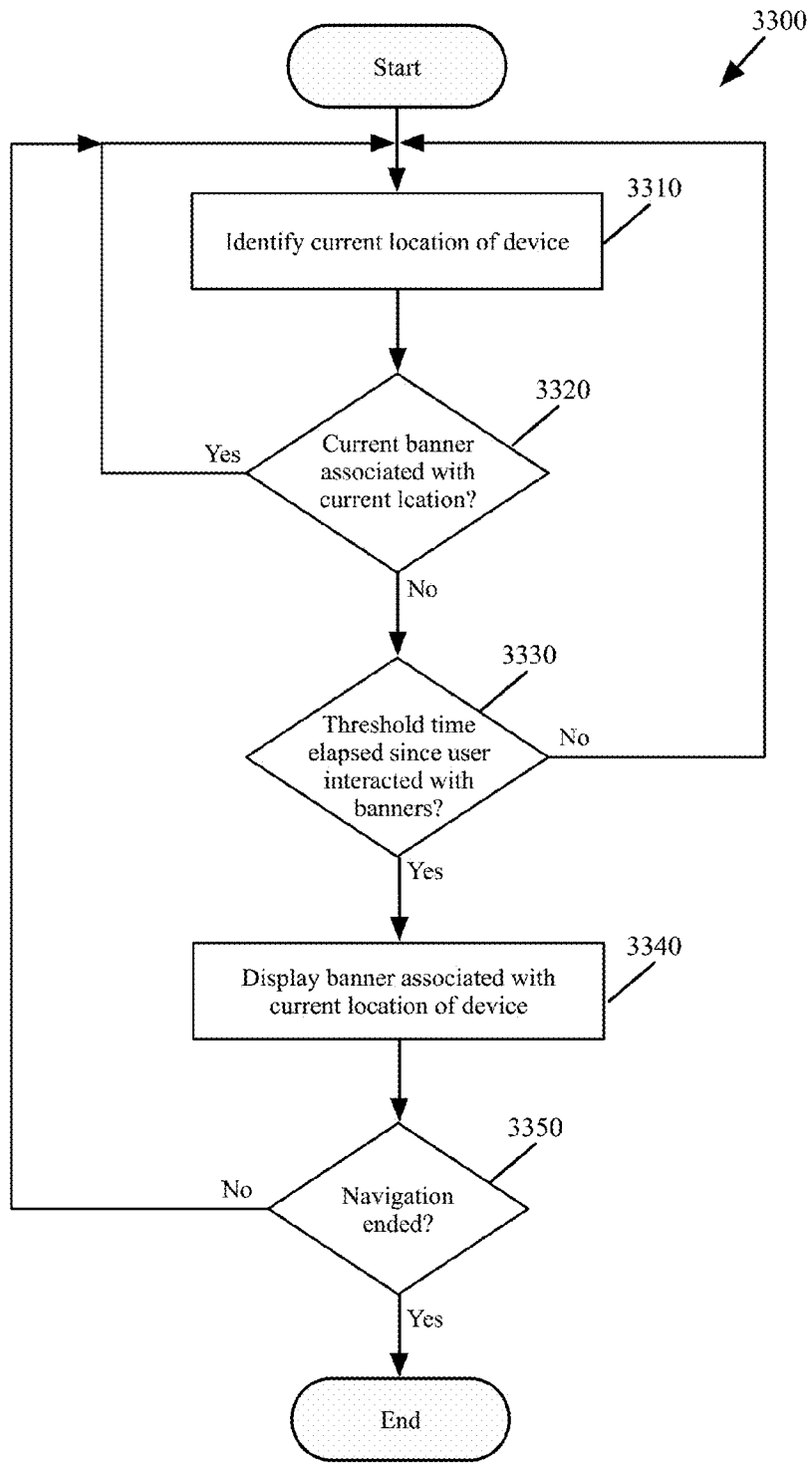
FIG. 33 conceptually illustrates a process that the map application of some embodiments performs to automatically display a pair of navigation banner and map view that is associated with the current location of the device.

FIG. 33 conceptually illustrates a process 3300 that the map application of some embodiments performs to automatically display a pair of navigation banner and map view that is associated with the current location of the device. Specifically, the map application changes the currently displayed navigation banner and map view to a navigation banner and map view that are associated with the current leg of the transit route (e.g., by scrolling back or forward the intervening navigation banners and map views) without any user intervention. The current leg of a transit route in some embodiments is a portion of the transit route that covers the current location of the device on the geographical area displayed in the map view (i.e., the location of the device can be displayed on a map view that is associated with the current transit leg).

The process 3300 is initiated by identifying (at 3310) the current location of the device. The map application of some embodiments identifies the current location of the device using the coordinates (e.g., longitudinal, altitudinal, and latitudinal coordinates) in the Global Positioning System (GPS) signal that the device receives at the location of the device. Alternatively or conjunctively, the map application of some embodiments uses other means (e.g., cell tower triangulation) to compute the current location.

The process then determines (at 3320) whether the currently displayed navigation banner is associated with the identified location. As described above and below, each navigation banner of some embodiments provides a navigation instruction that corresponds to a transit leg of the transit route. In order to determine whether the currently displayed navigation banner is associated with the identified location, the process of some embodiments determines whether the identified location is associated with the transit leg (e.g., along the transit leg), for which the navigation banner provides the navigation instruction. When the process determines that the currently displayed navigation banner is associated with the identified location, the process returns to operation 3310 and iteratively tracks the current position of the device.

On the other hand, if the process determines that the currently displayed navigation banner is not associated with the identified location, the process determines (at 3330) whether a threshold time has elapsed since the user last interacted with the navigation presentation. That is, the process determines whether the user has stopped scrolling the navigation banners for a certain period of time. When the process determines that the threshold time (e.g. thirty seconds, one minute, etc.) has not elapsed since the user last interacted with the navigation presentation, the process returns to operation 3310 to iteratively track the current position of the device.

On the other hand, if the process determines that the threshold time has elapsed since the last interaction of the user with the navigation presentation (i.e., the currently displayed banner has been on the screen for more than a particular time period), the process displays (at 3340) a pair of navigation banner and map view that is associated with the current location of the device. In order to do so, some embodiments scroll back or forward all the intervening banners and map views to display the current navigation banner and map view that is associated with the current location. Some other embodiments merely replace the last displayed navigation banner and map view with the current navigation banner and map view in their corresponding display screens. The process then ends.

Some embodiments perform variations of the process 3300. The specific operations of the process 3300 may not be performed in the exact order shown and described. For example, the process of some embodiments instead of determining whether the current location is associated with the currently displayed banner, first determines whether a threshold time has elapsed since user last interacted with the device, and then makes the determination about the association of the currently displayed banner with the current position of the device. Additionally, the specific operations may not be performed in one continuous series of operations, and different specific operations may be performed in different embodiments.

As described above, some embodiments provide a separate navigation instruction (in a separate navigation banner) for each next action (step) that the user of the device should take during a navigation presentation. For instance, when a user has to walk to the transit station A, board a transit vehicle at transit station A, exit at transit station B, and then walk to the destination, some embodiments provide a first navigation banner (and its associated map view) with instructions for walking to transit station A, a second navigation banner (and its associated map view) for boarding the transit vehicle, a third navigation banner (and its associated map view) for exiting the transit vehicle at transit station B, and a fourth navigation banner (and its associated map view) for walking to the destination. Some embodiments also provide a navigation banner between the second and third banners (i.e., entering and exiting the transit vehicle) that provides additional instructions while the device is on board (i.e., the user is travelling on the transit vehicle).

The map application of some embodiments automatically scrolls the navigation banner display area and the map view display area (auto steps) to display the next step of the navigation based on a set of heuristics. The primary heuristic in determining whether to auto step or not in some embodiments is the distance between the two steps. However, when the distance is less than a threshold amount between the two steps, some embodiments consider other heuristics to determine whether to auto step or not.

Some embodiments provide a separate navigation banner that includes navigation instructions for entering a transit station (e.g., an enter-station navigation banner). Some such embodiments display the enter-station navigation banner when the device is within a threshold distance (e.g., 100 meters) from any of the transit stations of the transit route. Some other embodiments do not provide a separate navigation banner for transit stations and integrate the instructions of such into the navigation instruction that is provided for a walking leg before reaching the transit station, or into the navigation instruction that is provided to board the transit vehicle.

Once the map application of some embodiments determines (e.g., through a mapping service) that the device (user) is at a transit station, the application provides instructions that instruct the user to board the transit vehicle. Some embodiments determine that the device is at the transit station when the device is located on the same map polygon that includes the transit station. Some other embodiments determine that the user is at the station when the device is within a threshold distance of the station. Some embodiments require additional conditions to be met to determine that the device is at the transit station.

For instance some embodiments require that the device be on a travelling mode (e.g., the user was travelling on another transit vehicle) before the tracked location of the device reaches a particular spot within a threshold distance of the transit station. Some such embodiments do not require the device to be in a travelling mode once the device reaches the particular spot. This is particularly helpful when the location of the device cannot be determined before reaching the transit station (e.g., the user is travelling on an underground subway train before reaching the bus stop and changing the transit vehicles). Some embodiments can determine whether a device is on a travelling mode or not by analyzing the motion data the map application receives through different motion sensors of the device.

For transit stations for which a separate map polygon is not provided (e.g., for a bus stop), some embodiments only use the threshold distance to the transit station. Some embodiments first determine whether a station polygon is provided. These embodiments use the polygon method when a polygon exists for the station and use the distance method when there is no transit station polygon available. Yet some other embodiments use a combination of both methods (i.e., being in the same map polygon and within the threshold distance) in order to determine that the device is at the transit station even when a transit station polygon exists.

When the map application of some embodiments determines that the device is outside a threshold distance from the current transit station and between the current transit station and the next transit station to exit the transit vehicle, the map application auto steps forward and shows the next navigation banner that includes the next transit station to exit the transit vehicle. The map application of some other embodiments does not auto step until the device reaches a threshold distance to the last transit station of the transit leg and when the application determines that the device is within the threshold distance (or on the same map polygon that the exit transit station is, or a combination of both), the application auto steps and shows the next navigation banner that includes instructions for exiting the transit vehicle at the transit station.

Some embodiments auto steps to an intermediate navigation banner that is after the first banner that instructs the user to board the transit vehicle and before the next banner that instructs the user to exit the transit vehicle. The intermediate navigation banner of these embodiments includes a navigation instruction that instructs other helpful instructions for guiding the user (e.g., instructing the user to stay on the transit vehicle, showing the remaining distance to the last transit station of the transit leg, showing the remaining number of stops before reaching the last transit station of the transit leg, etc.).

Figure 34:
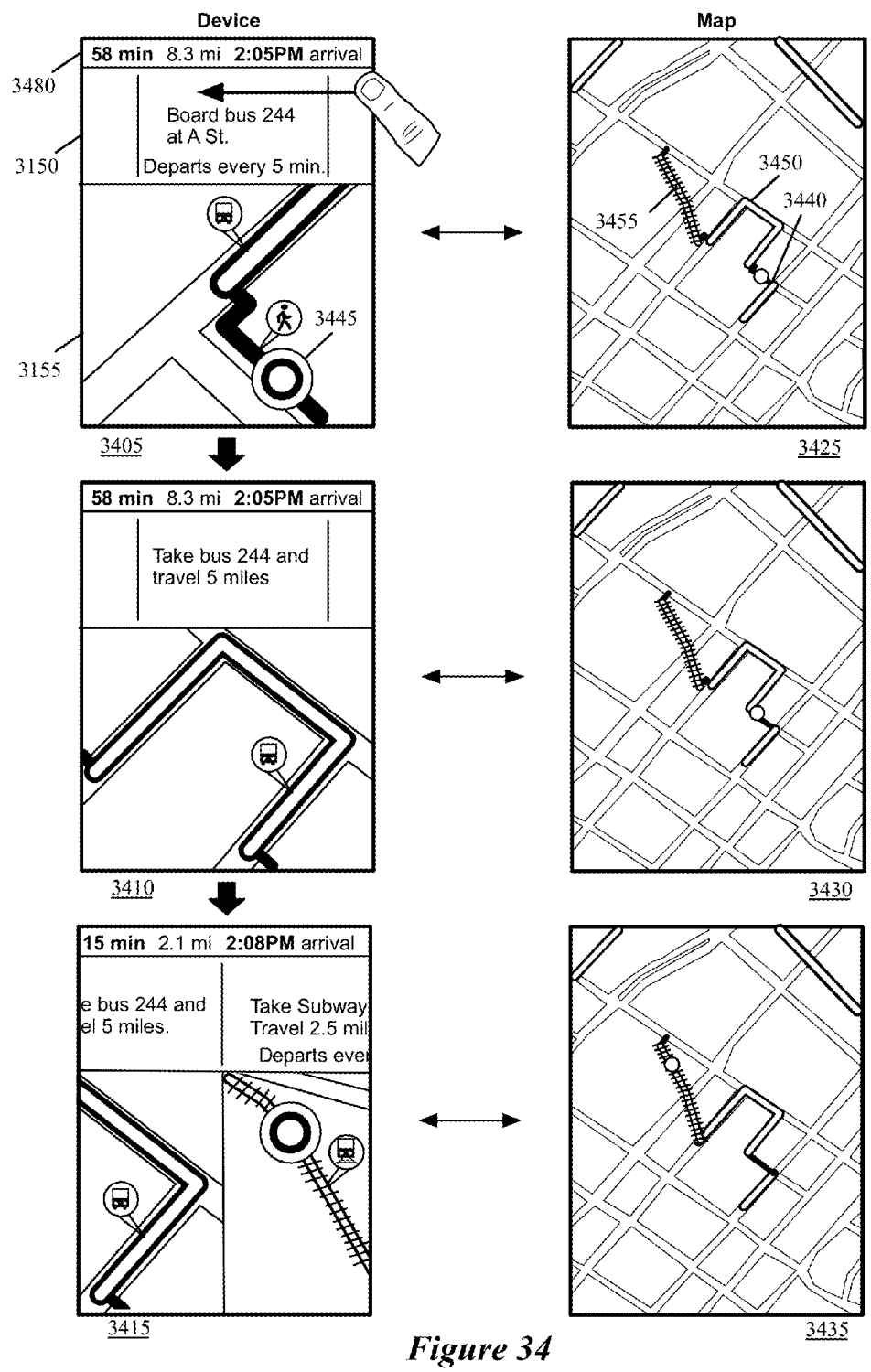
FIG. 34 illustrates a map application of some embodiments automatically displaying a navigation banner that is associated with the current position of the device.

FIG. 34 illustrates a map application of some embodiments automatically displaying a navigation banner that is associated with the current position of the device. This figure is described in terms of three different stages 3405-3415 of the map application UI and three top-down views 3425-3435 of the map that illustrate the position of the device in three different legs of a transit route that correspond to the three stages 3405-3415, respectively.

As stated above, the map application of some embodiments iteratively monitors the current position of the device along the transit route. In some such embodiments, when the application determines that the currently displayed navigation banner is for a transit leg that is not associated with the current location of the device, the application automatically, and without user intervention, scrolls back (or forward) the navigation banner display area and the map view display area to display the navigation banner and map view for a transit leg that is associated with the current position of the device. That is, the map application automatically changes the currently displayed banner and map view to a navigation banner and map view that are associated with a portion of the transit route that covers the current location of the device (e.g., by scrolling back or forward the intervening navigation banners and map views). The map application of these embodiments displays the new navigation banner and its corresponding maneuver map view without receiving any user interaction with the device (e.g., a touch gesture, a swipe gesture, etc.).

Before automatically scrolling the navigation banners to display the navigation banner that is associated with the current transit leg, the map application of some embodiments first determines that the application has accurately detected the current location of the device (e.g., by ascertaining that the device has enough reception to accurately determine its current position). Alternatively or conjunctively, the navigation application of some embodiments keeps track of the time since the navigation application displayed the last navigation banner for a transit leg. The application of some such embodiments automatically refreshes the display areas to display the navigation banner of the current transit leg and the corresponding maneuver map view when a defined period of time elapses since the last navigation banner and map view were displayed. Therefore, in some embodiments, in order for the map application to change the current transit leg's navigation banner and its corresponding map view, the application determines that (1) an accurate location of the device is identified, (2) the currently displayed banner is not associated with the current location of the device, and (3) a certain time period has passed since the currently displayed banner has been last shown to the user.

In the first stage 3405, the navigation banner display area 3150 displays a navigation banner for a walking portion of the transit route that includes navigation instruction for boarding the next bus which departs every 5 minutes. As described above, some embodiments, as in the illustrated example, provide a separate pair of navigation banner and map view for each transit navigation maneuver including a maneuver at the beginning of a transit leg (e.g., boarding a transit vehicle) and at the end of a transit leg (e.g., exiting a transit vehicle). The map view display area 3155 also displays a current position of the device through a current position indicator 3445 that is moving towards the next bus stop of the transit route.

The corresponding top down view 3425 of the first stage 3405 shows that the device is currently located at the walking leg 3440 of the transit route. The first stage 3405 further shows that the user is swiping through the navigation banner in order to see the next navigation banner in the sequence and the maneuver map view that is associated with the next navigation banner. The first stage 3405 also shows a trip summary display area 3480 that includes additional information about the transit trip (e.g., the total/remaining trip duration, total/remaining trip distance, etc.). As shown in this stage, the trip summary display area 3480 shows that the total trip time is 58 minutes for this transit trip and the total distance to the destination is 8.3 miles.

The second stage 3410 shows that the navigation banner display area 3150 displays the next navigation banner that is associated with the next transit leg of the trip (i.e., the bus leg 3450). The corresponding top down view 3430 of the second stage 3410 shows that the device is still on the walking leg 3440 of the transit route, however, it has moved further towards the second leg 3450. For instance, the user of the device is walking towards the next bus stop while the user is swiping through the different navigation banners to browse the navigation route. The navigation banner of the second stage 3410 (as illustrated) includes a navigation instruction for boarding the next of the line 244.

The third stage 3415 shows that the navigation banner display area 3150 and the map view display area 3155 are scrolling forward to display the next navigation banner and map view even though the user did not interact with the device (e.g., swipe through the displayed banner) in the previous stage. This is because the application has detected that the current location of the device is on a different leg of the transit route. That is, as the corresponding top down view 3435 of the third stage 3415 shows, the current position of the device is now in the middle of the third and last leg of the transit route (i.e., the transit leg 3455), while the navigation banner and map view display screens were still showing the navigation instruction and map view associated with the second leg of the transit trip.

Therefore, the map application, after identifying that the current location of the device is on a portion of the transit route that is different than the currently displayed navigation instruction and map view, automatically scrolls the banner and map view to show the banner and map view that are associated with the current position of the device. In the illustrated example, because the user did not interact with the device for a certain amount of time during which the position of the device changed from the second leg to the third leg, the display areas scroll forward to show the updated information. The third stage also shows that the trip summary display area 880 has also been updated and now shows that the remaining trip time is 15 minutes and the remaining distance to the destination is 2.1 miles.

Although not shown, one of ordinary skill in the art would realize that the displayed banner and map view could similarly scroll backward. For example, if the user swipes through the navigation banners to the last navigation banner for the last transit leg, when the position of the device stays on one of the earlier transit legs of the trip for a certain time, the application of some embodiments scrolls the screens back to display the information related to the current position of the device in the navigation banner and the map view.

B. Route Modification

Some embodiments allow the user to modify the transit route during the navigation presentation. In some embodiments, the user can replace one or more transit legs of the transit route with one or more transit legs that were not part of the originally presented transit route. That is, in some embodiments, each transit leg under certain circumstances (described below) may be replaced by another route that includes one or more transit legs. In some embodiments, the user can modify the route while the user steps through the different navigation banners of the transit route. In some embodiments, the user may modify the route while a navigation list view of the route is presented to the user.

Figure 35:
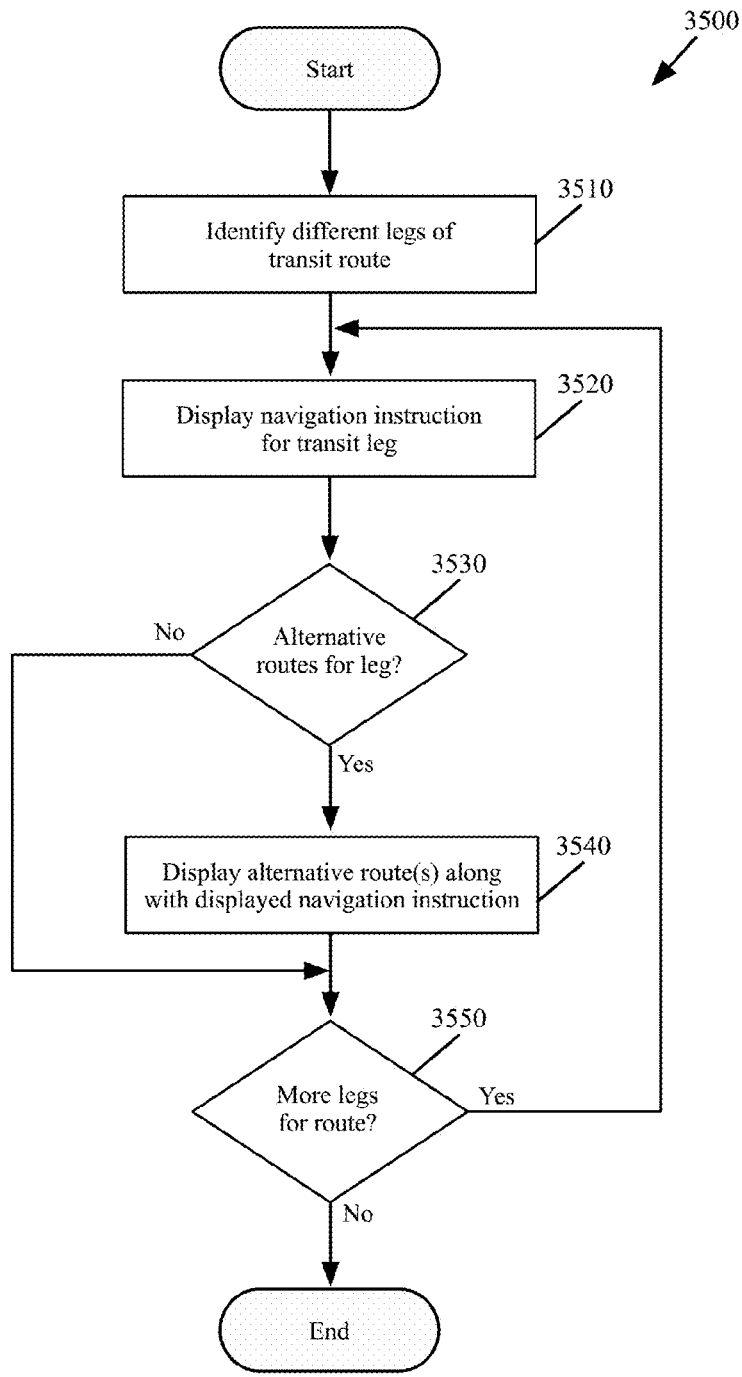
FIG. 35 conceptually illustrates a process that some embodiments perform to identify and display one or more alternative routes for a transit leg of a transit route.

FIG. 35 conceptually illustrates a process 3500 that some embodiments perform to identify and display alternative routes for a transit leg of a transit trip. The mapping service of some embodiments which provides transit data to the map application performs this process while in some other embodiments the process is performed by the map application that runs on the device. Some embodiments perform this process to display the navigation instructions of the transit route in a navigation list view similar to the navigation list view described above by reference to FIG. 14.

The process 3500 begins by identifying (at 3510) the different legs of a transit route. As described above, a transit route of some embodiments includes several legs each of which is either serviced by a different transit vehicle of a different line, or a navigable pedestrian route, which includes a walking distance that is more than a threshold distance. The process then displays (at 3520) a first navigation instruction for the first transit leg of the transit route (e.g., in a transit navigation list view).

The process then determines (at 3530) whether there is any alternative route for the displayed leg. The process of some embodiments makes such a determination by determining whether the displayed transit leg is replaceable by a second route (including one or more transit legs) that runs parallel with the displayed transit leg (i.e., from the same starting station to the same ending station). In some other embodiments a transit leg is replaceable by a second route when the second route (that includes one or more transit legs itself) and the transit leg have at least two common transit stations or two transit stations that are within a short distance of each other (e.g., within a threshold distance of each other).

When the process determines that there is no alternative route for the displayed leg, the process proceeds to operation 3550 which is described below. On the other hand, when the process determines that there are one or more alternative routes for the displayed leg, the process displays (at 3540) the alternative routes to the user as selectable items along with the navigation instruction for the transit leg. The user can then select any of the alternative routes to replace the currently displayed leg with the alternative routes. In some embodiments, the one or more other transit vehicles of an alternative route can be of the same type as the transit vehicle that travels the transit leg, or they can be of different types (e.g., the transit leg is traveled by a bus, while the second route is traveled by one or more subway trains).

The process then determines (at 3550) whether there are more legs in the transit route to process. When the process determines that additional legs are left in the transit route, the process returns to 3520 to display the navigation instruction for the next leg of the transit route and any possible alternative routes for the next leg in the same manner that was described above. On the other hand, when the process determines that it the last leg of the transit route has been processed, the process ends.

Some embodiments perform variations of the process 3500. The specific operations of the process 3500 may not be performed in the exact order shown and described. Additionally, the specific operations may not be performed in one continuous series of operations, and different specific operations may be performed in different embodiments. For example, some embodiments perform similar operations to identify and display navigation banners and map views in a navigation presentation. The process of some such embodiments displays the next legs and navigation instructions, however, upon receiving a user interaction with the displayed screen (e.g., a user scrolls through a navigation banner to review the next instruction in the next navigation banner, as described above).

Figure 36:
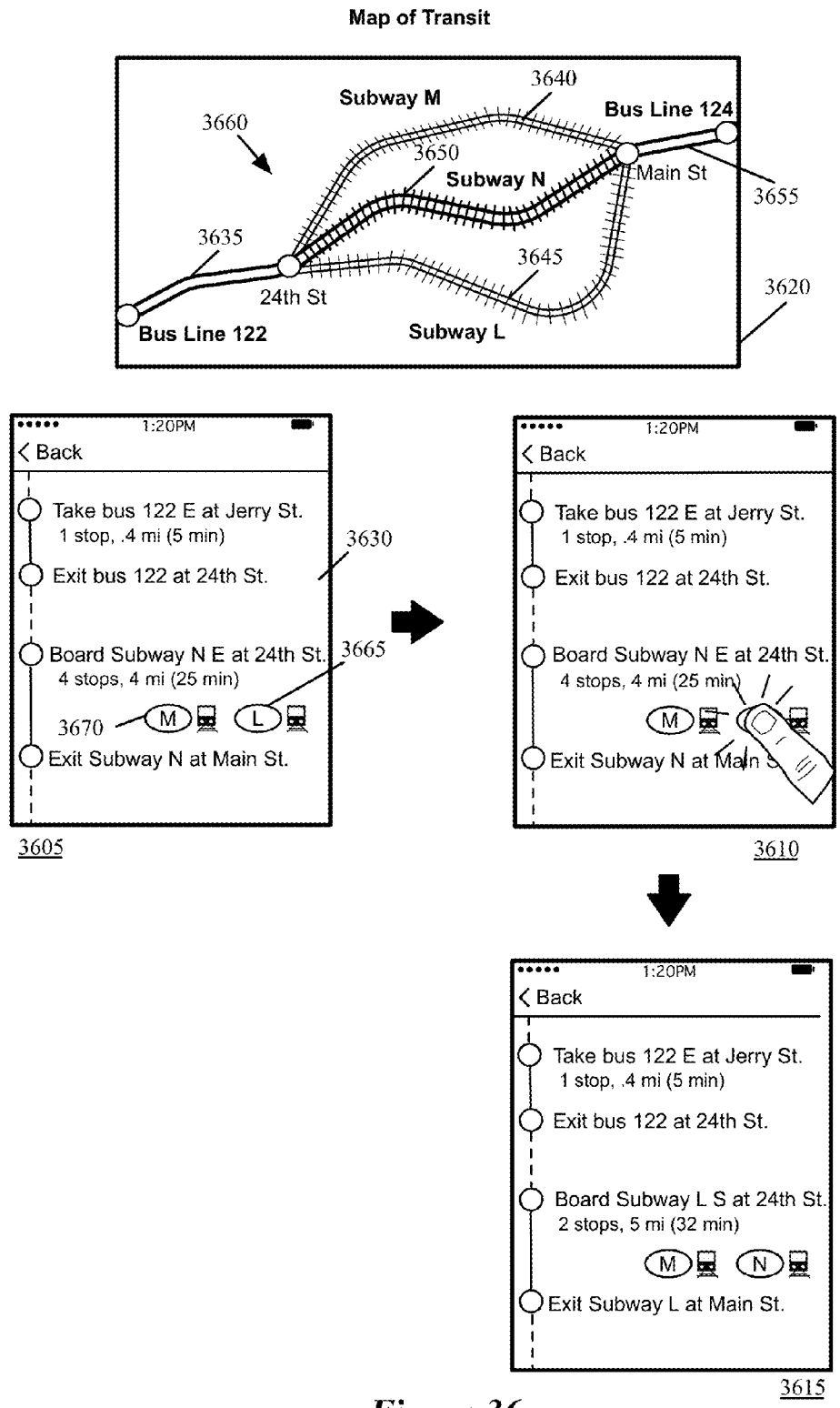
FIG. 36 illustrates an example of modifying a selected transit route in a navigation list view.

FIG. 36 illustrates an example of modifying a selected transit route in a navigation list view. This figure shows through three operational stages 3605-3615 and a transit map presentation 3620, how a user can replace a particular leg of a transit route with a different transit leg while the user views a navigation list view of the transit route. As discussed above, when a user selects a route summary presentation (e.g., presented in response to a request for transit route), the map application of some embodiments provides a list view of the selected transit route which provides a list of detailed instructions on how to navigate the transit route.

The transit map presentation 3620 displays representations of different routes of different transit lines in a particular geographical area. Specifically, the transit map shows two bus line representations 3635 and 3645 for the bus lines 122 and 124, respectively. The buses of these two lines travel along the two legs of a portion of a transit route 3660 that is highlighted on the map presentation (e.g., a transit route selected by the user). The transit map also shows one subway line representation 3650 for the subway line N which is another leg of the transit route 3660. The transit map further includes two other subway line representations 3640 and 3645 for the subway lines M and L. The subway lines M and L, however, are not a part of the transit route 3660, but run parallel with the leg 3650 (subway line N) of the transit route 3660.

In the first stage 3605, a user is presented with a navigation list view (e.g., after the user selected a route summary associated with the list view) 3630. The list view includes all the navigation instructions required to navigate the transit route 3660. However, the first stage 3605 only shows the instructions of the list view that are related to the portion of the map that is displayed in the transit map presentation 3620. The displayed portion of the list view at this stage includes instructions for taking a bus of line 122 heading east at Jerry Street, and after passing one bus stop and traveling for about 0.4 miles, exiting the bus 122 at the $24^{th}$ Street. The walking instructions between the legs are not displayed for simplicity of description. The list view also includes an instruction that instructs the user to board subway N heading east at the $24^{th}$ Street. However, under the same instruction, the list view includes two subway representations 3665 and 3670 for the subway lines L and M, respectively.

In some embodiments, the map application determines whether any of the transit legs of a selected transit route is replaceable by a second different route that is traveled by one or more other transit vehicles. In some embodiments a transit leg is replaceable by a second route when the second route runs parallel with the identified transit leg (i.e., from the same starting station to the same ending station). In some other embodiments a transit leg is replaceable by a second route when the second route and the transit leg have at least two common transit stations or two transit stations that are within a short distance of each other (e.g., within a threshold distance of each other).

In some embodiments, the one or more other transit vehicles of the second route are of the same type as the transit vehicle that travels the transit leg (i.e. the transit vehicles are from the same transit system), or the transit vehicles are of different types (e.g., the transit leg is traveled by a bus, while the second route is traveled by one or more subway trains and buses). When the map application of some embodiments determines that a transit leg of a transit route can be replaced with other routes, the map application displays the other routes to the user along with the same navigation instruction that is associated with the transit leg. That is, the navigation application displays the navigation instruction for the transit leg (e.g., in the list view, in the navigation banner, etc.) and provides the other identified routes as selectable UI items for the user to be able to modify the selected transit route.

In the illustrated example, the transit leg 3650 has the same starting and ending stations as the routes 3640 and 3645 at the $24^{th}$ Street and Main Street, as displayed in the transit map presentation 3620. As such, the map application has determined that the transit leg 3650 can be replaced by these two subway routes and displayed them under the same instruction that is provided for boarding the subway train of line N. The two subway routes 3640 and 3645 are presented with two selectable subway representations 3665 and 3670.

Although in the illustrated example, each substitute route is displayed separately as a selectable UI item, some other embodiments provide a single indicator that other routes are available, and upon selection of the indicator, a new display area provides all other routes that can replace the transit leg along with various transit information about the routes. For example, when other routes are available, the map application of some such embodiments provides a new display area that lists these routes, and for each route in the list, the application provides the travel distance of the route, the number of transit stations that will be passed, the approximate time of travel, the difference in travel distance between the route and the transit leg, etc.

The second stage 3610 shows that the user selects the subway route 3665 (e.g., by tapping on the route representation). The third stage 3615 shows that as a result of selecting the new subway route, the list view now includes new instructions for boarding the subway train of line L (instead of subway train of line N that was shown originally) along with transit information of this subway line. Although in the illustrated example each one of the substitute routes includes only one subway train of one line, as discussed above, each substitute route can include multiple subway trains of different lines in some embodiments. Conversely, each one of the illustrated substitute routes can be traveled by a transit vehicle of a different type (e.g., a bus) or by several different transit vehicles of different lines and different types. For example, the presented transit leg might be a subway line with an alternative route that includes both a bus line and a different subway line.

Figure 37:
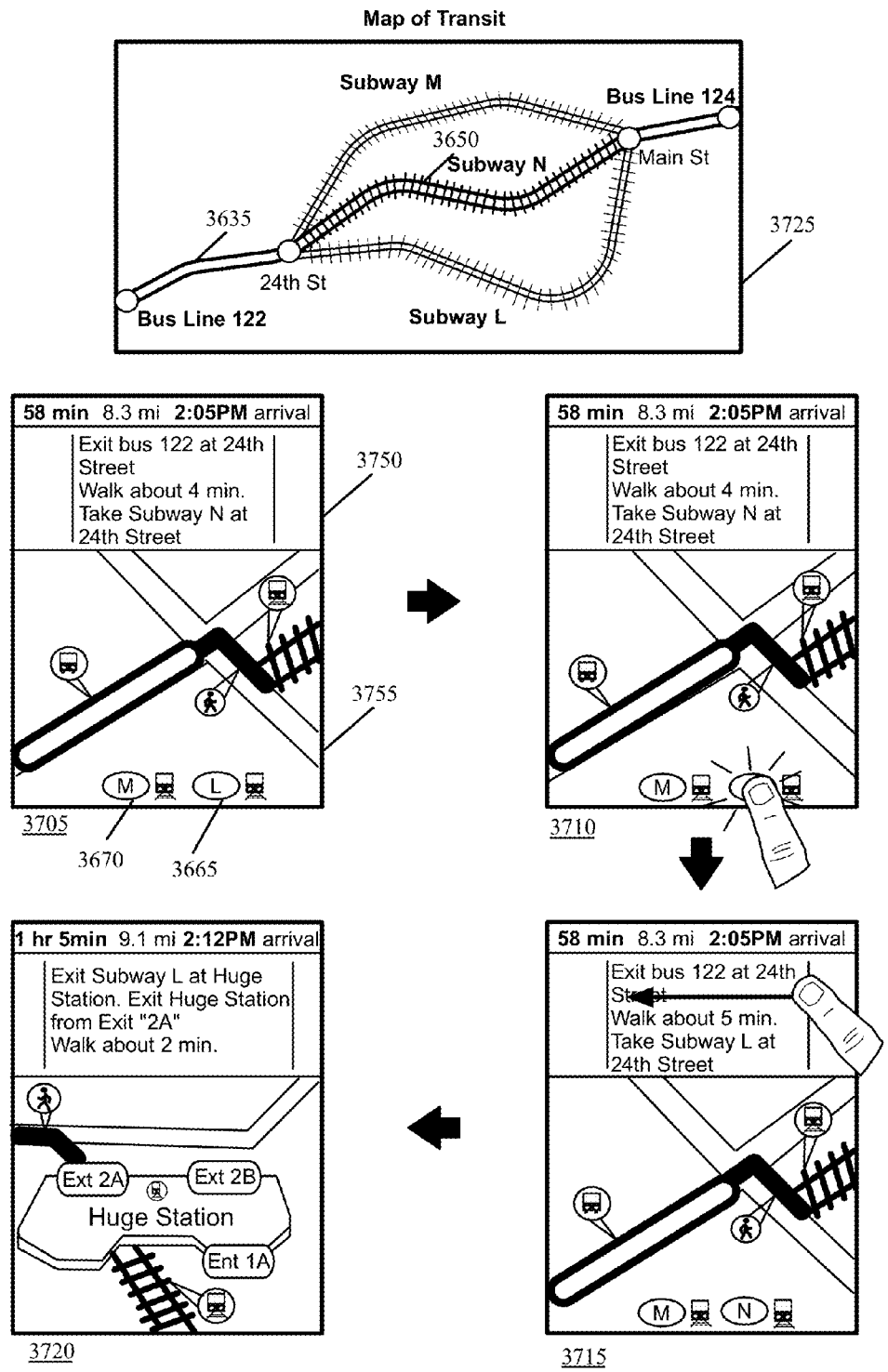
FIG. 37 illustrates another example of modifying a selected transit route in a navigation presentation.

FIG. 37 illustrates another example of modifying a selected transit route in a navigation presentation. This figure shows through four operational stages 3705-3720 and a transit map presentation 3725, how a user can replace a particular leg of a transit route with a different route while the user steps through the navigation banners of a navigation presentation. As described above, when a user selects the Start control to start a turn-by-turn transit navigation presentation, the map application provides a sequence of navigation banners and their corresponding map views of the route to the user. The user can then step (scroll) through the sequence of the banners and view different instructions (e.g., pictorial and text instructions) about each leg of the transit trip.

The transit map presentation 3725 displays the same representations of different routes of different transit lines that were displayed in the transit map presentation of 3620 of FIG. 36. The first stage 3705 shows a navigation banner in the banner display area 3750, which includes navigation instructions for the bus leg 3635 of the transit route. The maneuver map view display area 3755 displays the transit leg of the route for which the navigation instructions are provided. Specifically, the map view includes the last portion of the bus leg and the beginning of the subway leg. This map view further includes two other subway representations 3665 and 3675 for the other subway trains that travel the parallel routes to the transit leg 3650. This is because the map application of some embodiments gives the user the option to choose from the different transit vehicles that travel towards the same destination but via different routes.

As described in the example illustrated in the previous figure, the other options for the other routes can be presented to the user differently in different embodiments. That is, although each substitute route is displayed separately as a selectable UI item in this example, some embodiments provide a single selectable UI item in the map view area that indicates to the user that other routes are available for this particular transit leg. Upon selection of this UI item, a new display area opens up which provides all other routes in a list format and for each route in the list, different transit information about the route is provided by these embodiments.

The second stage 3710 shows that the user selects the subway route 3665 (e.g., by tapping on the route representation). The third stage 3615 shows that as a result of selecting the new subway route, the navigation banner now includes new instructions for boarding the subway train of line L (instead of subway train of line N that was shown originally) along with transit information of this subway line. The third stage also shows that the user swipes through the navigation banner to view the next step's navigation banner and map view of the transit route. The fourth stage 3720 then shows a navigation banner that instructs the user on where to get off the subway train L and how to Exit the subway station to get to the next bus stop of the transit route.

C. Transit Navigation on Other Devices

All the above concepts and features described for a map application are equally applicable to different types of electronic devices with different types and sizes of display screens. However, some of the user interfaces are presented differently for different devices. For instance, the illustrated example in FIG. 31 shows a transit navigation presentation that some embodiments provide for a particular type of electronic device with a particular size of display screen (e.g., an iPhone). Some embodiments provide different navigation presentations on different types of electronic devices.

For example some embodiments provide a navigation presentation that although operates in the same above-described manner, provides a different type of user interface and navigation presentation on a different type of electronic device (e.g., an Apple Watch). Because of the size limitation of the display screen and/or display area of some electronic devices, the map application of some embodiments is not able to display all the map/navigation information that the application would have shown in a device with a bigger display screen, at once.

Some embodiments provide means that compensate for this type of limitation. For example, the transit navigation presentation provided by some embodiments does not provide a pair of navigation banner and map view together (as shown and described in the above examples) for each transit navigation instruction. Instead, the transit navigation presentation provides a navigation banner for each transit navigation instruction in one screen, and upon selection of the banner (e.g., by tapping on the banner or display screen), the navigation presentation provides a map view that is associated with the displayed navigation banner. The user can then switch back to view the navigation instruction by selecting a back control (e.g., by tapping on a back control) or by swiping the display screen (e.g., touch the display screen with one or more fingers and drag the finger(s) to the right).

Figure 38:
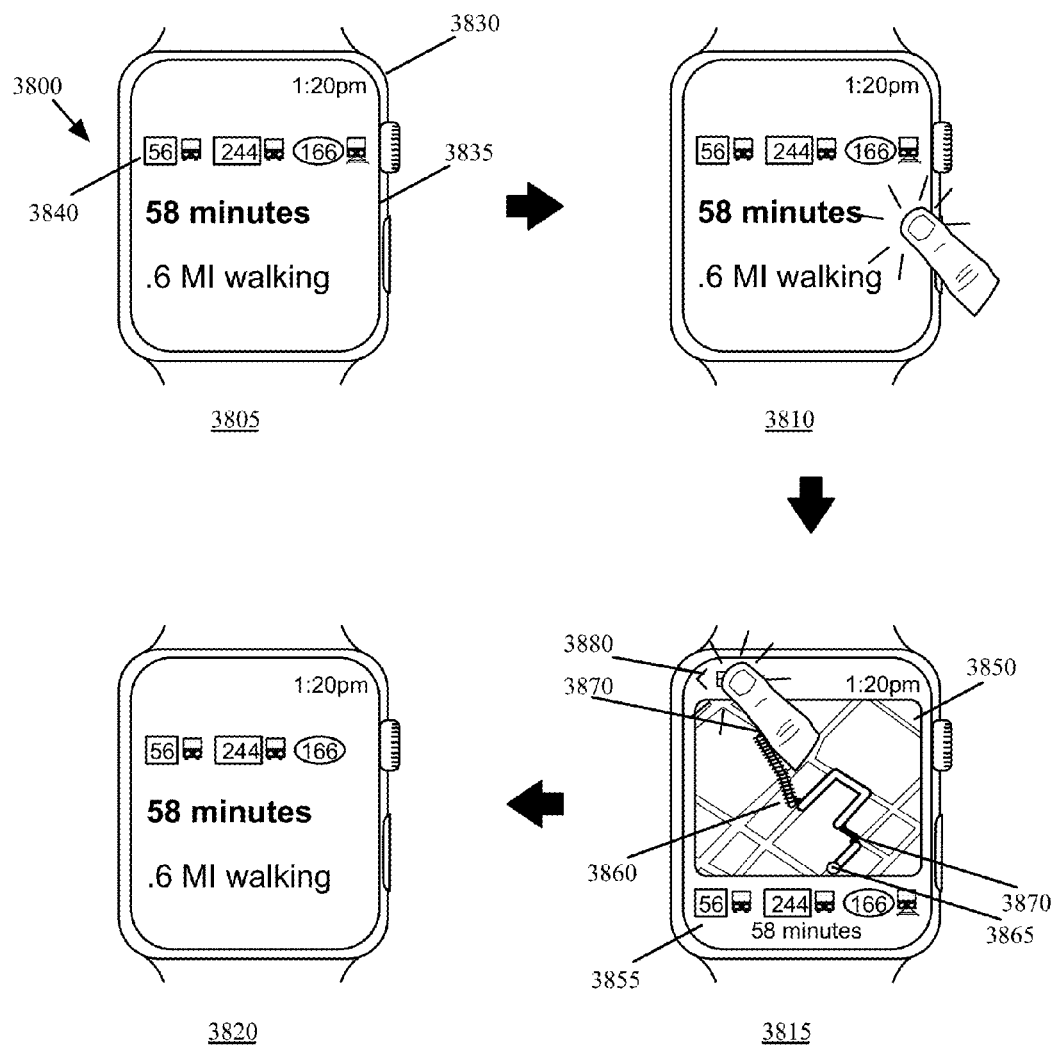
FIG. 38 illustrates initiation of a transit navigation presentation on a different type of electronic device.

FIG. 38 illustrates initiation of a transit navigation presentation on a different type of electronic device (e.g., an Apple Watch). Specifically, this figure shows, through four operational stages 3805-3820, how a user can view a transit navigation presentation. Some embodiments require a connection (e.g., wireless connection, a short-range wireless connection such as Bluetooth connection, etc.) between the electronic device 3830 and a separate device on which the map application operates (e.g., an iPhone). Some other embodiments do not require such a connection and the electronic device 3830 can exchange the transit and routing data as well as other map and navigation data with a mapping service directly.

The first stage 3805 shows the electronic device 3830 with a display area 3835 that is displaying a UI 3800 of the map application. As stated above, the map application may run on another electronic device that is connected to the device 3830 (e.g., through Bluetooth) or on the same electronic device. A user has requested to start navigating a transit route between two particular locations (e.g., current location of the user and a destination location) and in response to the request, the display area is showing a route summary presentation 3840 of a transit route between the two locations. In some embodiments, the user requests for the transit route through a separate device and selects a start navigation control similar to the Start control 184 of FIG. 1 in order to reach the illustrated stage 3805. In some other embodiments the user can request for the transit route and start navigating the requested transit route directly through the electronic device 3830 and without a connection to a separate device.

The route summary presentation 3840, as shown, includes two bus representations of different lines 56 and 244 that travel the first and second legs of the transit route and a subway train representation of the line 166 that travels the last leg of the transit route. The display area 3835 also shows that the total transit trip time 3845 is 58 minutes which includes a total walking distance 3850 of 0.6 miles. As described above some embodiments display a walking person representation for the different walking portions of the route in the route summary presentation, while some other embodiments display the walking representation only for walking portions that are more than a threshold distance (e.g., 0.5 miles).

The second stage 3810 shows that the user requests for a corresponding map presentation of the transit route summary. In some embodiments, the user may request for such by selecting any portion of the displayed information. That is, in some such embodiments, when the user taps on any portion of the display area 3835 of the device's display screen, the map application provides a map presentation and transit route that is associated with the displayed route summary presentation. As shown in this stage, the user selects the displayed route summary (e.g., by tapping on the display area 3835 of the screen) in order to view the transit route on a map presentation.

The third stage 3815 shows a map presentation 3835 with a transit route representation 3860 drawn over the map presentation. Specifically, the representation of the transit route includes three different transit legs that are drawn over a map region. In the illustrated example, the first and second transit legs (i.e. the first and second portions of the transit route) are traveled by two buses of different lines and therefore are displayed in a similar format. The third transit leg of the transit route, however, is traveled by a subway train, hence it is shown differently (i.e., as a railway representation on the map). The third stage 3815 also shows a representation 3865 of the current location of the device.

As shown, the device is currently located at the first transit station (i.e., the first bus stop) of the transit route, therefore no walking distance is presented between the current location of the user and the first transit station. Two walking distances 3870, however, are shown on the map presentation. The first walking distance separates the two bus routes from each other while the second walking distance is from the last subway station of the transit route to the desired destination. This stage also shows a route summary presentation area 3855 that displays the route summary which is similar to the route summary 3840 shown in the first stage 3805. Some embodiments, however, do not provide a separate route summary presentation area such as the one displayed in this figure. Some such embodiments only display the corresponding map view upon selection of the route summary presentation.

The third stage also shows that the user selects the back control 3880 (e.g., by tapping on the control) in order to direct the map application to change the display area back to display the route summary presentation. In some embodiments, the user can also swipe back the map view (e.g., by swiping the display screen to the right) in order to switch the display area back to display the route summary and/or navigation instruction. Yet, in some other embodiments a user can view the previous route summary by tapping on the display screen while the display area of the display screen shows the map presentation associated with the route summary.

Therefore, even though the size of the display screen limits the map application to display either the route summary presentation (or a navigation instruction as will be discussed in detail below), or the corresponding map view, a user still can switch between the two by simply tapping on the screen (e.g., tapping on the route summary presentation to switch to its corresponding map view, and tapping on the back control to switch back to the corresponding route summary presentation and/or a navigation instruction). The fourth stage 3820 shows that as a result of tapping on the back UI control 3880, the map application switches back to displaying the same route summary presentation that was illustrated in the first stage 3805.

Figure 39:
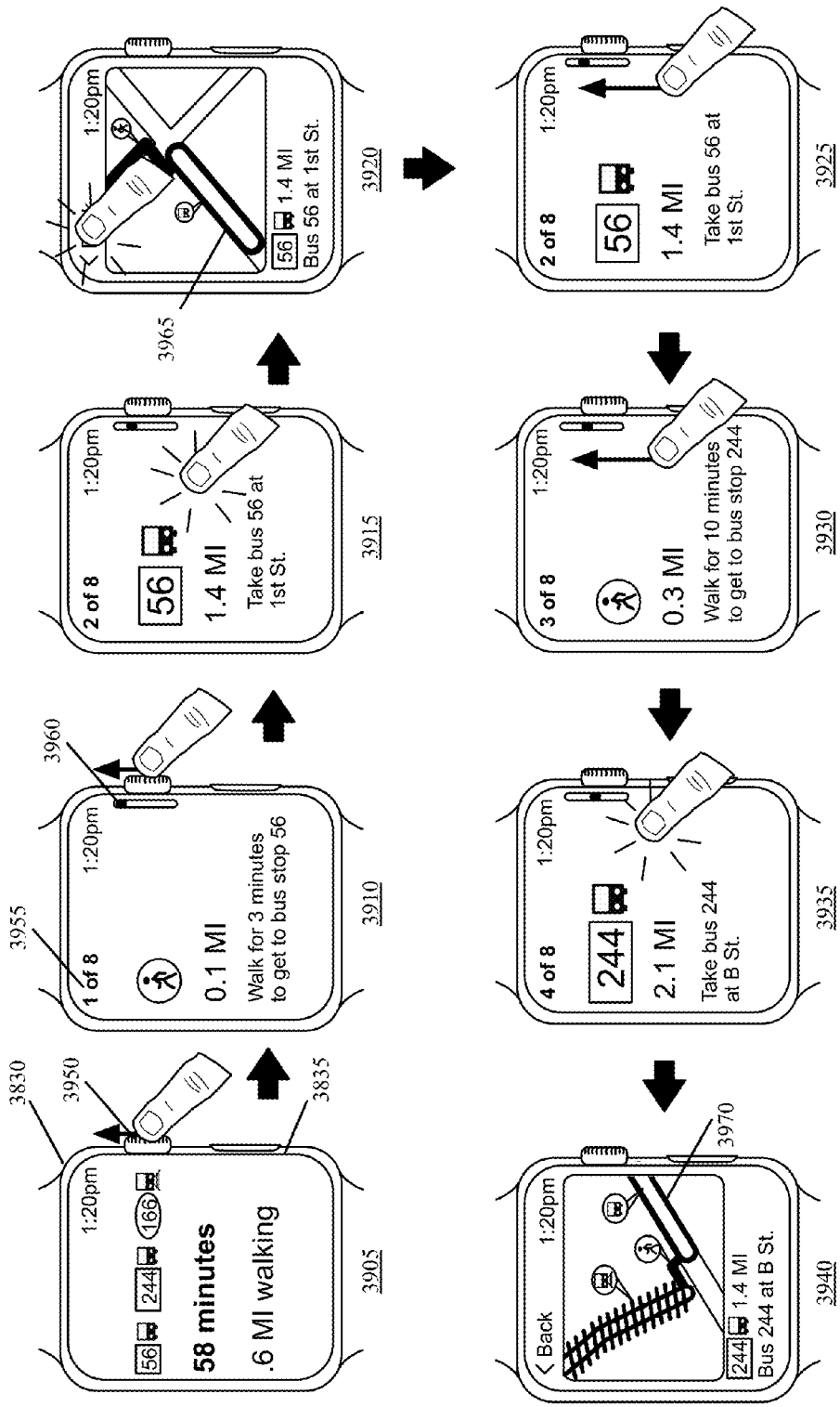
FIG. 39 illustrates a transit navigation presentation and navigating through different navigation banners displayed on an electronic device.

FIG. 39 illustrates a transit navigation presentation and navigating through different navigation banners displayed on an electronic device. Specifically, this figure shows, through eight operational stages 3905-3940, how a user can view a transit route and step through the different transit navigation banners for navigating the transit route. Similar to the last example, some embodiments require a connection (e.g., wireless connection, Bluetooth connection, etc.) between the electronic device 3830 and a separate device on which the map application operates (e.g., an iPhone). Some other embodiments do not require such a connection and the electronic device 3830 can receive the transit and routing data from a mapping service (such as the mapping service describe above) directly.

The first stage 3905 shows that the display area 3835 of the electronic device 3830 displays a UI of the map application that is similar to the UI that was displayed in the first stage of FIG. 38. More specifically, in this stage, a user has already requested for a transit route between the current location of the device and a destination location and in response to the request, the display area is showing a route summary presentation of a transit route between the two locations. The route summary presentation includes two bus representations for two different bus lines and a subway train representation for a subway line. These three transit lines shape the three transit legs of the transit route.

The display area 3835 also shows that the total transit trip time is 58 minutes which includes a total walking distance of 0.6 miles. This stage also shows that the user is turning the crown 3950 of the device, which functions as a small scroll wheel in some embodiments. In other words, in some embodiments, a user may navigate through different display screens of the same or different applications by turning and/or pushing the scroll wheel 3950 instead of swiping and/or tapping on the display screens. In this example, the user turns the scroll wheel 3950 to scroll to the next screen of the navigation presentation. That is, unlike the example shown in the previous figure, the user has chosen to scroll through the navigation presentation instead of tapping on the route summary presentation to view its corresponding transit route on the map region. Some embodiments scroll the displayed screen down when the scroll wheel is turned in one direction and scroll the displayed screen up when the scroll wheel is turned in another (opposite) direction.

Similar to the example illustrated in FIG. 31, the transit navigation presentation in some embodiments includes one or more navigation banners and one or more maneuver map views. In some embodiments, each navigation banner corresponds to one maneuver map view. In some such embodiments each maneuver map view and its associated navigation banner provide pictorial and text instructions that describe a transit navigation maneuver, which typically is associated with a transit leg of the transit route. For example each pair of navigation banner and map view corresponds to a starting point of a transit leg or an ending point of a transit leg. In some embodiments, a pair of navigation banner and map view may also correspond to a walking leg of a transit route, an entire leg of a transit route that is traveled by a transit vehicle, a transit station along the transit route, etc.

As shown in the second through eighth stages 3910-3940, the user of the device can scroll through the navigation (instruction) banners to see successive transit navigation banners that include navigation instructions for the transit maneuvers along the transit route. The second stage 3910 shows the first navigation banner in the navigation presentation after the user scrolled through (by turning the crown 3950) the route summary screen in the first stage. The navigation banner in the second stage includes a navigation instruction on how to start the transit route.

Specifically, the navigation banner includes a walking person representation that shows that the user is required to walk a distance to reach the first transit station of the transit route. The banner also shows the walking distance (0.1 miles) to the first station and instructs the user to walk for 3 minutes to reach the first bus station for the bus line 56, which starts the first leg of the transit route. The second stage also shows that the page counter 3955 shows that the displayed navigation banner is the first one in a sequence of eight navigation banners that provide navigation instructions for the requested transit route. The progress in the navigation presentation (i.e., what portion of the route is navigated so far) is further indicated by the progress indicator 3960. The user, at this stage, also chooses to scroll through the navigation banner to see the next step of the navigation presentation.

The third stage 3915 shows the second navigation banner in the navigation presentation after the user scrolled through (by turning the crown 3950) the first navigation banner in the second stage. As shown, the page counter 3955 shows the page count of 2 out of 8 banners and the progress indicator 3960 also has moved a little down to indicate the level of progress in the navigation presentation. The second navigation banner shows a bus representation for bus line 56 and bus leg distance of 1.4 miles. The second navigation instruction in the navigation banner instructs the user to take bus 56 at the first street. In the third stage the user chooses to view the associated maneuver map view for the displayed navigation banner. In order to do so, the user taps on the display screen of the device.

The fourth stage 3920 shows that after the user taps on the display screen while the display area of the display screen was displaying the second navigation banner, the display screen now shows the associated map view for the selected navigation banner. Specifically, this stage shows the second maneuver map view that is associated with the second navigation banner and the first transit leg. The maneuver map view for the second navigation banner (instruction) includes a bus route representation 3965 for the bus line 56 along with a walking portion after the user exits the bus. This stage also shows that in some embodiments, a separate display area shows a representation of the second navigation banner which includes the bus representation and the related instruction to take the bus at the bottom of the display screen.

In some embodiments the instruction shown here in the map view display area is different than the instruction shown in the corresponding navigation banner. For example, in some embodiments the text instruction is shorter that the text instruction shown in the navigation banner. In some other embodiments, as described above, the map application does not provide a separate display area to display the route summary presentation in the map view. The fourth stage 3920 further shows that the user taps on the back control 3880 to switch back to the associated navigation banner for the map view. As stated above, in some embodiments the user can also switch back the corresponding navigation instruction by swiping back the map view (e.g., swiping the screen to the right).

The fifth stage 3925 shows the same UI of the map application that was shown in the third stage. In this stage, however, the user has decided to view the next step of the navigation. Instead of turning the scroll wheel to scroll to the next navigation banner, however, this stage shows that the user swipes through the second navigation banner in order to see the next banner in the sequence. As described above, in some embodiments a user swipes through the navigation banners by touching (contacting) the touch-sensitive display screen of the device with one or more fingers and dragging the finger(s) up or down on the display screen to scroll the screen down or up, respectively.

The sixth stage 3930 shows that as a result of the user's swipe gesture on the navigation banner, the second navigation banner has scrolled out of the display screen and a third navigation banner that provides navigation instructions for the start of the second leg of the transit route is scrolled in and displayed in the display area of the display screen. The navigation banner in the sixth stage includes a navigation instruction for walking to the next transit station of the route. Specifically, the navigation banner includes a walking person representation that shows that the user is required to walk a distance to reach the second transit station of the transit route.

The navigation banner in the sixth stage 3930 also shows the walking distance (0.3 miles) to the first station and instructs the user to walk for 10 minutes to reach the second bus stop for starting the second leg of the transit route traveled by the bus line 244. The sixth stage also shows that the page counter 3955 shows that the displayed navigation banner is the third one in the sequence of eight navigation banners. The user, at this stage, also scrolls through the navigation banner to see the next step of the navigation presentation.

The seventh stage 3935 shows the fourth navigation banner in the navigation presentation after the user scrolled through (by swiping up the display screen) the third navigation banner in the sixth stage. As shown, the page counter 3955 shows the page count of 4 out of 8 banners now and the progress indicator 3960 also has moved further down (almost in the middle now) to indicate the level of progress in the navigation presentation. The fourth navigation banner shows a bus representation for bus line 244 and bus trip distance of 2.1 miles. The fourth navigation instruction in the navigation banner instructs the user to take the bus 244 at the B street bus stop. In the seventh stage the user chooses to view the associated maneuver map view for the displayed navigation banner. In order to do so, the user taps on the display screen of the device.

After the user taps on the display screen while the display area of the display screen displays the fourth navigation banner, the display screen shows, in the eight stage 3940, the associated map view for the selected navigation banner. Specifically, the fourth stage 3940 shows the fourth maneuver map view that is associated with the fourth navigation banner and the second transit leg. The maneuver map view for the fourth navigation banner (instruction) includes a bus route representation 3970 for the bus line 244 along with a walking portion after the user exits the bus.

The illustrated examples in the FIGS. 38 and 39, are not the only operations of the map application that are applicable to other devices such as an Apple Watch. As stated above, all of the above-described embodiments are equally applicable to other electronic devices such as an Apple Watch. As an example, the feature of automatically stepping through the navigation banners by tracking the current position of the device (i.e., auto stepping), which is described in detail above, is also equally applicable to Apple Watch, although no example figure for this feature is provided.

In some embodiments, when the map application is in the driving navigation mode, the map application continually (and without interruption) operates on the device (e.g., the apple watch) to provide the driving navigation presentation. In some such embodiments even when the device is in the locked mode and/or sleep mode (i.e., the display screen of the device is turned off), the map application actively runs on the device (by one or more processors of the device) in order to maintain the navigation presentation.

In some embodiments, when the map application is in the transit navigation mode, the map application does not continuously operate on the device (e.g., the apple watch). In other words, the map application stops operating on the device when the display screen of the device is turned off (the device is in the sleep mode) even if the map application is in the middle of a navigation presentation or any other operation related to the transit navigation presentation. This is because in a transit route, the probability of the device being used underground (e.g., on a subway leg of the trip) or in other areas that the device cannot be properly tracked is often high. As such, in order to save battery time and other resources of the device, some embodiments interrupt the map application while in transit mode, when these embodiments determine that the device cannot connect to a data network or when the device is in sleep mode. In some other embodiments, the map application is not interrupted in the transit mode and actively operates on the device even if the device's display screen is turned off.

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 40:
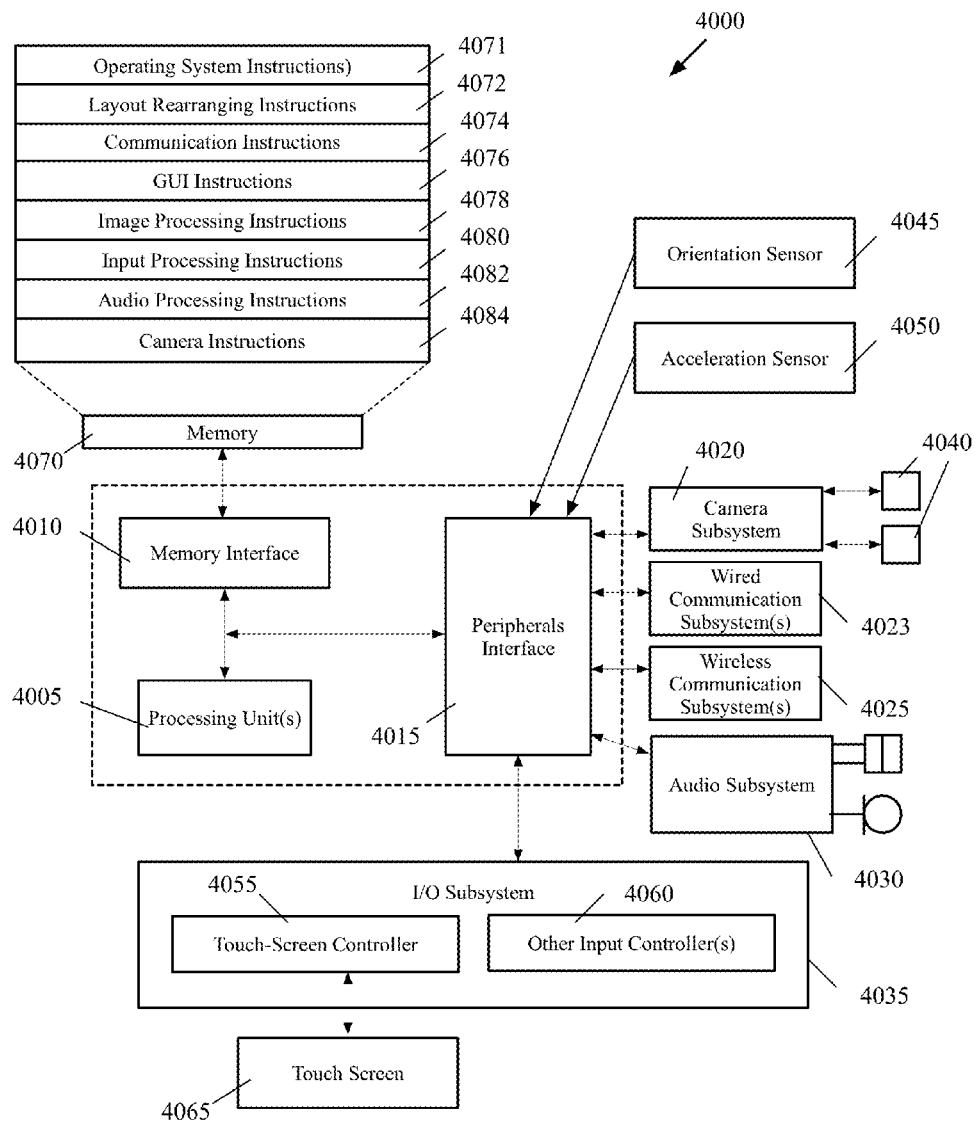
FIG. 40 illustrates an example of an architecture of a mobile computing device of some embodiments.

The applications of some embodiments operate on mobile devices, such as smart phones (e.g., iPhones®) and tablets (e.g., iPads®). FIG. 40 illustrates an example of an architecture 4000 of such a mobile computing device. As shown, the mobile computing device 4000 includes one or more processing units 4005, a memory interface 4010 and a peripherals interface 4015.

The peripherals interface 4015 is coupled to various sensors and subsystems, including a camera subsystem 4020, a wired communication subsystem(s) 4023, a wireless communication subsystem(s) 4025, an audio subsystem 4030, an I/O subsystem 4035, etc. The peripherals interface 4015 enables communication between the processing units 4005 and various peripherals. For example, an orientation sensor 4045 (e.g., a gyroscope) and an acceleration sensor 4050 (e.g., an accelerometer) is coupled to the peripherals interface 4015 to facilitate orientation and acceleration functions.

The camera subsystem 4020 is coupled to one or more optical sensors 4040 (e.g., a charged coupled device (CCD) optical sensor, a complementary metal-oxide-semiconductor (CMOS) optical sensor, etc.). The camera subsystem 4020 coupled with the optical sensors 4040 facilitates camera functions, such as image and/or video data capturing. The wired communication subsystem 4023 and wireless communication subsystem 4025 serve to facilitate communication functions.

In some embodiments, the wireless communication subsystem 4025 includes radio frequency receivers and transmitters, and optical receivers and transmitters (not shown in FIG. 40). These receivers and transmitters of some embodiments are implemented to operate over one or more communication networks such as a GSM network, a Wi-Fi network, a Bluetooth network, etc. The audio subsystem 4030 is coupled to a speaker to output audio (e.g., to output voice navigation instructions). Additionally, the audio subsystem 4030 is coupled to a microphone to facilitate voice-enabled functions in some embodiments.

The I/O subsystem 4035 involves the transfer between input/output peripheral devices, such as a display, a touch screen, etc., and the data bus of the processing units 4005 through the peripherals interface 4015. The I/O subsystem 4035 includes a touch-screen controller 4055 and other input controllers 4060 to facilitate the transfer between input/output peripheral devices and the data bus of the processing units 4005. As shown, the touch-screen controller 4055 is coupled to a touch screen 4065. The touch-screen controller 4055 detects contact and movement on the touch screen 4065 using any of multiple touch sensitivity technologies. The other input controllers 4060 are coupled to other input/control devices, such as one or more buttons. Some embodiments include a near-touch sensitive screen and a corresponding controller that can detect near-touch interactions instead of or in addition to touch interactions.

The memory interface 4010 is coupled to memory 4070. In some embodiments, the memory 4070 includes volatile memory (e.g., high-speed random access memory), non-volatile memory (e.g., flash memory), a combination of volatile and non-volatile memory, and/or any other type of memory. As illustrated in FIG. 40, the memory 4070 stores an operating system (OS) 4071. The OS 4071 includes instructions for handling basic system services and for performing hardware dependent tasks. The memory 4070 additionally includes layout rearranging instructions 4072 in order for the device 4000 to perform the layout rearranging process of some embodiments. In some embodiments, these instructions 4072 may be a subset of the operating system instructions 4071, or may be part of the instructions for an application.

The memory 4070 also includes communication instructions 4074 to facilitate communicating with one or more additional devices (e.g., for peer-to-peer data sharing, or to connect to a server through the Internet for cloud-based data sharing); graphical user interface instructions 4076 to facilitate graphic user interface processing; image processing instructions 4078 to facilitate image-related processing and functions; input processing instructions 4080 to facilitate input-related (e.g., touch input) processes and functions; audio processing instructions 4082 to facilitate audio-related processes and functions; and camera instructions 4084 to facilitate camera-related processes and functions. The instructions described above are merely exemplary and the memory 4070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 40 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 40 may be split into two or more integrated circuits.

B. Computer System

Figure 41:
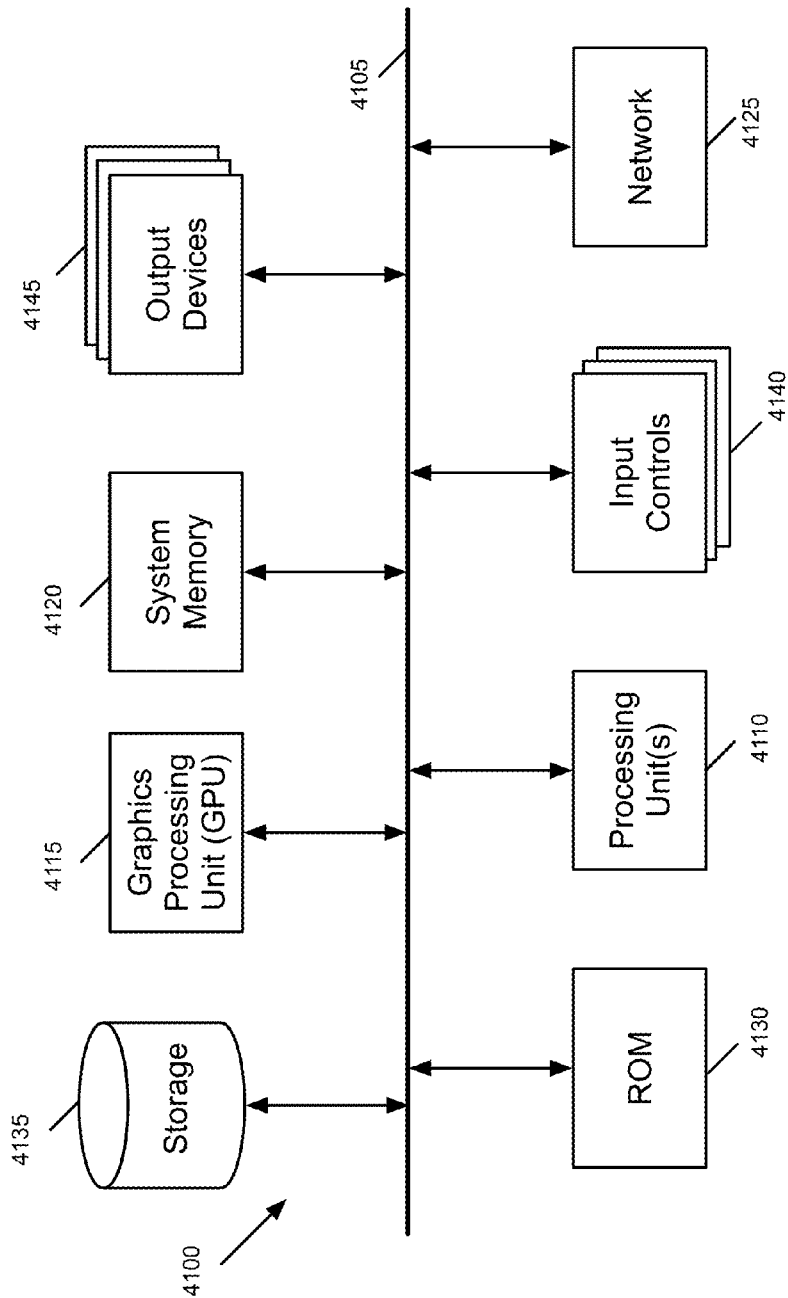
FIG. 41 conceptually illustrates another example of an electronic system with which some embodiments of the invention are implemented.

FIG. 41 conceptually illustrates another example of an electronic system 4100 with which some embodiments of the invention are implemented. The electronic system 4100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 4100 includes a bus 4105, processing unit(s) 4110, a graphics processing unit (GPU) 4115, a system memory 4120, a network 4125, a read-only memory 4130, a permanent storage device 4135, input devices 4140, and output devices 4145.

The bus 4105 collectively represents all system, peripheral, and chipset buses that communicatively connect the numerous internal devices of the electronic system 4100. For instance, the bus 4105 communicatively connects the processing unit(s) 4110 with the read-only memory 4130, the GPU 4115, the system memory 4120, and the permanent storage device 4135.

From these various memory units, the processing unit(s) 4110 retrieves instructions to execute and data to process in order to execute the processes of the invention. The processing unit(s) may be a single processor or a multi-core processor in different embodiments. Some instructions are passed to and executed by the GPU 4115. The GPU 4115 can offload various computations or complement the image processing provided by the processing unit(s) 4110. In some embodiments, such functionality can be provided using CoreImage's kernel shading language.

The read-only-memory (ROM) 4130 stores static data and instructions that are needed by the processing unit(s) 4110 and other modules of the electronic system. The permanent storage device 4135, on the other hand, is a read-and-write memory device. This device is a non-volatile memory unit that stores instructions and data even when the electronic system 4100 is off. Some embodiments of the invention use a mass-storage device (such as a magnetic or optical disk and its corresponding disk drive, integrated flash memory) as the permanent storage device 4135.

Other embodiments use a removable storage device (such as a floppy disk, flash memory device, etc., and its corresponding drive) as the permanent storage device. Like the permanent storage device 4135, the system memory 4120 is a read-and-write memory device. However, unlike storage device 4135, the system memory 4120 is a volatile read-and-write memory, such a random access memory. The system memory 4120 stores some of the instructions and data that the processor needs at runtime. In some embodiments, the invention's processes are stored in the system memory 4120, the permanent storage device 4135, and/or the read-only memory 4130. For example, the various memory units include instructions for processing multimedia clips in accordance with some embodiments. From these various memory units, the processing unit(s) 4110 retrieves instructions to execute and data to process in order to execute the processes of some embodiments.

The bus 4105 also connects to the input and output devices 4140 and 4145. The input devices 4140 enable the user to communicate information and select commands to the electronic system. The input devices 4140 include alphanumeric keyboards and pointing devices (also called "cursor control devices"), cameras (e.g., webcams), microphones or similar devices for receiving voice commands, etc. The output devices 4145 display images generated by the electronic system or otherwise output data. The output devices 4145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 41, bus 4105 also couples electronic system 4100 to a network 4125 through a network adapter (not shown). In this manner, the computer can be a part of a network of computers (such as a local area network ("LAN"), a wide area network ("WAN"), or an Intranet), or a network of networks, such as the Internet. Any or all components of electronic system 4100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4, 11, 21, 23, 26, 29, 33, and 35) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

VIII. Map Service

Figure 42:
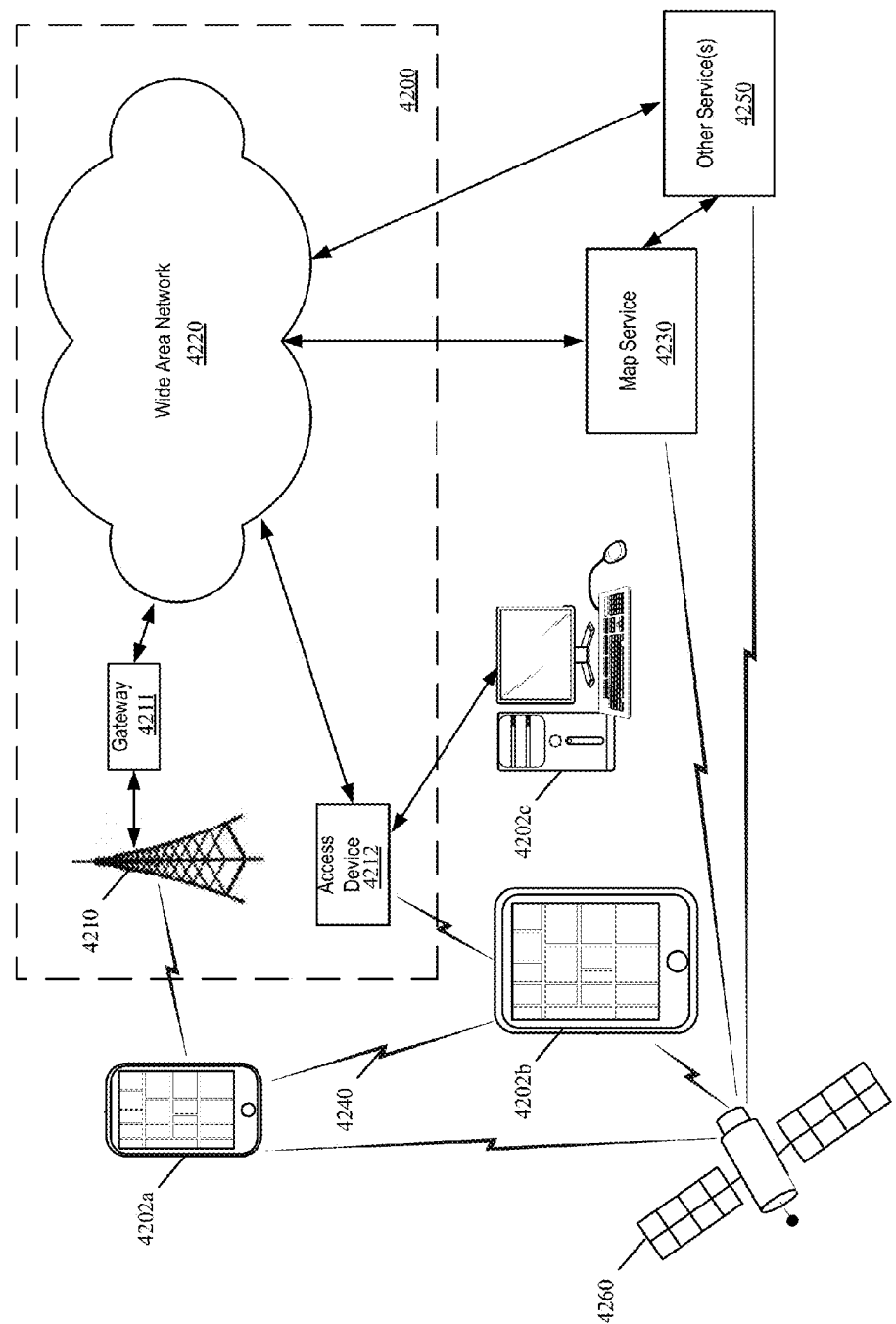
FIG. 42 illustrates one possible embodiment of an operating environment for a map service (also referred to as a mapping service) and client devices.

Various embodiments may operate within a map service operating environment. FIG. 42 illustrates one possible embodiment of an operating environment 4200 for a map service (also referred to as a mapping service) 4230 and client devices 4202a-4202c. In some embodiments, devices 4202a, 4202b, and 4202c communicate over one or more wired or wireless networks 4210. For example, wireless network 4210, such as a cellular network, can communicate with a wide area network (WAN) 4220, such as the Internet, by use of gateway 4214. A gateway 4214 in some embodiments provides a packet oriented mobile data service, such as General Packet Radio Service (GPRS), or other mobile data service allowing wireless networks to transmit data to other networks, such as wide area network 4220. Likewise, access device 4212 (e.g., IEEE 802.11g wireless access device) provides communication access to WAN 4220.

The client devices 4202a and 4202b can be any portable electronic or computing device capable of communicating with a map service (e.g., smart phone, tablet, laptop computer, etc.). Device 4202c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 4202a-4202c are not shown as each accessing the map service 4230 via either the wireless network 4210 and gateway 4214 or the access device 4212, one of ordinary skill in the art will recognize that the client devices of some embodiments may access the map service via multiple different wired and/or wireless protocols.

Devices 4202a-4202c can also establish communications by other means. For example, these devices may communicate with other wireless devices (e.g., other devices 4202b, cell phones, etc.) over the wireless network 4210 or through access device 4212. Likewise the devices 4202a-4202c can establish peer-to-peer communications 4240 (e.g., a personal area network) by use of one or more communication subsystems, such as Bluetooth® communication or similar peer-to-peer protocols.

Devices 4202a-4202c may also receive Global Positioning Satellite (GPS) signals from GPS satellites 4260. In addition, in some embodiments the map service 4230 and other services 4250 may also receive GPS signals from GPS satellites 4260.

A map service 4230 may provide map services for one or more client devices 4202a-4202c in communication with the map service 4230 through various communication methods and protocols. A map service 4230 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 4202a-4202c may utilize these map services to obtain the various map service data, then implement various techniques to process the data and provide the processed data to various entities (e.g., internal software or hardware modules, display screens of the client devices, external display screens, or other external systems or devices.

The map service 4230 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 4202a-4202c, the map service 4230 of some embodiments, performs various optimization techniques to analyze a map tile before encoding the tile.

In some embodiments, the map tiles are generated by the map service 4230 for different possible display resolutions at the client devices 4202a-4202c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 4230 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 4230 responds to requests from the client devices 4202a-4202c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 4202a-4202c that obtain map service data from the map service 4230 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 4202a-4202c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 4230. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 4202a-4202c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 4230 and/or other service(s) 4250 are configured to process search requests from any of the client devices. Search requests may include but are not limited to queries for businesses, addresses, residential locations, points of interest, or some combination thereof. Map service 4230 and/or other service(s) 4250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 4230 and/or other service(s) 4250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 4230 and/or other service(s) 4250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 4230 and/or other service(s) 4250 provide one or more feedback mechanisms to receive feedback from client devices 4202a-4202c. For instance, client devices may provide feedback on search results to map service 4230 and/or other service(s) 4250 (e.g., feedback specifying ratings, reviews, temporary or permanent business closures, errors etc.); this feedback may be used to update information about points of interest in order to provide more accurate or more up-to-date search results in the future. In some embodiments, map service 4230 and/or other service(s) 4250 may provide testing information to the client device (e.g., an A/B test) to determine which search results are best. For instance, at random intervals, the client device may receive and present two search results to a user and allow the user to indicate the best result. The client device may report the test results to map service 4230 and/or other service(s) 4250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures. However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A non-transitory machine readable medium storing a map application executable by at least one processing unit of a device, the application comprising sets of instructions for:
   displaying a selectable user interface (UI) item for a transit station that is displayed on a portion of a map of an area;
   providing, upon selection of the UI item, a graphical user interface (GUI) comprising departure schedules of a plurality of transit lines from the transit station;
   determining for at least one transit line that the transit line is a high frequency transit line by comparing time intervals between pairs of consecutive departures of transit vehicles of the at least one transit line to a threshold time and identifying the at least one transit line as a high frequency transit line based on the comparison; and
   for the at least one transit line, displaying, in the GUI, a frequency of departures for the transit line indicating time intervals between consecutive departures of the transit line at the transit station.

2. The non-transitory machine readable medium of claim 1, wherein the set of instructions for displaying the selectable UI item comprises a set of instructions for displaying a banner over the representation of the transit station, the banner comprising the selectable UI item as well as other information about the transit station.

3. The non-transitory machine readable medium of claim 1, wherein the application further comprises a set of instructions for displaying, on the GUI, at least one of a distance from a current location of the device to the transit station, an address of the transit station, and a set of selectable affordances for providing directions to the transit station.

4. The non-transitory machine readable medium of claim 1, wherein the transit station comprises a transit hub and the plurality of transit lines comprises different transit lines for different types of transit vehicles.

5. The non-transitory machine readable medium of claim 4, wherein the different types of transit vehicles comprise at least one of a subway, a light rail train, a bus, and a ferry.

6. The non-transitory machine readable medium of claim 1, wherein the plurality of transit lines are categorized into high frequency transit lines and low frequency transit lines, wherein time intervals between each pair of consecutive departures of transit vehicles of the high frequency transit lines from the transit station is less than the threshold time, while the time intervals between each pair of consecutive departures of transit vehicles of the low frequency transit lines from the transit station is more than the threshold time.

7. The non-transitory machine readable medium of claim 6, wherein a transit line of a first transit system is categorized as a high frequency transit line while a transit line of a second different transit system is categorized as a low frequency transit line.

8. The non-transitory machine readable medium of claim 6, wherein a first transit line of a transit system is categorized as a high frequency transit line while a second transit line of the same transit system is categorized as a low frequency transit line.

9. The non-transitory machine readable medium of claim 6, wherein the application further comprises a set of instructions for displaying, in the GUI, departure schedules of at least one low frequency transit line in addition to the displayed high frequency transit line.

10. The non-transitory machine readable medium of claim 9, wherein the set of instructions for displaying the departure schedules for the at least one low frequency transit line comprises a set of instructions for
   displaying one or more departure times of next one or more transit vehicles of the at least one low frequency transit line from the transit station.

11. The non-transitory machine readable medium of claim 1, wherein the GUI is a first GUI, wherein the application further comprises a set of instructions for:
   receiving a search for a location other than a transit station; and
   displaying a second GUI comprising a set of information about public transit stations within a threshold vicinity of the searched location.

12. The non-transitory machine readable medium of claim 1, wherein the application further comprises sets of instructions for:
   displaying a remaining time to a next departure of the transit line in addition to the displayed frequency of departures of the transit line;
   receiving a selection of the remaining time to the next departure for the transit line; and
   displaying a set of additional next departures of transit vehicles of the transit line from the transit station.

13. The non-transitory machine readable medium of claim 1, wherein the set of instructions for determining for at least one transit line that the transit line is a high frequency transit line comprises sets of instructions for:
   comparing time intervals between each pair of consecutive departures of transit vehicles of the at least one transit line to a threshold time; and
   identifying the at least one transit line as a high frequency transit line when the time intervals between each pair of consecutive departures is less than the threshold time.

14. An electronic device comprising:
   a set of processing units for executing sets of instructions; and
   a non-transitory machine readable medium storing a map application executable by at least one of the processing units of the device, the application comprising sets of instructions for:
   displaying a selectable user interface (UI) item for a transit station that is displayed on a portion of a map of an area;
   providing, upon selection of the UI item, a graphical user interface (GUI) comprising departure schedules of a plurality of transit lines from the transit station;
   determining for at least one transit line that the transit line is a high frequency transit line by comparing time intervals between pairs of consecutive departures of transit vehicles of the at least one transit line to a threshold time and identifying the at least one transit line as a high frequency transit line based on the comparison; and
   for the at least one transit line, displaying, in the GUI, (i) a frequency of departures for the transit line indicating time intervals between consecutive departures of the transit line at the transit station, and (ii) a remaining time to a next departure of the transit line.

15. The electronic device of claim 14, wherein the application further comprises a set of instructions for displaying, in the GUI, information about one or more incidents associated with one or more transit lines departing from the transit station.

16. The electronic device of claim 14, wherein the application further comprises sets of instructions for:
determining in which geographical area the transit station is located; and
for the transit line:
identifying a local directional term that is used in the geographical area for a departure direction of the transit line; and
displaying the local directional term as a trip heading of the transit line.

17. The electronic device of claim of claim 16, wherein the local directional term comprises a directional term that is different than traditional cardinal directions.

18. The electronic device of claim 16, wherein the transit station is a first transit station and the geographical area is a first geographical area, wherein the set of instructions for identifying the local directional term comprises sets of instructions for:
identifying a first local directional term for a particular departure direction of the transit line from the first transit station; and
identifying a second different directional term for the same particular departure direction of the transit line from a second transit station that is located in a second different geographical area.

19. The electronic device of claim 16, wherein the set of instructions for displaying the local directional term as the trip heading of the transit line comprises a set of instructions for displaying a cardinal direction as the trip heading of the transit line when no local directional term is identified to be used for the departure direction of the transit line in the geographical area.

20. The electronic device of claim 14 wherein the application further comprises a set of instructions for displaying, on the GUI, at least one of a distance from a current location of the electronic device to the transit station, an address of the transit station, and a set of selectable affordances for providing directions to the transit station.

21. The electronic device of claim 14, wherein the GUI is a first GUI, wherein the application further comprises sets of instructions for:
receiving a search for a location other than a transit station; and
displaying a second GUI comprising (i) public transit stations that are available within a threshold vicinity of the searched location and (ii) information about transit lines that depart from the public transit stations.

22. The electronic device of claim 14, wherein the set of instructions for determining for at least one transit line that the transit line is a high frequency transit line comprises sets of instructions for:
comparing time intervals between each pair of consecutive departures of transit vehicles of the at least one transit line to a threshold time; and
identifying the at least one transit line as a high frequency transit line when the time intervals between each pair of consecutive departures is less than the threshold time.

* * * * *